(12) United States Patent
Michael

(10) Patent No.: US 11,005,905 B2
(45) Date of Patent: *May 11, 2021

(54) DATA PROCESSING APPARATUS, DATA PROCESSING METHOD, AND PROGRAM

(71) Applicant: Saturn Licensing LLC, New York, NY (US)

(72) Inventor: Lachlan Bruce Michael, Saitama (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,699

(22) Filed: Jan. 19, 2017

(65) Prior Publication Data
US 2017/0134469 A1 May 11, 2017

Related U.S. Application Data

(63) Continuation of application No. 14/364,180, filed as application No. PCT/JP2013/077227 on Oct. 7, 2013, now abandoned.

(30) Foreign Application Priority Data

Oct. 17, 2012 (JP) .............................. JP2012-229550
Apr. 8, 2013 (JP) .............................. JP2013-080488

(51) Int. Cl.
*H04L 29/06* (2006.01)
*H04N 21/643* (2011.01)
(Continued)

(52) U.S. Cl.
CPC ............ *H04L 65/607* (2013.01); *H04L 69/22* (2013.01); *H04L 69/32* (2013.01); *H04L 69/321* (2013.01);
(Continued)

(58) Field of Classification Search
CPC ... H04L 65/4076; H04L 65/607; H04L 69/04; H04L 69/22
(Continued)

(56) References Cited

U.S. PATENT DOCUMENTS 6,765,931 B1   7/2004  Rabenko et al.
8,077,651 B2 * 12/2011 Thesling ................ H04H 20/74
                                                   370/316
(Continued)

FOREIGN PATENT DOCUMENTS

CN      101217535 A    7/2008
CN      101971533 A    2/2011
(Continued)

OTHER PUBLICATIONS

ETSI TS 102 771 V1.1.1, European Broadcasting Union, Jun. 30, 2009, pp. 1 to 34, [online], [retrieval date Dec. 4, 2013 (Dec. 4, 2013)], Internet <URL:http://www.etsi.org/deliver/etsi_ts/102700_102799/102771/01.01.01_60/ts_102771v010101p.pdf>.
(Continued)

*Primary Examiner* — Parth Patel
*Assistant Examiner* — Berhanu D Belete
(74) *Attorney, Agent, or Firm* — Lerner, David, Littenberg, Krumholz & Mentlik, LLP

(57) ABSTRACT

The present technology relates to a data processing apparatus, a data processing method, and a program capable of achieving reduction in costs of a reception device that receives a GSE packet. A GSE-Lite packet construction section constructs GSE-Lite packet including GSE-Lite signaling, which is signaling for identifying whether data is the GSE-Lite packet in a data link layer of an open systems interconnection (OSI) reference model, by using, as a target, only a protocol data unit (PDU) whose maximum size is limited to a predetermined limit size of 4096 bytes or less, (Continued)

where the GSE-Lite packet is a generic stream encapsulation (GSE) packet having the PDU placed in a data field. The present technology can be applied to, for example, a case of transmitting the GSE packet and a case of receiving the GSE packet.

18 Claims, 37 Drawing Sheets

(51) Int. Cl.
H04N 21/236 (2011.01)
H04N 21/438 (2011.01)
H04N 21/2383 (2011.01)
H04N 21/434 (2011.01)
H04N 21/647 (2011.01)
H04L 29/08 (2006.01)

(52) U.S. Cl.
CPC ... *H04N 21/2383* (2013.01); *H04N 21/23605* (2013.01); *H04N 21/4343* (2013.01); *H04N 21/4382* (2013.01); *H04N 21/643* (2013.01); *H04N 21/64707* (2013.01)

(58) Field of Classification Search
USPC .................................................. 370/328, 474
See application file for complete search history.

(56) References Cited

U.S. PATENT DOCUMENTS

| | | | |
|---|---|---|---|
| 8,929,401 B2* | 1/2015 | Herrmann | H04N 21/235 370/476 |
| 9,236,936 B2* | 1/2016 | Qin | H04B 7/18582 |
| 2006/0007953 A1 | 1/2006 | Vesma et al. | |
| 2006/0029065 A1 | 2/2006 | Fellman | |
| 2006/0075321 A1 | 4/2006 | Vedantham et al. | |
| 2007/0186133 A1 | 8/2007 | Stare | |
| 2008/0225892 A1* | 9/2008 | Vare | H04L 1/0057 370/473 |
| 2009/0079878 A1* | 3/2009 | Lee | H04L 1/0045 348/724 |
| 2009/0080507 A1* | 3/2009 | Lee | H04N 5/4401 375/232 |
| 2009/0190677 A1 | 7/2009 | Jokela et al. | |
| 2009/0196252 A1 | 8/2009 | Fischer | |
| 2009/0203326 A1* | 8/2009 | Vesma | H04H 20/426 455/69 |
| 2009/0260042 A1 | 10/2009 | Chiang | |
| 2009/0307727 A1* | 12/2009 | Thesling | H04N 7/10 725/63 |
| 2010/0034219 A1 | 2/2010 | Stadelmeier et al. | |
| 2011/0044393 A1 | 2/2011 | Ko et al. | |
| 2011/0051745 A1* | 3/2011 | Lee | H04N 21/238 370/474 |
| 2011/0103300 A1 | 5/2011 | Vare et al. | |
| 2011/0173515 A1* | 7/2011 | Lee | H04L 1/0045 714/758 |
| 2011/0211460 A1* | 9/2011 | Beeler | H04L 43/0847 370/245 |
| 2012/0314762 A1* | 12/2012 | Herrmann | H04N 21/2362 375/240.02 |
| 2012/0327955 A1* | 12/2012 | Herrmann | H04N 21/2389 370/476 |
| 2012/0331508 A1 | 12/2012 | Vare et al. | |
| 2013/0034032 A1 | 2/2013 | Vare et al. | |
| 2013/0039278 A1* | 2/2013 | Bouazizi | H04L 65/4076 370/328 |
| 2013/0219431 A1 | 8/2013 | Hong et al. | |
| 2013/0291027 A1* | 10/2013 | Hwang | H04N 21/6131 725/62 |
| 2013/0291046 A1* | 10/2013 | Ko | H04L 5/0044 725/116 |
| 2013/0308505 A1 | 11/2013 | Hong et al. | |
| 2014/0064280 A1* | 3/2014 | Qin | H04B 7/18582 370/392 |
| 2016/0198241 A1* | 7/2016 | Kitazato | H04N 21/6112 725/33 |

FOREIGN PATENT DOCUMENTS

| | | |
|---|---|---|
| CN | 102340453 A | 2/2012 |
| KR | 20100034210 A | 4/2010 |
| WO | 2008-110913 A1 | 9/2008 |

OTHER PUBLICATIONS

International Search Report from International Publication PCT/JP2013/077227 dated Dec. 17, 2013.
ETSI TS 102 606V1.1.1 (Oct. 2007).
Extended European Search Report for EP Application No. 13846817.8, dated Aug. 28, 2015.
Extended European Search Report for EP Application No. 13847354.1, dated Jul. 22, 2015.
Michael Lachlan, Proposal of GSE-lite, Dec. 10, 2012.
Michael Lachlan, GSE-Lite Proposal, Jan. 29, 2013.
ETSI_DVB—Digital Video Broadcast, Grand Saconnex, Geneva, Oct. 2013.
Wenger, S., H.264/AVC Over IP, IEEE Transactions on Circuits and Systems for Video Technology, vol. 13, No. 7, 2003, pp. 645-656.
Communication pursuant to Article 94(3) ERC for EP Application No. 13847354.1, dated Feb. 19, 2016.
ETSI TS 102 771 V1.2.1 (May 2011).
ETSI_EN_302 755 v1.1.1_Digital Video Broadcasting (DVB); Frame structure channel coding and modulation for a second generation digital terrestrial television broadcasting system (DVB-T2), Sophia Antipolis Cedex, France, Sep. 2009.
Extended European Search Report for Application No. EP17164726.6, dated Oct. 23, 2017.
Chinese Office Action and Search Report for Application No. CN201380007333.0 dated Jun. 28, 2017.
Chinese Office Action and Search Report for Application No. CN201380005140.1 dated Jun. 30, 2017.

* cited by examiner

FIG. 7

802.3 Ethernet frame structure

| Preamble | Start of frame delimiter | MAC destination | MAC source | Ethertype (Ethernet II) or length (IEEE 802.3) | 802.1Q tag (optional) | Payload | Frame check sequence (32-bit CRC) | Interframe gap |
|---|---|---|---|---|---|---|---|---|
| 7 BYTES | 1 BYTE | 6 BYTES | 6 BYTES | 2 BYTES | (4 BYTES) | 42–1500 BYTES | 4 BYTES | 12 BYTES |

FIG. 26

```
GSE_Options_descriptor (){
    descriptor_tag        8bits
    descriptor_length     8bits
    GSE_Lite              1bit
    Reserved              15bits
}
```

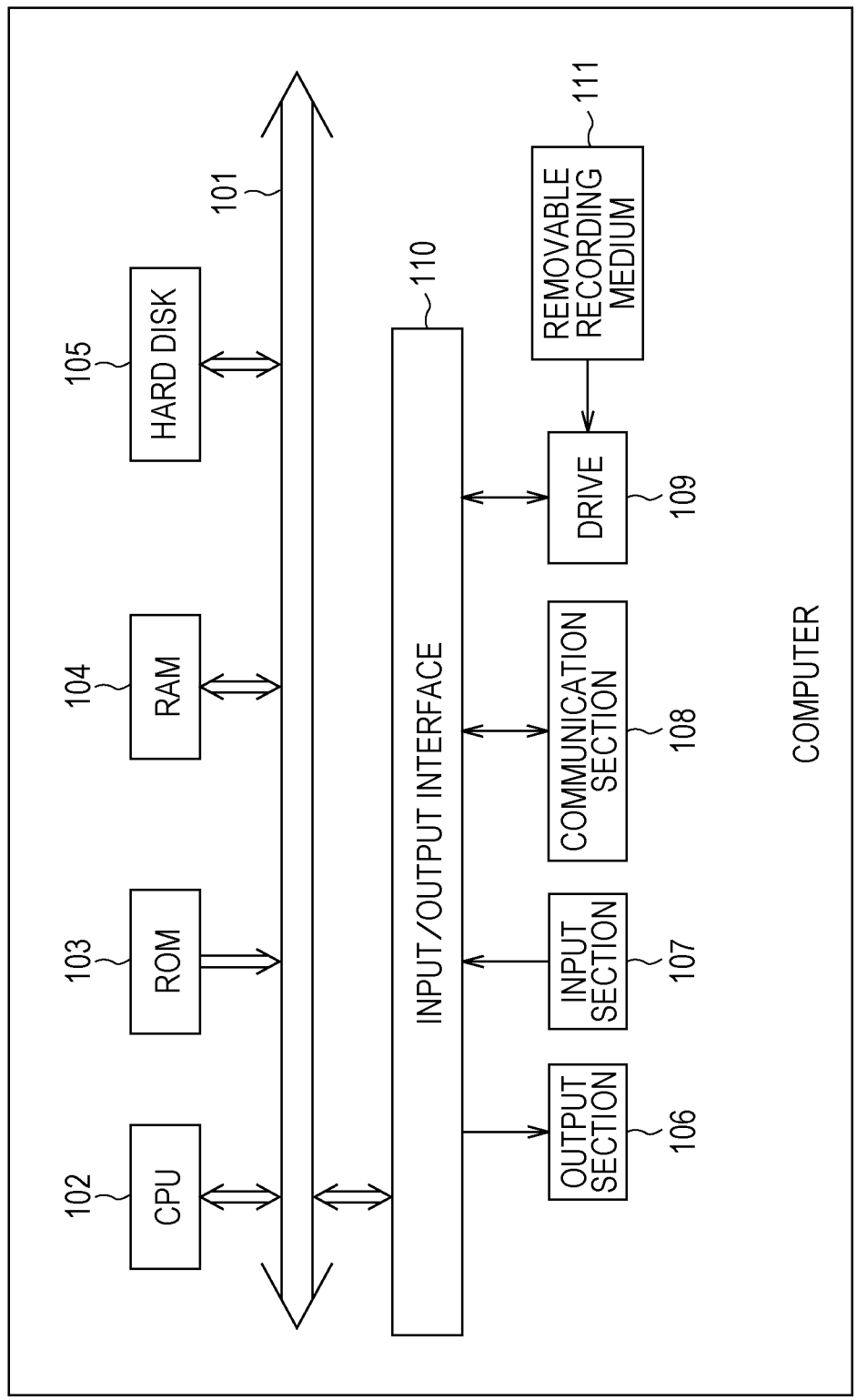

DATA PROCESSING APPARATUS, DATA PROCESSING METHOD, AND PROGRAM

CROSS-REFERENCE TO RELATED APPLICATIONS

The present application is a continuation of U.S. patent application Ser. No. 14/364,180, filed Jun. 10, 2014, which is a national phase entry under 35 U.S.C. § 371 of International Application No. PCT/JP2013/077227 filed Oct. 7, 2013, published on Apr. 24, 2014 as WO 2014/061488 A1, which claims priority from Japanese Patent Application Nos. JP 2012-229550 filed in the Japanese Patent Office on Oct. 17, 2012 and JP 2013-080488 filed in the Japanese Patent Office on Apr. 8, 2013.

TECHNICAL FIELD

The present technology relates to a data processing apparatus, a data processing method, and a program. In particular, the present technology relates to a data processing apparatus, a data processing method, and a program capable of achieving reduction in costs of a reception device that receives a GSE packet complying with, for example, digital video broadcasting generic stream encapsulation (DVB-GSE).

BACKGROUND ART

The DVB-GSE prescribes, for example, a protocol of a data link layer which transmits a protocol data unit (PDU) such as a so-called Ethernet frame (media access control (MAC) frame) (Ethernet is a registered trademark) prescribed by institute of electrical and electronic engineers (IEEE) 802.3 or an IP packet (for example, refer to Non Patent Literature 1).

In the DVB-GSE, the PDU is encapsulated in a single packet or a plurality of packets called GSE packets as necessary.

CITATION LIST

Non Patent Literature

Non Patent Literature 1: ETSI TS 102 606V1.1.1 (2007-10)

SUMMARY OF INVENTION

Technical Problem

The DVB-GSE is set as a standard having a general-purpose specification, that is to say, a specification, of which the limit is flexible, so as to deal with various use cases.

Hence, it is necessary for the reception device, which receives and processes the GSE packets complying with the DVB-GSE, to deal with various use cases. Accordingly, to verify the reception device, it takes a lot of time, and thus expensive and high-functional components are necessary for the configuration of the reception device.

As described above, for the reception device that receives the GSE packets, the high costs in terms of time and price are necessary, and it is difficult to reduce the costs.

The present technology has been made in consideration of such a situation, and it is desirable to achieve reduction in costs of the reception device that receives the GSE packets.

Solution to Problem

The present technology provides a first data processing apparatus or a first program causing a computer to function as the data processing apparatus. The first data processing apparatus includes a packet construction section that constructs a GSE-Lite packet by using, as a target, only a protocol data unit (PDU) whose maximum size is limited to a predetermined limit size of 4096 bytes or less, where the GSE-Lite packet is a generic stream encapsulation (GSE) packet having the PDU placed in a data field, in which the GSE-Lite packet includes GSE-Lite signaling which is signaling for identifying whether data is the GSE-Lite packet in a data link layer of an open systems interconnection (OSI) reference model.

The present technology provides a first data processing method including a packet construction step of constructing a GSE-Lite packet by using, as a target, only a protocol data unit (PDU) whose maximum size is limited to a predetermined limit size of 4096 bytes or less, where the GSE-Lite packet is a generic stream encapsulation (GSE) packet having the PDU placed in a data field, in which the GSE-Lite packet includes GSE-Lite signaling which is signaling for identifying whether data is the GSE-Lite packet in a data link layer of an open systems interconnection (OSI) reference model.

In the first data processing apparatus, data processing method, and program of the present technology, the GSE-Lite packet is constructed by using, as a target, only the protocol data unit (PDU) which is limited by a predetermined limit size whose maximum is equal to or less than 4096 bytes. The GSE-Lite packet is a generic stream encapsulation (GSE) packet having the PDU placed in a data field. In addition, the GSE-Lite packet includes the GSE-Lite signaling which is signaling for identifying whether data is the GSE-Lite packet in a data link layer of the open systems interconnection (OSI) reference model.

The present technology provides a second data processing apparatus or a second program causing a computer to function as the data processing apparatus. The second data processing apparatus includes: a reception section that receives a GSE-Lite packet including GSE-Lite signaling, which is signaling for identifying whether data is the GSE-Lite packet in a data link layer of an open systems interconnection (OSI) reference model, where the GSE-Lite packet is constructed by using, as a target, only a protocol data unit (PDU) whose maximum size is limited to a predetermined limit size of 4096 bytes or less, and the GSE-Lite packet is a generic stream encapsulation (GSE) packet having the PDU placed in a data field; and an output section that outputs the GSE-Lite packet or the PDU, which is extracted from the GSE-Lite packet, when the GSE-Lite signaling indicates that data is the GSE-Lite packet.

The present technology provides a second data processing method including: a reception step of receiving a GSE-Lite packet including GSE-Lite signaling, which is signaling for identifying whether data is the GSE-Lite packet in a data link layer of an open systems interconnection (OSI) reference model, where the GSE-Lite packet is constructed by using, as a target, only a protocol data unit (PDU) whose maximum size is limited to a predetermined limit size of 4096 bytes or less, and the GSE-Lite packet is a generic stream encapsulation (GSE) packet having the PDU placed in a data field; and an output step of outputting the GSE-Lite packet or the PDU, which is extracted from the GSE-Lite packet, when the GSE-Lite signaling indicates that data is the GSE-Lite packet.

The second data processing apparatus, data processing method, and program of the present technology is to receive the GSE-Lite packet. The GSE-Lite packet is constructed by using, as a target, only a protocol data unit (PDU) which is limited by a predetermined limit size whose maximum is equal to or less than 4096 bytes. The GSE-Lite packet is a generic stream encapsulation (GSE) packet having the PDU placed in a data field. The GSE-Lite packet includes the GSE-Lite signaling which is signaling for identifying whether data is the GSE-Lite packet in a data link layer of the open systems interconnection (OSI) reference model. In addition, when the GSE-Lite signaling indicates that data is the GSE-Lite packet, the GSE-Lite packet or the PDU, which is extracted from the GSE-Lite packet, is output.

It should be noted that the data processing apparatus may be a separate apparatus, and may be an internal block constituting one apparatus.

Further, the program can be provided in a way that the program is transmitted by a transmission medium or is recorded on a recording medium.

Advantageous Effects of Invention

According to the first and second aspects of the present technology, it is possible to reduce the costs of the reception device that receives the GSE packets.

BRIEF DESCRIPTION OF DRAWINGS

FIG. 7 is a diagram illustrating a frame configuration of an Ethernet frame.

FIG. 26 is a diagram illustrating a fourth example of the L2-placed GSE-Lite signaling.

FIG. 37 is a block diagram illustrating a configuration example of an embodiment of a computer according to the present technology.

DESCRIPTION OF EMBODIMENTS

First, the existing DVB-GSE will be briefly described as a previous step for describing the present technology.
<DVB-GSE>

Figure 1:
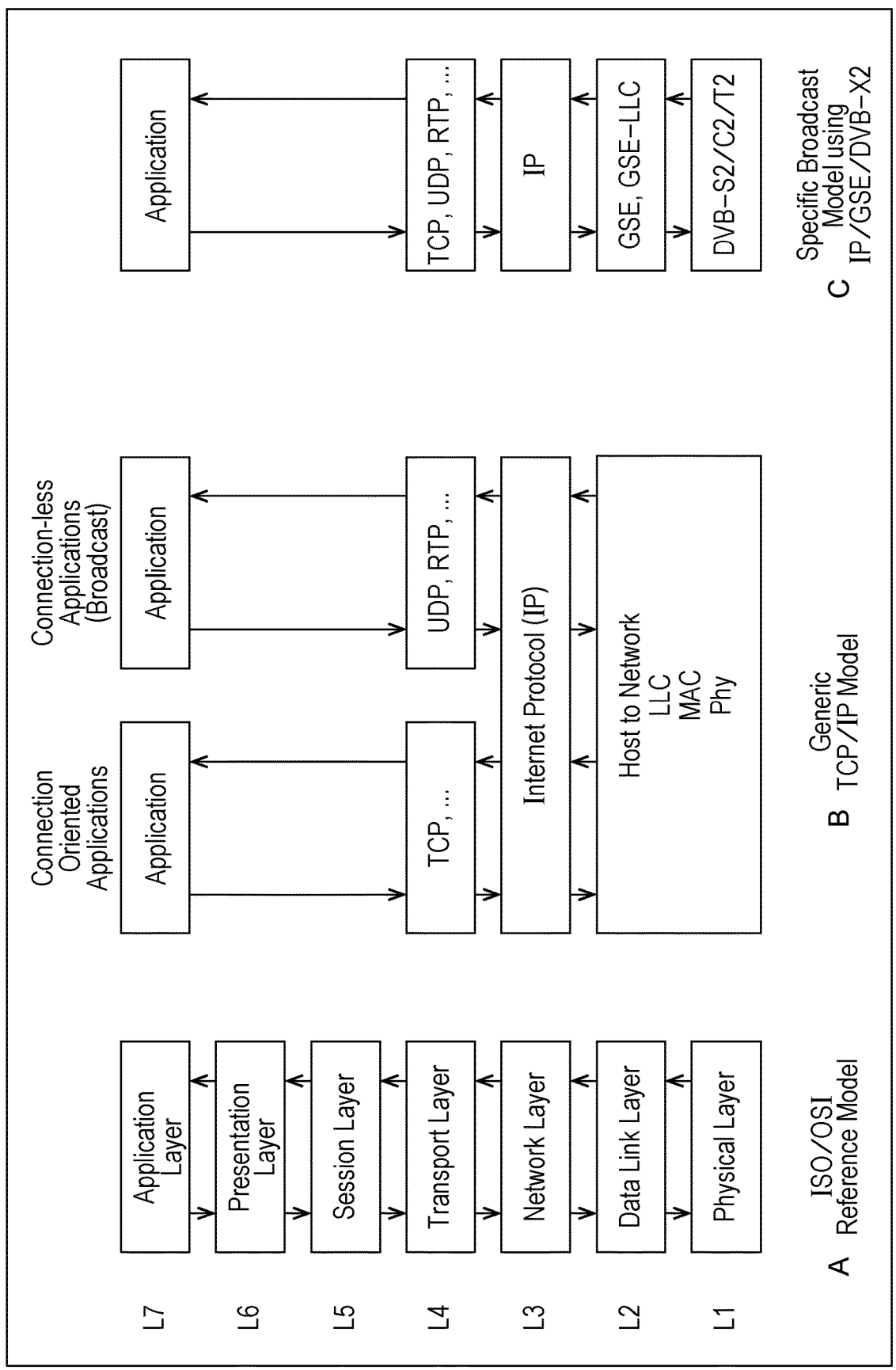
FIG. 1 is a diagram illustrating a relationship between the OSI reference model and data transmission based on the DVB-GSE.

FIG. 1 is a diagram illustrating a relationship between the open systems interconnection (OSI) reference model and data transmission based on the DVB-GSE (data transmission using the DVB-GSE).

FIG. 1A shows the OSI reference model (ISO/OSI Reference Model).

The OSI reference model includes, in order from the lower layer to the higher layer: a physical layer as a first layer; a data link layer as a second layer; a network layer as a third layer, a transport layer as a fourth layer; a session layer as a fifth layer; a presentation layer as a sixth layer; and an application layer as a seventh layer.

FIG. 1B shows an example of a protocol stack of the data transmission (data transmission using the TCP/IP and the like) of the TCP/IP model (Generic TCP/IP Model).

In the connection-type data transmission (Connection Oriented Applications) in the data transmission of the TCP/IP model, the transmission control protocol (TCP) or the like is used in the transport layer.

Further, in the connection-less-type data transmission (Connection-less Applications) such as broadcast in the data transmission of the TCP/IP model, a user datagram protocol (UDP), a real-time transport protocol (RTP), or the like is used in the transport layer.

In addition, in either of the connection type and the connection-less type of the data transmission of the TCP/IP model, an internet protocol (IP) is used in the network layer, and a host connected to a network (Host to Network) is used in the data link layer and the physical layer.

In addition, the host executes services or protocols of the media access control (MAC) layer and the logical link control (LLC) layer, which are sub-layers constituting the data link layer, and the physical layer (Phy).

FIG. 1C shows an example of a protocol stack of the data transmission based on the DVB-GSE, that is, a protocol stack of the data transmission of the broadcast model using, for example, the IP, the GSE, and the DVB-X2 (Specific Broadcast Model using IP/GSE/DVB-X2).

Here, the DVB-X2 indicates a broadcast standard of so-called second generation of the DVB, and the corresponding broadcast standard includes, for example, the DVB-T2, the DVB-C2, and the DVB-S2.

In the data transmission based on the DVB-GSE, the TCP, the UDP, the RTP, or the like is used in the transport layer, and the internet protocol (IP) is used in the network layer.

Furthermore, in the data transmission based on the DVB-GSE, the DVB-GSE, or the GSE-LLC is used in the data link layer, and the DVB-T2, the DVB-C2, or the DVB-S2 is used in the physical layer.

Figure 2:
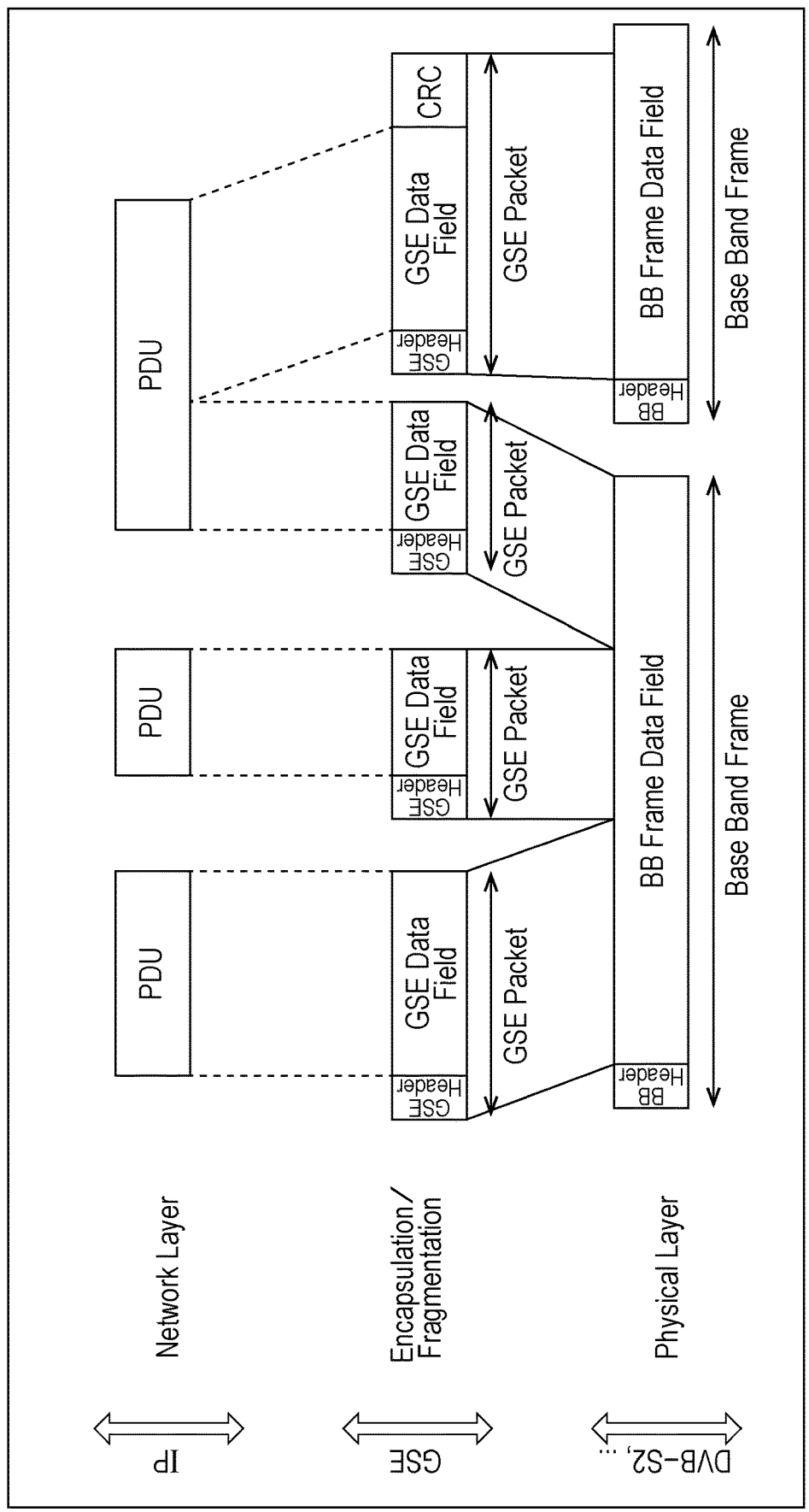
FIG. 2 is a diagram illustrating a process of the data transmission based on the DVB-GSE.

FIG. 2 is a diagram illustrating a process of the data transmission based on the DVB-GSE described in the written standard (Non Patent Literature 1) of the DVB-GSE.

In the DVB-GSE, the packet of the network layer such as the IP packet or the PDU such as a frame of the data link layer such as an Ethernet frame is encapsulated in a single GSE packet or a plurality of GSE packets as necessary.

That is, the PDU is, for example, intactly placed in the data field (GSE Data Field), the GSE header is further added (placed), and is thereby encapsulated in a single GSE packet.

Alternatively, the PDU is sliced into, for example, a plurality of PDU fragments. Then, each fragment is encapsulated in the GSE packet as described above, and the PDU is encapsulated in a plurality of GSE packets of which the number is equal to the number of PDU fragments.

In addition, when the PDU is encapsulated in a plurality of GSE packets, in the data field of the GSE packet in which the last PDU fragment is placed, not only the last PDU fragment but also a cyclic redundancy check (CRC) code is placed. When the (original) PDU is reconstructed (reassembled) from the plurality of PDU fragments, the cyclic redundancy check (CRC) code is used in verifying the PDU.

The encapsulation of the PDU in the GSE packet is a process of the data link layer, and thereafter the GSE packet is transmitted by the physical layer such as the DVB-S2.

That is, in the physical layer, for example, a single GSE packet or a plurality of GSE packets is placed in a data field (BB Frame Data Field), and a base band frame (BBF), to which a base band (BB) header is further added, is constructed, and is transmitted by, for example, the DVB-X2 (in conformity with the DVB-X2).

Figure 3:
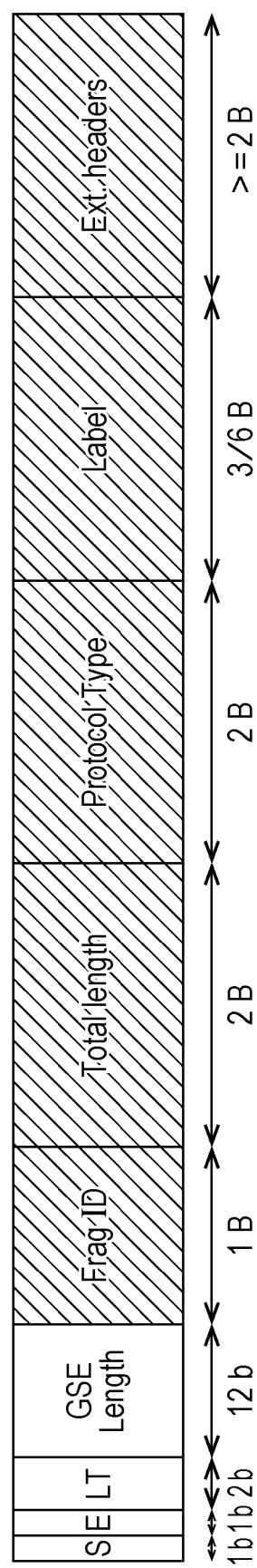
FIG. 3 is a diagram illustrating a format of a GSE header of a GSE packet.

FIG. 3 is a diagram illustrating a format of the GSE header of the GSE packet.

The GSE header is constructed to include, side-by-side in order of precedence: a start indicator S with 1 bit (b); an end indicator E with 1 bit; a label type (LT) with 2 bits; a GSE length with 12 bits; a flag ID with 1 byte (B); a total length with 2 bytes; a protocol type with 2 bytes; a label with 3 bytes or 6 bytes; and an extension header (Ext. headers) with 2 bytes or more.

In addition, the flag ID, the total length, the protocol type, the label, and the extension header, which are hatched in FIG. 3, are arbitrary fields. Consequently, fields, which are essential for the GSE header, are the start indicator S, the end indicator E, the LT, and the GSE length.

Further, the start indicator S, the end indicator E, the LT, the GSE length, the flag ID, the total length, the protocol type, the label, and the extension header are defined in the written standard of the DVB-GSE. Therefore, the description thereof will be omitted.

Figure 4:
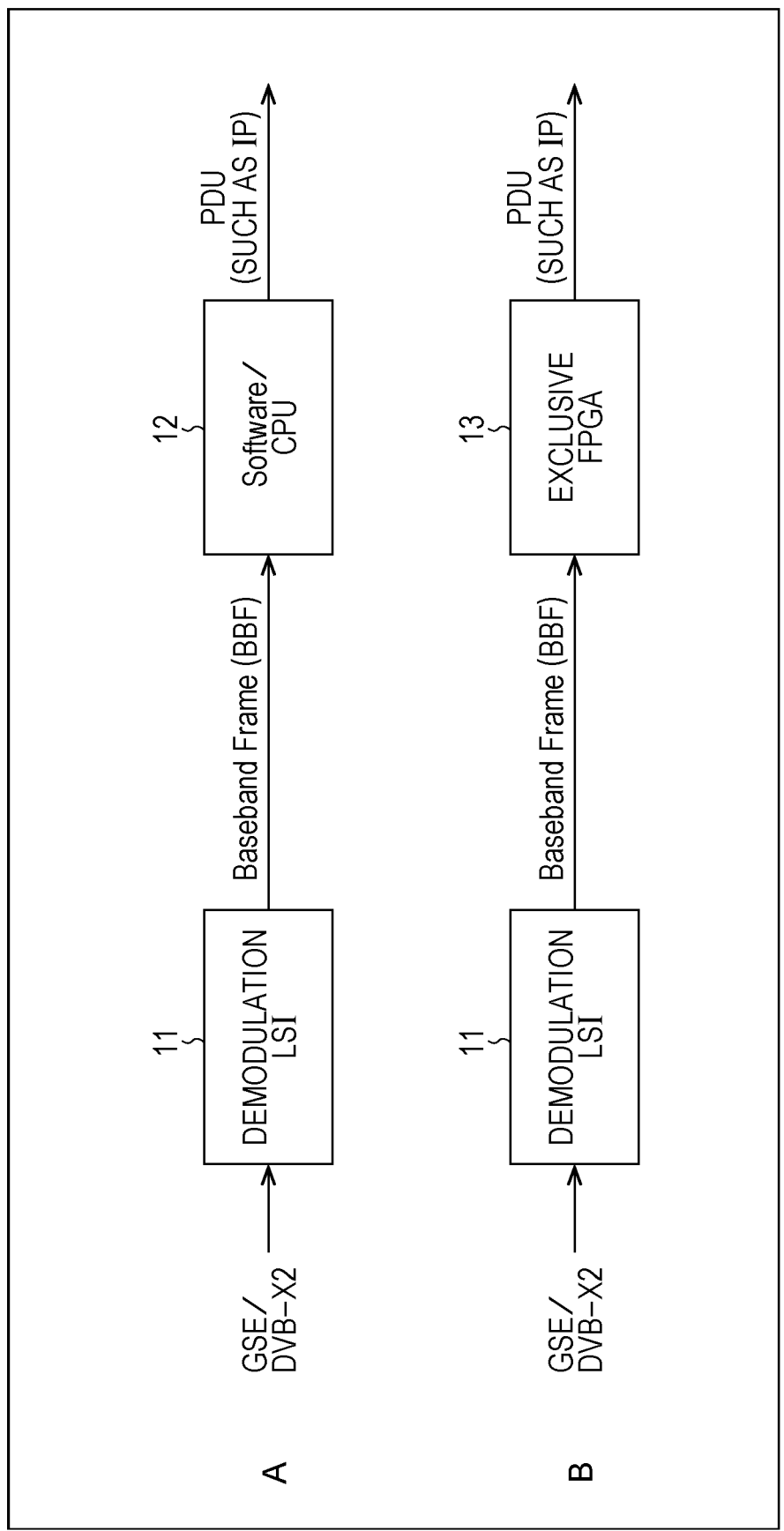
FIG. 4 is a block diagram illustrating a configuration example of the reception device that receives the GSE packets transmitted by the DVB-X2.

FIG. 4 is a block diagram illustrating a configuration example of the reception device that receives the GSE packets transmitted by the DVB-X2.

FIG. 4A shows a first configuration example of the reception device that receives the GSE packets transmitted by the DVB-X2.

In FIG. 4A, the reception device has a demodulation large scale integration (LSI) 11, and a central processing unit (CPU) 12.

The demodulation LSI 11 receives a modulation signal of the DVB-X2, and the modulation signal is demodulated into the BBF, and is supplied to the CPU 12. The CPU 12 executes software (program), thereby recovering and outputting the PDUs such as IP packets which are encapsulated in the GSE packets placed in the data fields of BBFs sent from the demodulation LSI 11.

FIG. 4B shows a second configuration example of the reception device that receives the GSE packets transmitted by the DVB-X2.

In addition, in FIG. 4B, portions corresponding to the portions in the case of FIG. 4A are referenced by the same reference numerals and signs, and hereinafter the description thereof will be appropriately omitted.

In FIG. 4B, the reception device is the same as that in the case of FIG. 4A in that the device has the demodulation LSI 11. The reception device is different from that in the case of FIG. 4A in that, instead of the CPU 12, the device has an exclusive field-programmable gate array (FPGA) 13.

The exclusive FPGA 13 is subjected to programming for recovering, from the BBF, the PDU encapsulated in the GSE packet placed in the data field thereof.

The exclusive FPGA 13 is supplied with the BBF from the demodulation LSI 11, and the exclusive FPGA 13 recovers and outputs the PDU such as the IP packet encapsulated in the GSE packet placed in the data field of the BBF sent from the demodulation LSI 11.

However, as described above, the DVB-GSE is set as general-purpose specification, that is, a specification, of which the limit is flexible. According to the DVB-GSE, the PDUs can be flexibly mapped (placed) in the GSE packets.

Hence, there is a concern that implementation of the method of mapping the PDUs in the GSE packets is likely to be unique implementation for a user (service provider) who provides services by using the GSE packets.

Further, in the DVB-GSE, although the maximum size of the PDU, which is placeable in a single packet, is 4096 bytes, through the fragmentation that slices the PDU into fragments, the PDU with up to 65536 bytes can be encapsulated in (a plurality of) GSE packets.

Furthermore, in the DVB-GSE, the PDU fragmentation is allowed to be performed in parallel on up to 256 PDUs.

That is, the fragmentation can be performed in parallel (time-divisionally) on 256 PDUs in a way that, while a certain PDU is fragmented and the fragments thereof are transmitted, another PDU is fragmented and the fragments thereof are transmitted.

Accordingly, when a unique method of mapping the PDUs in the GSE packets is provided for each service provider, it is necessary for the reception device that receives the GSE packets (or BBFs in which the GSE packets are placed) to deal with, for example, the following multiple cases: a case where the PDU is encapsulated in a single GSE packet; a case where the PDU is fragmented and encapsulated in two GSE packets or a plurality of more than two GSE packets; a case where two PDUs or a plurality of more than two PDUs are fragmented into a plurality of pieces in parallel.

As a result, in manufacture of the reception device that receives the GSE packets, it is necessary to test whether or not the reception device is able to deal with the above-mentioned multiple cases, and large costs (costs in time) are necessary for the test.

Furthermore, since the DVB-GSE is a general-purpose specification, it can be expected that a new use case, which is not considered at the threshold of manufacture of the reception device that receives the GSE packets, may be developed in the future. In order to deal with such a new use case, instead of mounting hardware for performing a fixed process on the reception device, as shown in FIG. 4, it is desirable to mount the FPGA or the CPU as a high-functional component (hardware) capable of adaptively changing the process through programming.

However, since the high-functional component such as the CPU or the FPGA is mounted on the reception device in order to deal with the new use case, the cost of (the price of) the reception device increases.

Further, the DVB-GSE prescribes the following. When the PDU fragmentation is performed, the GSE packet (the GSE packet in which the last fragment of the PDU is placed) of the last fragment of the PDU is received on the reception side, and then the original PDU is reconstructed.

Consequently, when the PDU fragmentation is performed in parallel on up to 256 PDUs, the GSE packet of the first fragment of the PDU is received on the reception side, and then the GSE packet of the last fragment of the PDU is received on the reception side, it may take a long time to reconstruct the original PDU.

As a result, the latency, that is, for example, a delay time, from when transmission of the PDU from the transmission side is started to when reconstruction of the PDU on the reception side is completed, may increase. Thus, due to the increase in the corresponding latency, a problem may arise in broadcast performed by the DVB-C2, the DVB-T2, or the DVB-S2.

Further, when the PDU fragmentation can be performed in parallel on up to 256 PDUs, as a worst case, there may be a case where 256 PDUs of which the size is 65536 bytes are fragmented in parallel.

In the corresponding worst case, in order to reconstruct the fragmented PDUs, it is necessary to mount a large-capacity memory, which has 65536 bytes×256=16777216 bytes (16M (Mega) bytes), on the reception side (the reception device that receives the GSE packets).

Here, the 1-byte flag ID of the GSE header shown in FIG. 3 is used when the PDU is fragmented and transmitted.

That is, when the PDU is fragmented and is encapsulated in a plurality of GSE packets, on the transmission side, the same values are set in the flag IDs of the GSE packets in which the fragments of the same PDU (hereinafter referred to as PDU fragments) are placed. In addition, on the reception side, the original PDU is recovered from the PDU fragments placed in the GSE packets of which the flag IDs have the same values.

In addition, in the DVB-GSE, there is no information that indicates the order of the PDU fragments, which can be obtained by fragmenting the PDU, on the PDU. Hence, the PDU fragments (or the GSE packets in which the PDU fragments are placed), which can be obtained by fragmenting the PDU, have to be transmitted in the order on the PDU.

Further, as the flag ID, an integer value is set. The integer value can be represented by 1 byte in the range of for example 0 to 255.

However, once integer values are set in the flag IDs of the GSE packets in which the PDU fragments which can be obtained by fragmenting the PDU are placed, the integer values are not available in the flag IDs until the transmission of all the PDU fragments constituting the PDU is completed.

That is, when a certain PDU #1 is fragmented and transmitted, the same values V of the flag IDs are allocated to all the PDU sections of components of the PDU #1. Allocating values V to flag IDs of PDU sections of components of another PDU #2 is forbidden until the transmission of all the PDU sections of the components of the PDU #1 having the values V allocated to the flag IDs is completed.

Here, the 1-bit start indicator S of the GSE header shown in FIG. 3 is set to 1 when the GSE packet includes a head of the PDU, and is set to 0 when the GSE packet does not include a head of the PDU.

Further, the 1-bit end indicator E of the GSE header shown in FIG. 3 is set to 1 when the GSE packet includes the end of the PDU, and is set to 0 when the GSE packet does not include the end of the PDU.

Consequently, the integer value V, which is set in the flag ID of the GSE packet where the PDU fragment is placed, can be used as the flag ID after transmission of the GSE packet of which the integer value V is set in the flag ID and the end indicator E is set to 1.

As described above, since the DVB-GSE is set as a general-purpose specification, the costs of the reception device, which receives and process the GSE packet complying with the DVB-GSE, increase, and thus it is difficult to reduce the costs.

Accordingly, in the present technology, in a range in which the DVB-GSE is not violated, a part of the technical specification of the DVB-GSE is limited, thereby achieving reduction in costs of the reception device complying with the DVB-GSE.

<Brief Overview of Present Technology>

Figure 5:
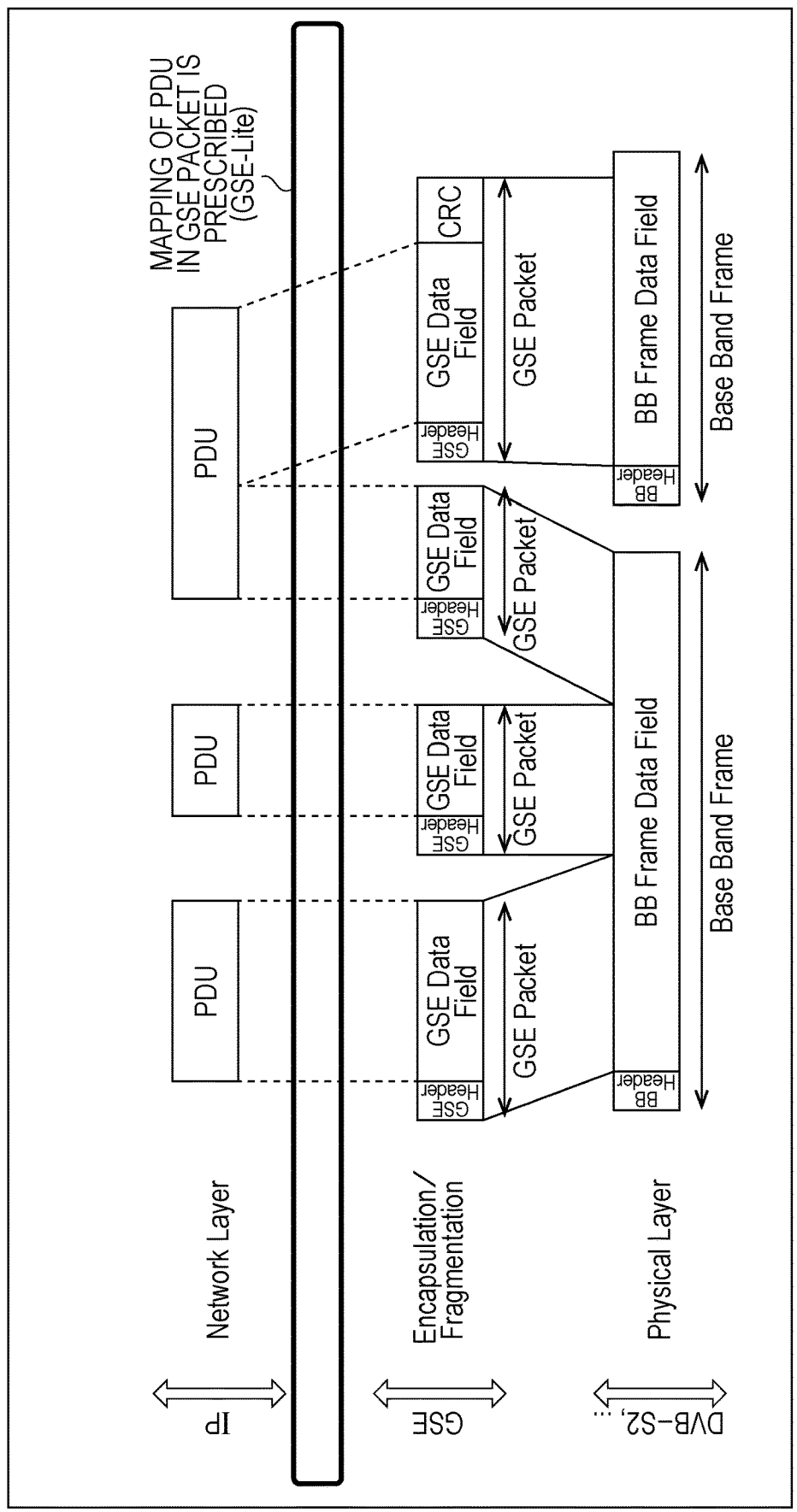
FIG. 5 is a diagram illustrating a brief overview of the present technology.

FIG. 5 is a diagram illustrating a brief overview of the present technology.

That is, FIG. 5 shows a process of data transmission based on the DVB-GSE as shown in FIG. 2 mentioned above.

In the present technology, as shown in FIG. 5, mapping of the PDUs in the GSE packets is prescribed (limited) in the range in which the DVB-GSE is not violated.

Here, for convenience of description, specification (prescription), which limits the mapping of the PDUs in the GSE packets in the range in which the DVB-GSE is not violated, is hereinafter referred to as GSE-Lite.

<Brief Overview of GSE-Lite>

Figure 6:
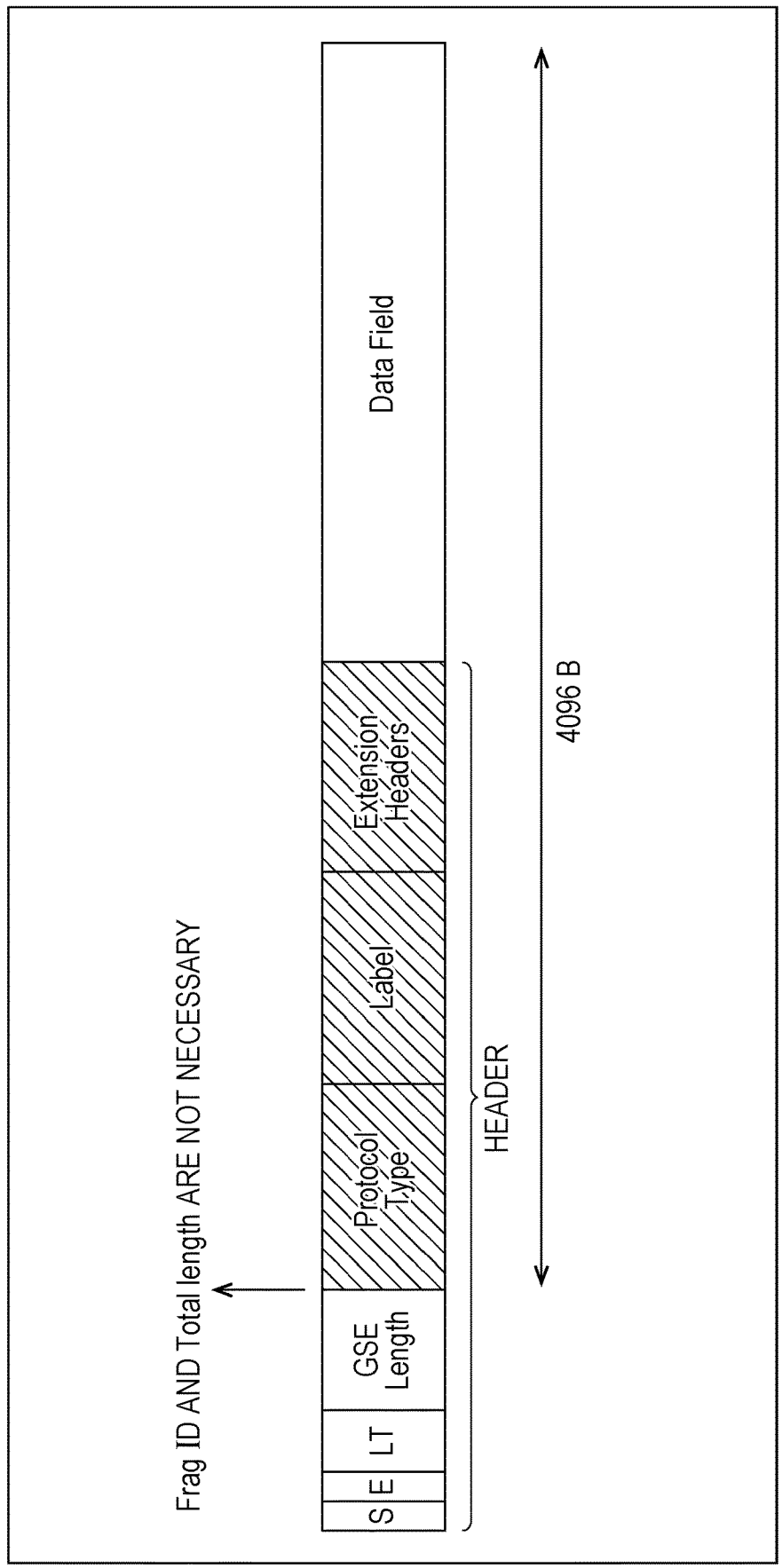
FIG. 6 is a diagram illustrating an example of a format of a GSE-Lite packet.

FIG. 6 is a diagram illustrating an example of a format of the GSE-Lite packet.

Here, the GSE-Lite packet is a GSE packet complying with the GSE-Lite, and is also a GSE packet which does not violate the DVB-GSE. However, hereinafter, for convenience of description, unless otherwise noted, the GSE packet does not include the GSE-Lite packet.

In the GSE-Lite, in the DVB-GSE, the maximum size of the PDU encapsulated in the GSE packet is limited to a predetermined limit size of 4096 bytes or less.

Consequently, in the GSE-Lite, by using, as a target, only the PDU whose maximum size is limited to a predetermined limit size of 4096 bytes or less, the PDU is encapsulated. Through the encapsulation of the PDU, the GSE-Lite packet, which is a GSE packet having the PDU placed in the data field, is constructed.

Here, the GSE length of the GSE header with 12 bits shown in FIG. 3 indicates the size of the GSE packet immediately after the GSE header in units of bytes.

In the DVB-GSE, when the PDU is placed in the GSE packet, the GSE length may be equal to or less than 4096 bytes which can be represented by 12 bits. In this case, the PDU is encapsulated in a single GSE packet without being fragmented.

The flag ID, the total length, the protocol type, the label, and the extension header following the GSE length of the GSE header are arbitrary as described in FIG. 3. Accordingly, in a case where the flag ID, the total length, the protocol type, the label, and the extension header which are arbitrary are not used, even when the limit size of the GSE-Lite of maximum 4096 bytes is adopted, the PDU is encapsulated in a single GSE packet without being fragmented.

The GSE-Lite adopts a size capable of encapsulating the PDU in a single GSE packet without fragmenting the PDU by the limit size which is the maximum size of the PDU placed in the GSE packet.

As described above, by adopting the size capable of encapsulating the PDU in a single GSE packet without fragmenting the PDU by the limit size, the flag ID with 1 byte and the total length with 2 bytes, which are necessary only at the time of the PDU fragmentation, in the GSE header becomes not necessary.

Consequently, it is not necessary for the header of the GSE-Lite packet (hereinafter referred to as a GSE-Lite header) to include the flag ID with 1 byte and the total length with 2 bytes. Hence, comparing with the GSE header of which the flag ID and the total length are arbitrary, in the GSE-Lite header, the size of the header is made compact, and thus it is possible to improve transmission efficiency.

In the DVB-GSE, the maximum size of the PDU, which can be encapsulated in a single GSE packet without fragmentation of the PDU, is 4096 bytes as described above. Therefore, in the GSE-Lite, a value of 4096 bytes or less can be adopted as the limit size, that is, the maximum size (for example, 1 byte or more) of the PDU which is placed (encapsulated in the GSE-Lite packet) in the data field of the GSE-Lite packet.

Here, in the most use cases of the data transmission based on the DVB-GSE, it is assumed that the transmission is transmission of Ethernet frames or IP packets.

Therefore, the limit size can be determined on the basis of the size (maximum size) of the Ethernet frame or the IP packet.

FIG. 7 is a diagram illustrating a frame configuration of the Ethernet frame.

The Ethernet frame includes, side by side in the following order: a preamble with 7 bytes; start of frame delimiter (SFD) with 1 byte; a destination MAC address (MAC destination) with 6 bytes; a transmission source MAC address (MAC source) with 6 bytes; a type/length (Ethertype/length) with 2 bytes; a tag (802.1Q tag) with 4 bytes; a payload with 42 to 1500 bytes; a frame check sequence (FCS) with 4 bytes; and a gap (Interframe gap) with 12 bytes.

It should be noted that the tag is an arbitrary field and is used in the data transmission based on the virtual local area network (VLAN) of IEEE802.1q.

Further, in the Ethernet frame of FIG. 7, the preamble, the SFD, and the gap are set as physical layers, and the others from the destination MAC address to the FCS are set as data link layers. Consequently, FIG. 7 shows the format of the Ethernet frame set as a layer that is the data link layer or a layer lower than the data link layer.

As the limit size of the GSE-Lite, for example, it is possible to adopt 1542 (=7+1+6+6+2+4+1500+4+12) bytes as the maximum size of the Ethernet frame of FIG. 7.

Further, as the limit size, for example, it is possible to adopt 1538 (=1542−4) bytes as the maximum size which is obtained by subtracting the tag with 4 bytes of the arbitrary field from the Ethernet frame of FIG. 7.

Furthermore, as the limit size, for example, it is possible to adopt 1530 (=1542−12) bytes as the maximum size which is obtained by subtracting the gap with 12 bytes set as a physical layer from the Ethernet frame of FIG. 7.

Moreover, as the limit size, for example, it is possible to adopt 1526 (=1542−4−12) bytes as the maximum size which is obtained by subtracting the tag with 4 bytes of the arbitrary field and the gap with 12 bytes set as a physical layer from the Ethernet frame of FIG. 7.

In addition, as the limit size, for example, it is possible to adopt 1522 (=1542−7−1−12) bytes as the maximum size which is obtained by subtracting the preamble with 7 bytes, the SFD with 1 byte, and the gap with 12 bytes set as physical layers from the Ethernet frame of FIG. 7.

Further, as the limit size, for example, it is possible to adopt 1518 (=1542−7−1−12−4) bytes as the maximum size which is obtained by subtracting the preamble with 7 bytes, the SFD with 1 byte, and the gap with 12 bytes set as physical layers and the tag with 4 bytes of the arbitrary field from the Ethernet frame of FIG. 7.

As described above, the limit size can be determined not only on the basis of the size of the Ethernet frame, but also on the basis of, for example, the size of the IP packet.

Here, the maximum length of the IP packet is 65535 bytes. However, in the most communication networks other than the Internet, the IP packet is placed in the payload of the Ethernet packet and is transmitted. In this case, the maximum transmission unit (MTU) of the IP packet is set to 1500 bytes (octet) by which the unit can be placed in the payload of the Ethernet packet.

As the limit size, for example, it is possible to adopt 1500 bytes in the MTU of the IP packet mentioned above.

In addition, when the TCP is adopted in the higher transport layer of the IP packet, both of the sizes of the IP (IPv4) header and the TCP header are at least 20 bytes.

Hence, the maximum size of the payload of the IP packet of which the MTU has 1500 bytes is set to 1460 (=1500−20−20) bytes.

In the data transmission based on the DVB-GSE, it is assumed that the Ethernet frames, the IP packets, or the like are transmitted in most cases. In this case, as described above, by adopting a value of about 1500 bytes as the limit size, the Ethernet frames, the IP packets, or the like can be transmitted by the GSE-Lite.

Further, as the limit size, considering some margin for the above-mentioned value of about 1500 bytes, it is possible to adopt a value of, for example, 1800 bytes or the like.

Figure 8:
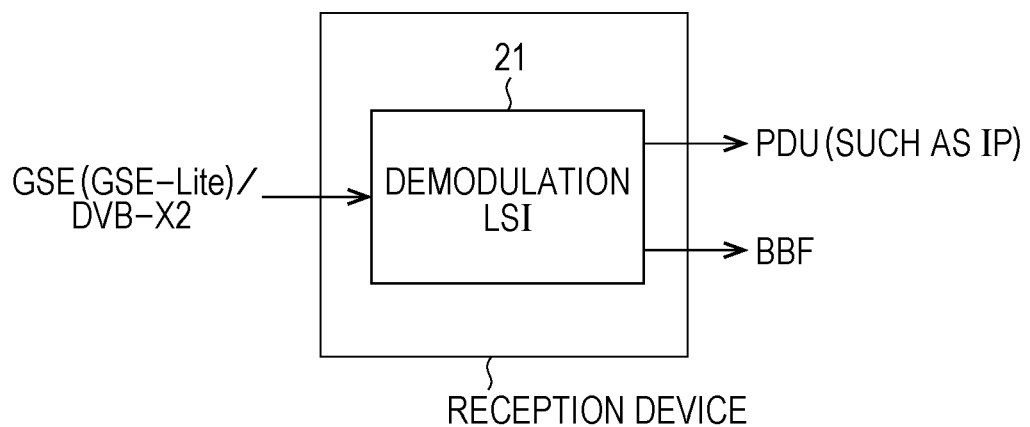
FIG. 8 is a block diagram illustrating a brief overview of a configuration example of a reception device that receives the GSE-Lite packet transmitted by the DVB-X2 and complies with the GSE-Lite.

FIG. 8 is a block diagram illustrating a brief overview of a configuration example of a reception device that receives the GSE-Lite packet transmitted by the DVB-X2 and complies with the GSE-Lite.

In FIG. 8, the reception device has a demodulation LSI 21.

The demodulation LSI 21 receives the modulation signal of the DVB-X2, and demodulates the modulation signal into the BBF.

When the BBF includes the GSE-Lite packet (when the GSE-Lite packet is placed in the BBF data field), the demodulation LSI 21 extracts the GSE-Lite packet from the BBF. Furthermore, the demodulation LSI 21 recovers the PDU (such as the IP packet) from the GSE-Lite packet, that is, extracts the PDU placed in the data field of the GSE-Lite packet, and outputs the PDU to the outside.

Since the PDU included in the GSE-Lite packet is not fragmented, a process of reconstructing the PDU can be easily performed by extracting the PDU from the GSE-Lite packet, and can be performed in the demodulation LSI 21 without using high-functional components such as CPU and FPGA.

By adopting the limit size of for example 1542 bytes or the like described in FIG. 7, the PDU such as the Ethernet frame or the IP packet generally used can be transmitted by the GSE-Lite.

However, the PDU, of which the size is greater than the limit size, cannot be transmitted by the GSE-Lite, and thus transmitted by the DVB-GSE.

In this case, the demodulation LSI 21 of the reception device of FIG. 8 receives the PDU transmitted by the DVB-GSE, that is, the GSE packet (the modulation signal of the BBF includes the GSE packet), but it is difficult to reconstruct the PDU by processing the GSE packet in a similar manner to the GSE-Lite packet. Hence, regarding the GSE packet, the demodulation LSI 21 outputs the BBF including the GSE packet to the outside as it is.

As described above, in the demodulation LSI 21, the GSE packet can be processed through the external process by outputting the BBF including the GSE packet to the outside as it is. Thereby, for the GSE packet, compatibility (backward compatibility) is secured, and it is possible to process the GSE packet flexibly.

In the reception device complying with the GSE-Lite, the fragmented PDUs are not (does not have to be) set as targets of the reconstruction, the reconstruction of the PDUs included in the GSE-Lite packets can be easily performed in the demodulation LSI 21 without using the high-functional components such as the CPU and the FPGA. Therefore, it is not necessary to provide the high-functional components such as the CPU and the FPGA, and thus the reception device can be formed to have a simple configuration. As a result, it is possible to achieve reduction in costs of the reception device.

Furthermore, in the reception device complying with the GSE-Lite, the fragmented PDUs are not set as targets of the reconstruction. Thus, it is not necessary to mount a memory with 16M bytes for the worst case of the reconstruction of the fragmented PDUs. Consequently, it is possible to reduce the capacity of the memory to be mounted on the reception device. As a result, it is possible to achieve reduction in costs of the reception device.

Further, in the reception device complying with the GSE-Lite, the fragmented PDUs are not set as targets of the reconstruction. Thus, the number of the use cases (parameters) to be verified decreases, and it is possible to shorten the time necessary for the verification.

Furthermore, in the GSE-Lite, the PDU fragmentation is not performed, and thus latency (for example, a delay time from when transmission of the PDU is started from the transmission side to when reconstruction of the PDU is completed on the reception side) becomes small compared with the case of performing the PDU fragmentation. Consequently, the latency increases, and thus it is possible to prevent a problem from arising in the broadcast performed by the DVB-C2, the DVB-T2, or the DVB-S2.

<First Embodiment of Transmission Device According to Present Technology>

Figure 9:
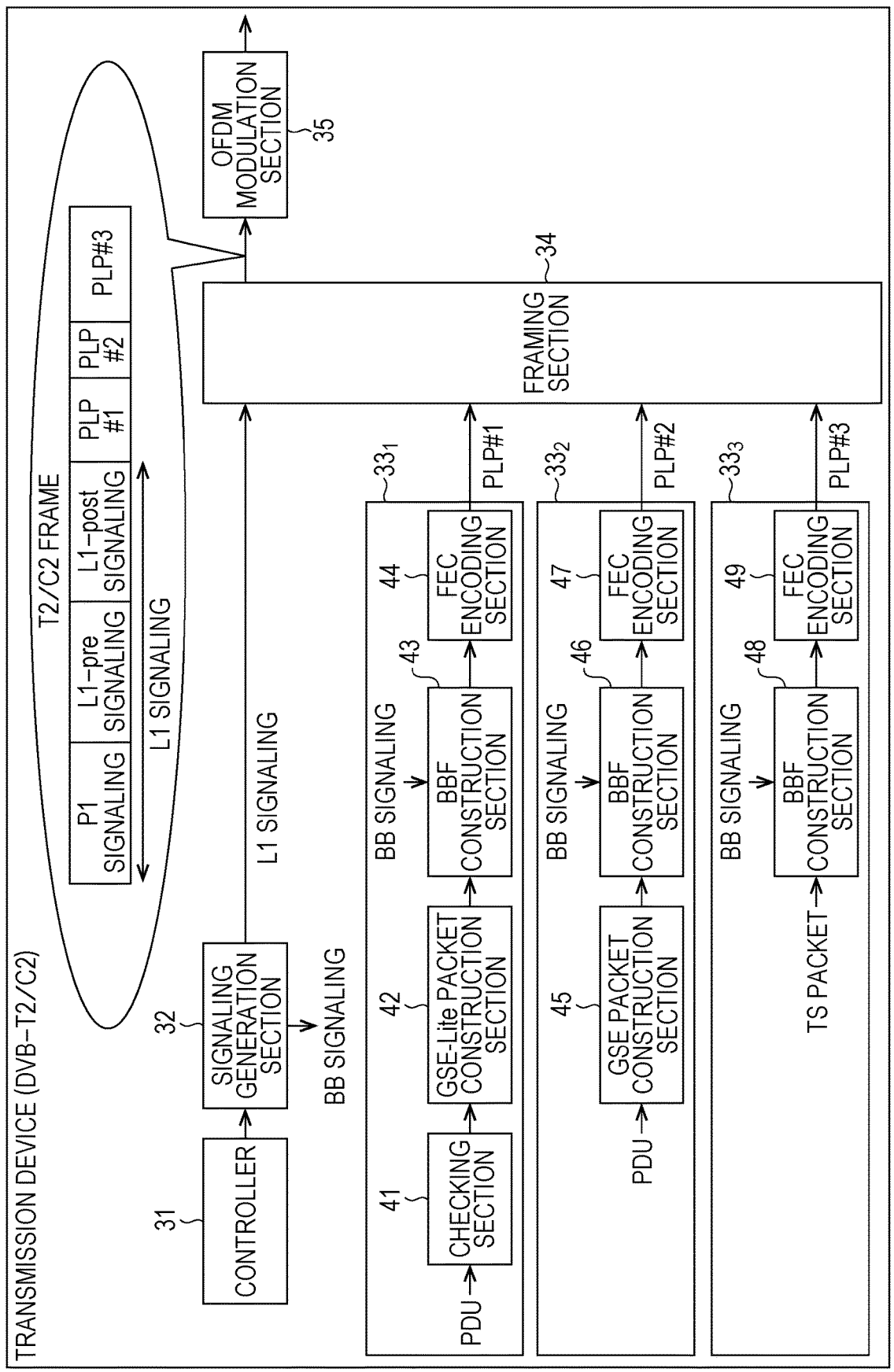
FIG. 9 is a block diagram illustrating a configuration example of a first embodiment of a transmission device according to the present technology.

FIG. 9 is a block diagram illustrating a configuration example of a first embodiment of a transmission device as a data processing apparatus according to the present technology.

In FIG. 9, the transmission device has a controller 31, a signaling generation section 32, data construction sections 331, 332, and 333, a framing section 34, and an OFDM (Orthogonal Frequency Division Multiplexing) modulation section 35, and performs, for example, broadcast complying with the DVB-T2 or the DVB-C2.

The controller 31 controls the signaling generation section 32 and other necessary blocks, in accordance with data and the like transmitted from the transmission device.

The signaling generation section 32 generates BB signaling and L1 signaling (P1 signaling, L1-pre signaling, L1-post signaling) appropriate for the data transmitted from the transmission device, in accordance with the control of the controller 31.

In addition, the signaling generation section 32 supplies the BB signaling to the BBF construction sections 43, 46, and 48, and supplies the L1 signaling to the framing section 34.

The data construction section 331 has a checking section 41, a GSE-Lite packet construction section 42, a BBF construction section 43, and a forward error correction (FEC) encoding section 44, and constructs a physical layer pipe (PLP) (hereinafter referred to as PLP#1) including a GSE-Lite packet, and supplies the PLP to the framing section 34.

The checking section 41 is supplied with the PDU such as the IP packet or the Ethernet frame included in the GSE-Lite packet (placed in the data field of the GSE-Lite packet).

The checking section 41 checks (verifies) whether the size of the PDU supplied thereto is equal to or less than the limit size which is determined in advance.

When the size of the PDU supplied to the checking section 41 is greater than the limit size, the checking section 41 performs a predetermined error process. Through the error process, for example, it is possible to discard the PDU of which the size is greater than the limit size, and it is possible to notify the higher layer that the PDU is more than the limit size.

When the size of the PDU supplied to the checking section 41 is equal to or less than the limit size, the checking section 41 supplies the PDU to the GSE-Lite packet construction section 42.

The GSE-Lite packet construction section 42 constructs the GSE packet in which the PDU sent from the checking section 41 is placed in the data field, that is, the GSE-Lite packet, and supplies the GSE packet to the BBF construction section 43.

Here, the GSE-Lite packet construction section 42 sent from the checking section 41 is supplied with only the PDU of which size is equal to or less than the limit size. Accordingly, the GSE-Lite packet construction section 42 constructs the GSE-Lite packet, which is the GSE packet complying with the DVB-GSE, by using, as a target, only the PDU of which the maximum size is limited to the limit size.

The BBF construction section 43 places the GSE-Lite packet, which is sent from the GSE-Lite packet construction section 42, in the data field, constructs the BBF in which the BB signaling sent from the signaling generation section 32 is placed in the BB header, and supplies the BBF to the FEC encoding section 44.

The FEC encoding section 44 performs FEC encoding which encodes the BBF sent from the BBF construction section 43 into a FEC code (error correction code (ECC)) such as a BCH code or an low-density parity-check (LDPC) code, and supplies the FEC frame (FECFRAME), which is an FEC code of the BBF obtained from the result of the FEC encoding, as the PLP#1 to the framing section 34.

In addition, when it can be secured that the maximum size of the PDU applied to the data construction section 331 is limited to the limit size in a certain method, the data construction section 331 can be configured without the checking section 41.

The data construction section 332 has a GSE packet construction section 45, a BBF construction section 46, and an FEC encoding section 47, and constructs the PLP (hereinafter referred to as PLP#2) including the GSE packet, and supplies the PLP to the framing section 34.

The GSE packet construction section 45 is supplied with the PDU such as the IP packet or the Ethernet frame included in the GSE packet (placed in the data field of the GSE packet).

The GSE packet construction section 45 constructs the GSE packet in which the PDU supplied thereto is placed in the data field, and supplies the GSE packet to the BBF construction section 46.

Here, the maximum size of the PDU supplied to the GSE packet construction section 45 is not limited to particularly the limit size. Accordingly, the PDU, of which the size is greater than the limit size, is supplied to the GSE packet construction section 45. As a result, a single PDU may be placed (encapsulated) in a plurality of GSE packets through the PDU fragmentation.

The BBF construction section 46 places the GSE packet, which is sent from the GSE packet construction section 45, in the data field, constructs the BBF in which the BB signaling sent from the signaling generation section 32 is placed in the BB header, and supplies the BBF to the FEC encoding section 47.

The FEC encoding section 47 performs the FEC encoding on the BBF which is sent from the BBF construction section 46, and supplies the FEC frame, which is obtained from the result thereof, as the PLP#2 to the framing section 34.

The data construction section 333 has a BBF construction section 48 and an FEC encoding section 49, and constructs the PLP (hereinafter referred to as PLP#3) including the transport stream (TS) packet, and supplies the PLP to the framing section 34.

The BBF construction section 48 is supplied with the TS packet.

The BBF construction section 48 places the TS packet, which is supplied thereto, in the data field, constructs the BBF in which the BB signaling sent from the signaling generation section 32 is placed in the BB header, and supplies the BBF to the FEC encoding section 49.

The FEC encoding section 49 performs the FEC encoding on the BBF which is sent from the BBF construction section 48, and supplies the FEC frame, which is obtained from the result thereof, as the PLP#3 to the framing section 34.

The framing section 34 constructs the T2 frame of the DVB-T2 or the C2 frame of the DVB-C2, which includes the L1 signaling sent from the signaling generation section 32 and at least one PLP such as the PLP#1 to PLP#3 respectively sent from the data construction sections 331 to 333, and supplies the frame to the OFDM modulation section 35.

The OFDM modulation section 35 performs the OFDM modulation on the T2 frame or the C2 frame sent from the framing section 34, and transmits the modulation signal which is obtained from the result thereof.

In addition, in the DVB-T2, in terms of PLP, it is possible to adopt FEC codes of which the parameters (such as an encoding ratio of the LDPC code as the FEC code) are different. Accordingly, the parameters of the FEC codes included the respective PLPs constituting the T2 frame are not restricted to be the same. It is the same for the DVB-C2.

Further, in the transmission device of FIG. 9, there is provided only one data construction section 331 as a data construction section which constructs the PLP including the GSE-Lite packet. However, it is possible to provide a plurality of data construction sections which constructs the PLPs including the GSE-Lite packet. It is the same for the data construction section, which constructs the PLP including the GSE packet, and the data construction section which constructs the PLP including the TS packet.

Furthermore, in the transmission device of FIG. 9, it is not essential to provide the data construction section 332, which constructs the PLP including the GSE packet, and the data construction section 333 which constructs the PLP including the TS packet.

Figure 10:
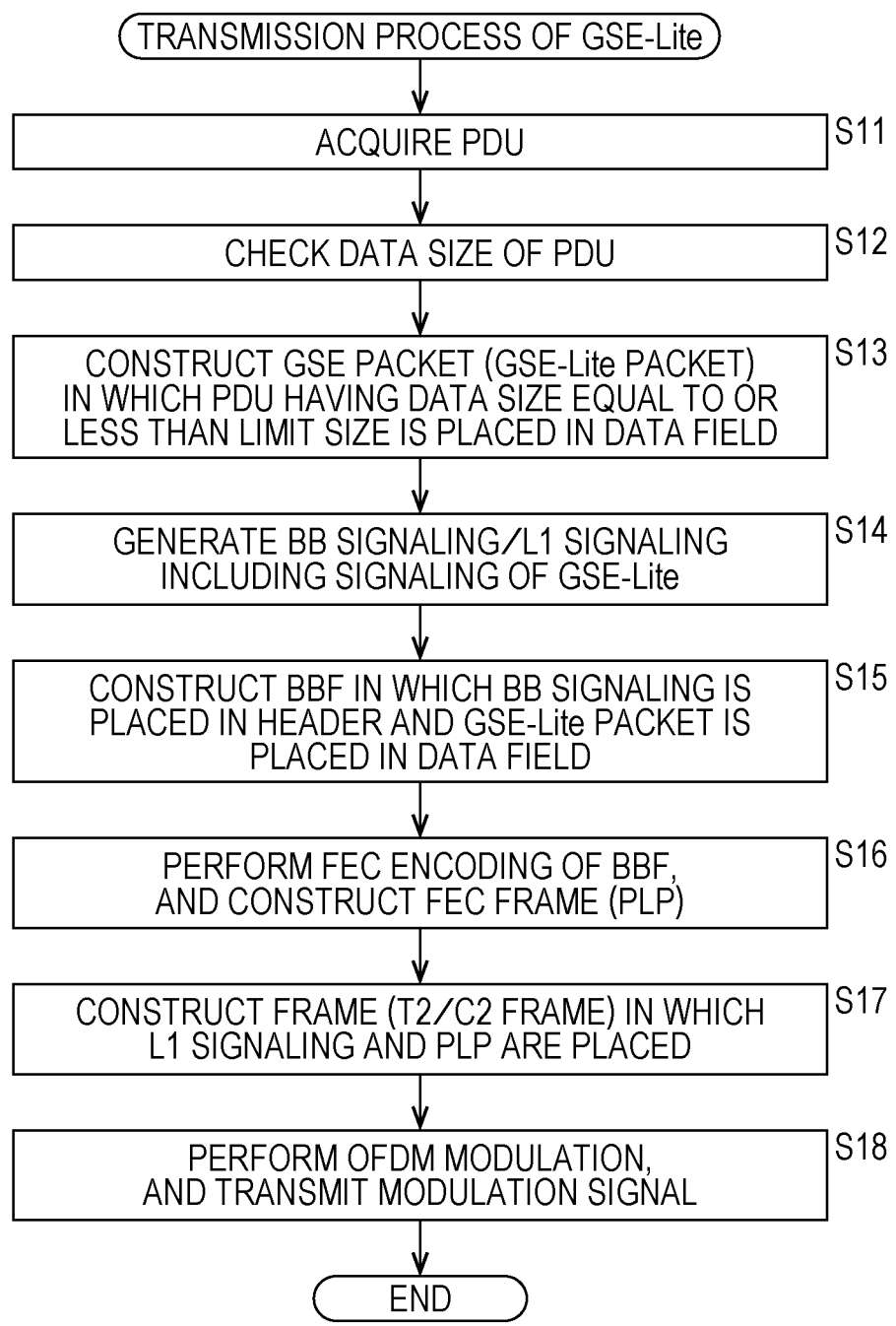
FIG. 10 is a flowchart illustrating a process (GSE-Lite transmission process) of a transmission device that transmits the GSE-Lite packets.

FIG. 10 is a flowchart illustrating a process (GSE-Lite transmission process) of the transmission device of FIG. 9 in a case of transmitting the GSE-Lite packets (the modulation signal including the GSE-Lite packets).

In steps S11 to S16, the data construction section 331 constructs the PLP#1 including the GSE-Lite packet, and supplies the PLP to the framing section 34.

That is, in step S11, the checking section 41 acquires the PDU including the GSE-Lite packet. Then, the process advances to step S12.

In step S12, the checking section 41 checks (verifies) the size of the PDU.

Then, if it is confirmed that the size of the PDU is greater than the limit size as a result of the checking of the size of the PDU, the checking section 41 performs a predetermined error process, and ends the GSE-Lite transmission process.

Further, if it is confirmed that the size of the PDU is equal to or less than the limit size, the checking section 41 supplies the PDU to the GSE-Lite packet construction section 42. Then, the process advances from step S12 to step S13.

In step S13, the GSE-Lite packet construction section 42 constructs the PDU sent from the checking section 41, that is, the GSE-Lite packet that is a GSE packet having the PDU of which the maximum size is limited to the limit size and which is placed in the data field, and supplies the PDU to the BBF construction section 43. Then, the process advances to step S14.

In step S14, the signaling generation section 32 generates the BB signaling and the L1 signaling in accordance with the control of the controller 31. Furthermore, the signaling generation section 32 supplies the BB signaling to the BBF construction section 43, and supplies the L1 signaling to the framing section 34. Then, the process advances from step S14 to step S15.

In addition, the BB signaling and the L1 signaling, which are generated by the signaling generation section 32, include the GSE-Lite signaling to be described later as necessary.

In step S15, the BBF construction section 43 places the GSE-Lite packet, which is sent from the GSE-Lite packet construction section 42, in the data field, constructs the BBF in which the BB signaling sent from the signaling generation section 32 is placed in the BB header, and supplies the BBF to the FEC encoding section 44. Then, the process advances to step S16.

In step S16, the FEC encoding section 44 performs the FEC encoding on the BBF sent from the BBF construction section 43, and supplies the FEC frame, which is obtained from the result thereof, as the PLP#1 to the framing section 34. Then, the process advances to step S17.

As described above, in the data construction section 331, the FEC frame including the GSE-Lite packet is constructed, and is supplied as the PLP#1 to the framing section 34. Concurrently, as necessary, for example, in the data construction section 332, the FEC frame including the GSE packet is constructed, and is supplied as the PLP#2 to the framing section 34, and in the data construction section 333, the FEC frame including the TS packet is constructed, and is supplied as the PLP#3 to the framing section 34.

In step S17, the framing section 34 constructs the T2 frame or the C2 frame, which includes the L1 signaling sent from the signaling generation section 32 and at least one PLP such as the PLP#1 to PLP#3 respectively sent from the data construction sections 331 to 333, and supplies the frame to the OFDM modulation section 35. Then, the process advances to step S18.

In step S18, the OFDM modulation section 35 performs the OFDM modulation on the T2 frame or the C2 frame sent from the framing section 34, and transmits the modulation signal which is obtained from the result thereof, and the GSE-Lite transmission process ends.

It should be noted that the GSE-Lite transmission process of FIG. 10 is repeatedly performed in a pipelined manner.

<GSE-Lite Signaling Based on DVB-T2 or DVB-C2>

When the GSE-Lite packet is transmitted by the GSE-Lite in which the DVB-GSE is restricted, in the reception device that receives the GSE-Lite packet, in order to appropriately process the GSE-Lite packet, it is desirable to transmit, together with the GSE-Lite packet, the GSE-Lite signaling which is signaling for indentifying whether the data is the GSE-Lite packet, in a layer (the data link layer or the physical layer) that is the data link layer or a layer lower than the data link layer in the OSI reference model.

In the DVB-T2 or the DVB-C2, the GSE-Lite signaling may be included in, for example, BB signaling that is present for each BBF, or L1-post signaling that is present for each PLP in the L1 signaling.

Figure 11:
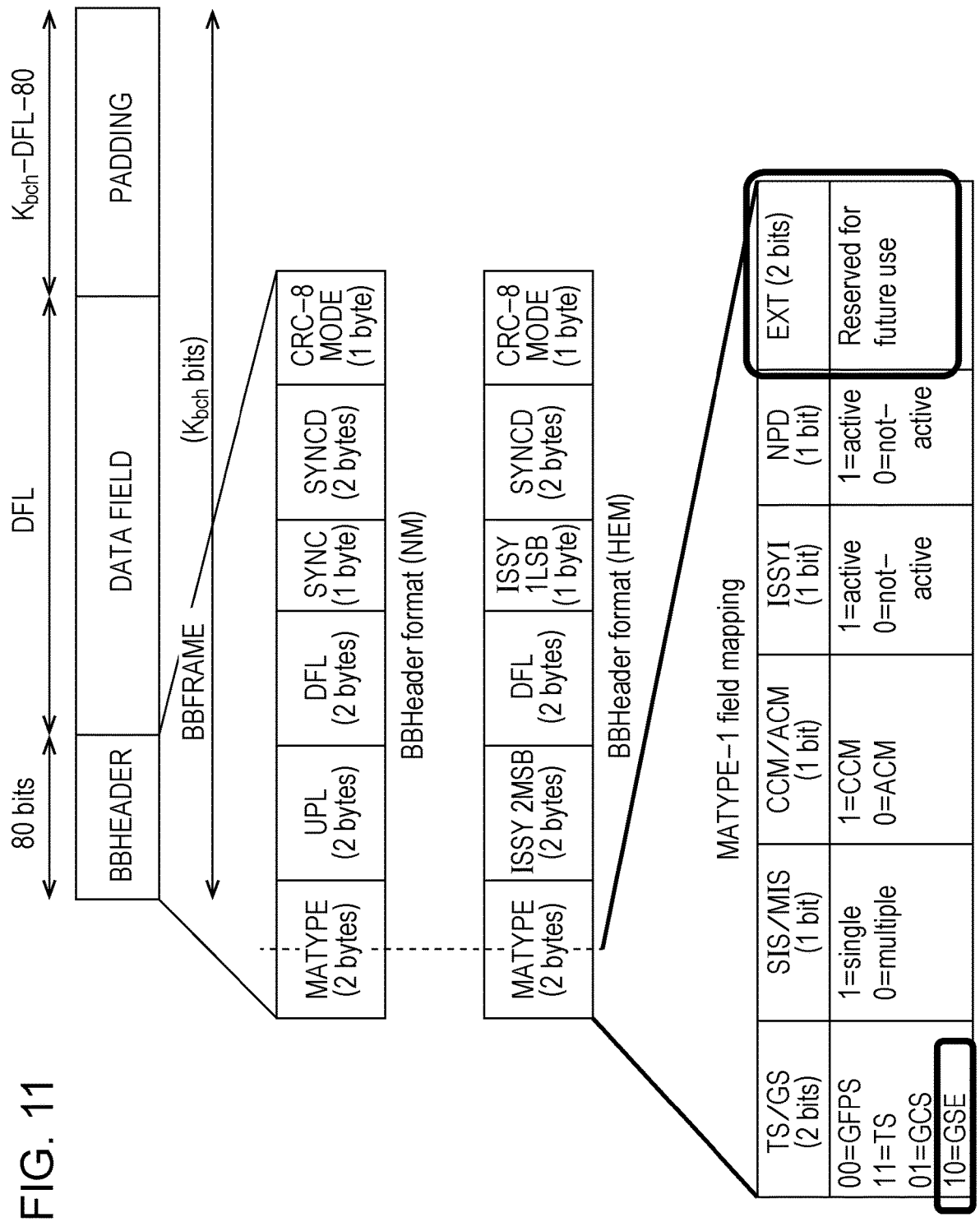
FIG. 11 is a diagram illustrating a first example of GSE-Lite signaling used in the DVB-T2 or the DVB-C2.

FIG. 11 is a diagram illustrating a first example of the GSE-Lite signaling (hereinafter referred to as first GSE-Lite signaling for T2/C2) used in the DVB-T2 or the DVB-C2.

That is, FIG. 11 shows BBF (BBFRAME) used in the DVB-T2 or the DVB-C2.

The BBF used in the DVB-T2 or the DVB-C2 includes the BB header (BBHEADER), the data field (DATA FIELD), and the necessary padding (PADDING).

The BB header of the BBF used in the DVB-T2 or the DVB-C2 is defined to include the BB header for NM, which is used when the PLP mode is a normal mode (NM), and the BB header for HEM which is used when the PLP mode is a high efficiency mode (HEM). Each of the BB header for NM and the BB header for HEM is 80-bit data.

The BB header for NM includes, side by side in the following order: a MATYPE with 2 bytes, a UPL with 2 bytes, a DFL with 2 bytes, a SYNC with 1 byte, a SYNCD with 2 bytes, and a CRC-8 MODE with 1 byte.

The BB header for HEM includes, side by side in the following order: a MATYPE with 2 bytes, an ISSY with 2 bytes, DFL with 2 bytes, an ISSYI with 1 byte, a SYNCD with 2 bytes, and a CRC-8 MODE with 1 byte.

The 1 byte at the leading end in the MATYPE with 2 bytes of the above-mentioned BB header is referred to as a MATYPE-1. In the MATYPE-1 with 1 byte, it is possible to allocate a TS/GS with 2 bits, a SIS/MIS with 1 bit, a CCM/ACM with 1 bit, an ISSYI with 1 bit, an NPD with 1 bit, and an EXT with 2 bits, in this order.

In the DVB-T2 and the DVB-C2, the following contents are prescribed. When the BBF includes the TS packet (when the TS packet is placed in the BBF data field), the TS/GS is set to 11 (binary digit). When the BBF includes the GSE packet, the TS/GS is set to 10.

Further, in the DVB-T2 and the DVB-C2, currently, the EXT is unused (undefined) (Reserved).

In the GSE-Lite signaling, for example, the TS/GS and the unused EXT are available.

That is, as the GSE-Lite signaling, for example, it is possible to adopt a way of setting the TS/GS to 10, which indicates the GSE packet, and setting the unused EXT to 11 (binary digit) or the like as a specific value.

According to the corresponding GSE-Lite signaling, in the case where the TS/GS is set to 10 and the EXT is set to 11 as a specific value, it is possible to identify that (data of) the BBF data field is the GSE-Lite packet (the BBF includes the GSE-Lite packet).

Further, when the TS/GS is set to 10 and the EXT is set as a value other than 11 as a specific value, it can be identified that (data of) the BBF data field is the GSE packet (the BBF includes the GSE packet).

Figure 12:
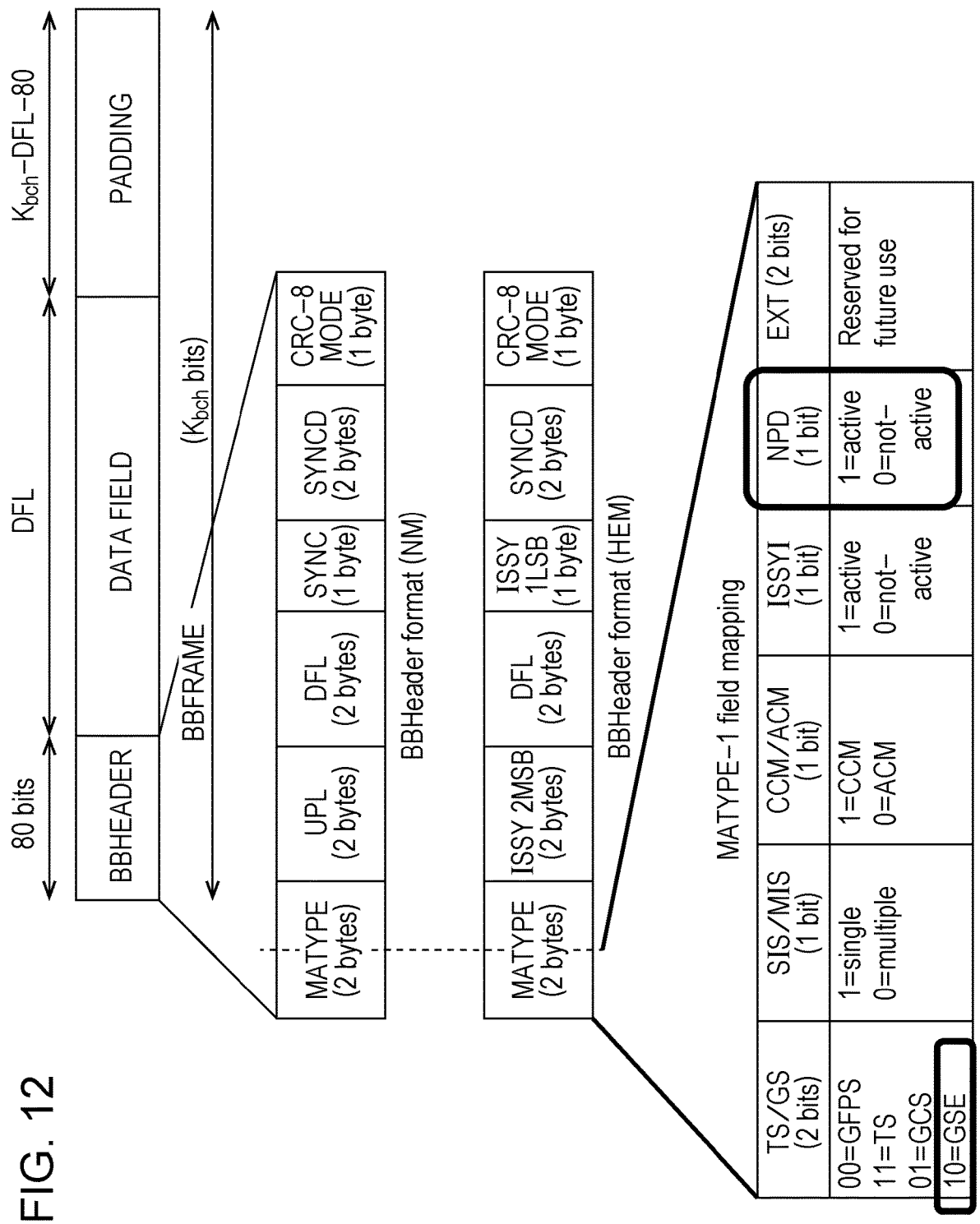
FIG. 12 is a diagram illustrating a second example of the GSE-Lite signaling used in the DVB-T2 or the DVB-C2.

FIG. 12 is a diagram illustrating a second example of the GSE-Lite signaling (hereinafter referred to as second GSE-Lite signaling for T2/C2) used in the DVB-T2 or the DVB-C2.

That is, FIG. 12 shows, as in FIG. 11, the BBF used in the DVB-T2 or the DVB-C2.

As described in FIG. 11, the MATYPE-1 with 1 byte at the leading end in the MATYPE with 2 bytes of the BB header includes the TS/GS with 2 bits and the NPD with 1 bit. When the TS/GS is set to 10 indicating the BBF includes the GSE packet, in the existing DVB-T2 or DVB-C2, the NPD does not function (the NPD functions when the BBF includes the TS packet).

Therefore, in the GSE-Lite signaling, the TS/GS and the NPD, which does not function when the TS/GS is 10, are available.

That is, when the BBF data field is the GSE packet or the GSE-Lite packet, the TS/GS is set to 10, and the NPD can be set on the basis of which one of the GSE packet and the GSE-Lite packet is the BBF data field.

Specifically, for example, when the BBF data field is the GSE packet, the NPD can be set to 0 (binary digit), and when the BBF data field is the GSE-Lite packet, the NPD can be set to 1.

According to the corresponding GSE-Lite signaling, when the TS/GS is set to 10 and the NPD is set to 1, it can be identified that the BBF data field is the GSE-Lite packet.

Further, when the TS/GS is set to 10 and the NPD is set to 0, it can be identified that the BBF data field is the GSE packet.

Figure 13:
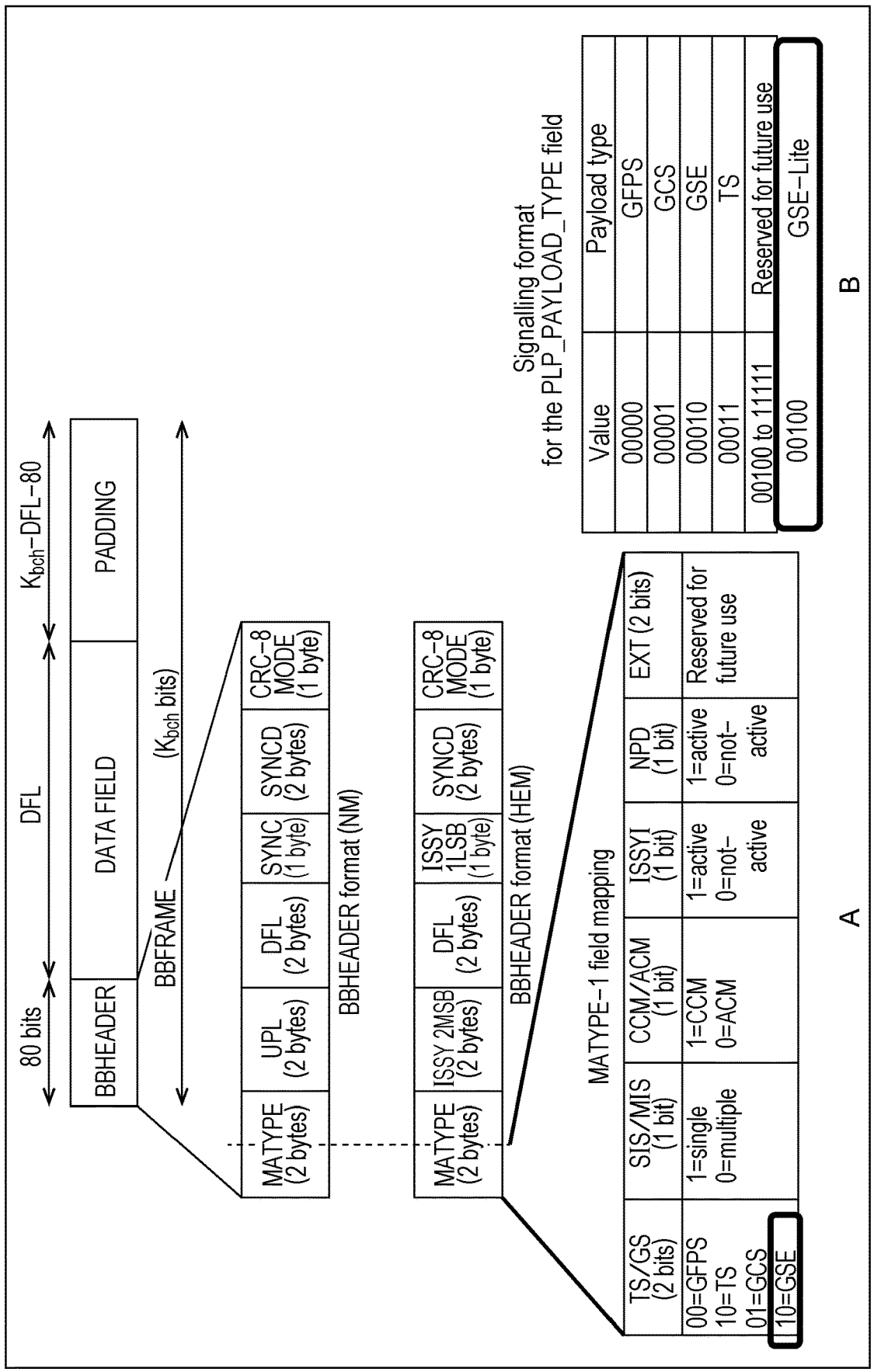
FIG. 13 is a diagram illustrating a third example of the GSE-Lite signaling used in the DVB-T2 or the DVB-C2.

FIG. 13 is a diagram illustrating a third example of the GSE-Lite signaling (hereinafter referred to as third GSE-Lite signaling for T2/C2) used in the DVB-T2 or the DVB-C2.

That is, FIG. 13A shows, as in FIG. 11, the BBF used in the DVB-T2 or the DVB-C2, and FIG. 13B shows the PLP_PAYLOAD_TYPE included in the L1-post signaling.

The PLP_PAYLOAD_TYPE is set for each PLP included in the T2 frame or the C2 frame where the L1-post signaling including the PLP_PAYLOAD_TYPE is placed, and indicates data which is included in the corresponding PLP.

The PLP_PAYLOAD_TYPE is information with 5 bits. Currently, in the DVB-T2 and the DVB-C2, four values are 00000 to 00011 (binary digits).

For example, the following contents are prescribed. When the PLP includes the TS packet, the PLP_PAYLOAD_TYPE is set to 00011. When the PLP includes the GSE packet, the PLP_PAYLOAD_TYPE is set to 00010.

Further, currently, in the DVB-T2 and the DVB-C2, 00100 to 11111 are unused for the PLP_PAYLOAD_TYPE.

Consequently, in the GSE-Lite signaling, the PLP_PAYLOAD_TYPE is available.

That is, as the GSE-Lite signaling, for example, it is possible to adopt a way of setting the PLP_PAYLOAD_TYPE to 00100 or the like as a specific value among unused values.

According to the corresponding GSE-Lite signaling, when the PLP_PAYLOAD_TYPE is set to 00100 as a specific value, it can be identified that the BBF data field included in the PLP is the GSE-Lite packet.

In addition, in a case of adopting the GSE-Lite signaling (third GSE-Lite signaling for T2/C2) using the PLP_PAYLOAD_TYPE, when the PLP_PAYLOAD_TYPE is set to 00100 as a specific value, that is, when the BBF data field included in the PLP is the GSE-Lite packet, the TS/GS, which is included in the BB header of the BBF where the GSE-Lite packet is placed, is set to 10 that indicates, for example, the GSE packet. The reason is that the GSE-Lite packet complies with not only the GSE-Lite but also the DVB-GSE.

Further, in the DVB-T2 and the DVB-C2, as the GSE-Lite signaling, each of the first to third GSE-Lite signalings for T2/C2 is separately used. Besides, the first and third GSE-Lite signalings for T2/C2 are used in combination, or the second and third GSE-Lite signalings for T2/C2 are used in combination.

When the first or second GSE-Lite signaling for T2/C2 is separately used, referring to the BB header of the BBF, it is possible to identify whether the BBF data field is the GSE-Lite packet.

Further, when the third GSE-Lite signaling for T2/C2 is separately used, referring to the L1-post signaling of the T2 frame or the C2 frame, it is possible to identify whether the data of the PLP included in the T2 frame or the C2 frame is the GSE-Lite packet.

When the first and third GSE-Lite signalings for T2/C2 are used in combination, and when the second and third GSE-Lite signalings for T2/C2 are used in combination, in either of a way of referring to the L1-post signaling of the T2 frame or the C2 frame or a way of referring to the BB header of the BBF, it is possible to identify whether the data is the GSE-Lite packet.

In the transmission device of FIG. 9, the signaling generation section 32 generates the BB signaling, which includes the above-mentioned GSE-Lite signaling, and the L1-post signaling (L1 signaling including the L1-post signaling) in the BBF constructed by the BBF construction section 43 or in the PLP#1 constructed by the data construction section 331.

As described above, by generating the GSE-Lite signaling, inserting the signaling into the T2 frame or the C2 frame, and transmitting the signaling together with the BBF (the PLP including the BBF), in the reception device that receives the T2 frame or the C2 frame, on the basis of the GSE-Lite signaling, it is possible to easily identify whether the BBF data field included in the T2 frame or the C2 frame is the GSE-Lite packet.

That is, in order to identify that the BBF data field is the GSE-Lite packet, it is possible to identify whether the BBF data field is the GSE-Lite packet without providing a complex rule or a logic, which analyzes the BBF data field, in the reception device.

<First Embodiment of Reception Device According to Present Technology>

Figure 14:
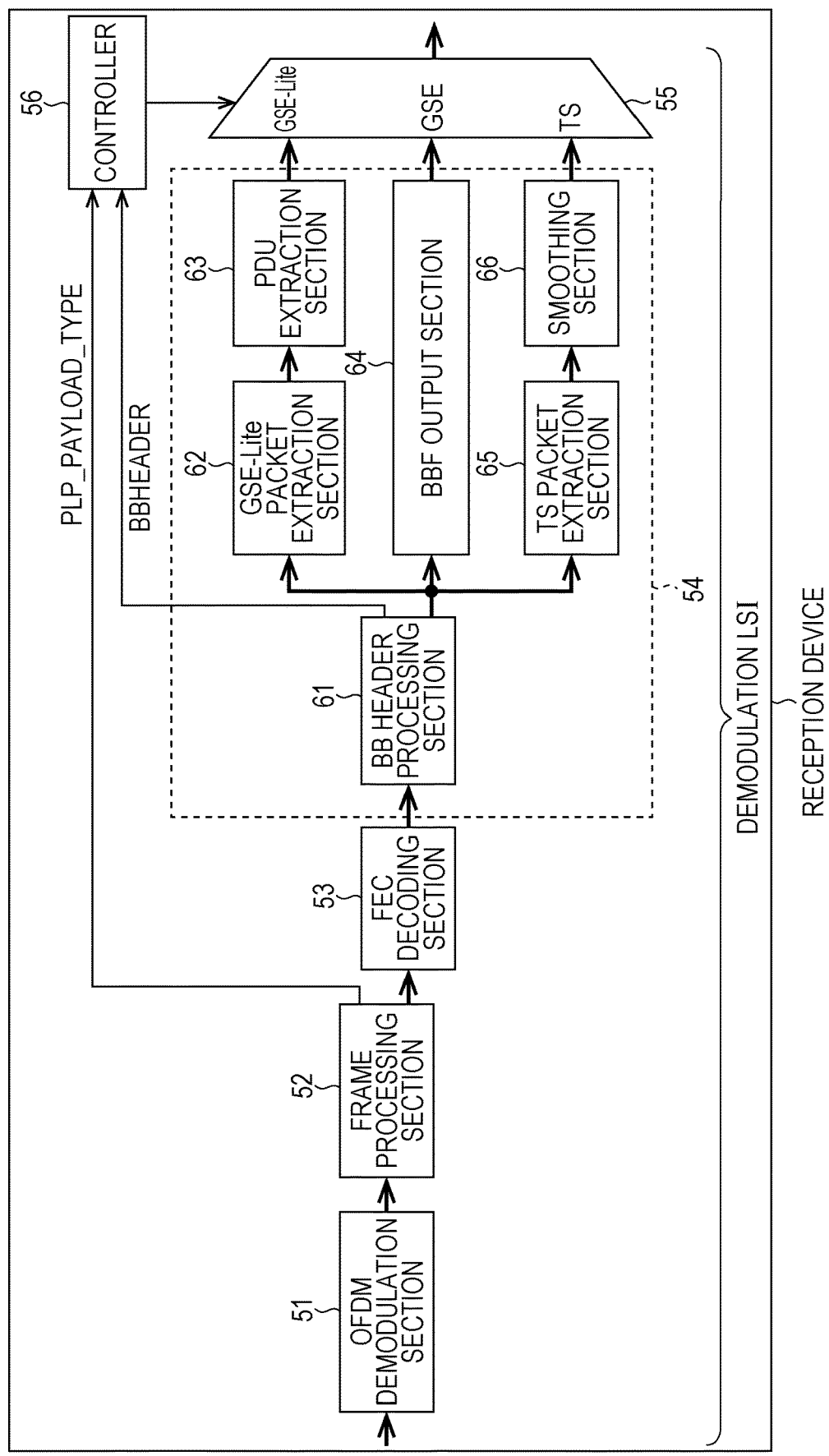
FIG. 14 is a block diagram illustrating a configuration example of the first embodiment of the reception device according to the present technology.

FIG. 14 is a block diagram illustrating a configuration example of the first embodiment of the reception device as the data processing apparatus according to the present technology.

In FIG. 14, the reception device has an OFDM demodulation section 51, a frame processing section 52, an FEC decoding section 53, a stream processing section 54, an output section 55, and a controller 56, and receives, for example, broadcast complying with the DVB-T2 or the DVB-C2.

The OFDM modulation section 51 functions as a reception section that receives the modulation signal which is transmitted from the transmission device of FIG. 9. The OFDM modulation section 51 receives the modulation signal which is transmitted from the transmission device of FIG. 9, performs the OFDM demodulation thereon, and supplies the T2 frame or the C2 frame, which is obtained from the result thereof, to the frame processing section 52.

The frame processing section 52 extracts a desired PLP from the T2 frame or the C2 frame, which is sent from the OFDM demodulation section 51, in accordance with, for example, user's operation, and supplies the PLP to the FEC decoding section 53.

Further, when the third GSE-Lite signaling for T2/C2 is adopted, the frame processing section 52 extracts the PLP_PAYLOAD_TYPE of the PLP, which is extracted from the T2 frame or the C2 frame, from the L1-post signaling included in the T2 frame or the C2 frame, and supplies the PLP_PAYLOAD_TYPE to the controller 56.

The FEC decoding section 53 performs, for example, LDPC decoding or BCH decoding as FEC decoding of the FEC frame, on the PLP, which is sent from the frame processing section 52, as the FEC frame which is a target subjected to the FEC decoding for error correction, and supplies the BBF, which is obtained from the result thereof, to the stream processing section 54.

The stream processing section 54 has a BB header processing section 61, a GSE-Lite packet extraction section 62, a PDU extraction section 63, a BBF output section 64, a TS packet extraction section 65, and a smoothing section 66.

The stream processing section 54 processes the BBF from the FEC decoding section 53, and outputs the TS packet or the GSE-Lite packet included in the BBF to the output section 55. Alternatively, the stream processing section 54 outputs the BBF, which is sent from the FEC decoding section 53, to the output section 55 as it is.

That is, the BB header processing section 61 is supplied from the BBF sent from the FEC decoding section 53.

The BB header processing section 61 controls necessary blocks constituting the stream processing section 54 in accordance with the BB header of the BBF which is sent from the FEC decoding section 53.

Further, the BB header processing section 61 supplies the BBF, which is sent from the FEC decoding section 53, to the GSE-Lite packet extraction section 62, the BBF output section 64, and the TS packet extraction section 65.

Furthermore, when the first or second GSE-Lite signaling for T2/C2 is adopted, the BB header processing section 61 extracts the BB header (BBHEADER) (BB signaling) (FIG. 11, FIG. 12), and supplies the BB header to the controller 56.

The GSE-Lite packet extraction section 62 extracts, from the BBF sent from the BB header processing section 61, the GSE-Lite packet, which is placed in the data field of the BBF, and supplies the packet to the PDU extraction section 63.

The PDU extraction section 63 extracts, from the GSE-Lite packet sent from the GSE-Lite packet extraction section 62, the PDU (the PDU of which the size is equal to or less than the limit size) such as the IP packet or the Ethernet packet which is placed in the data field of the GSE-Lite packet, and outputs the PDU to the output section 55.

The BBF output section 64 outputs the BBF, which is sent from the BB header processing section 61, to the output section 55.

The TS packet extraction section 65 extracts, from the BBF sent from the BB header processing section 61, the TS packet which is placed in the data field of the BBF, and supplies the TS packet to the smoothing section 66.

The smoothing section 66 performs smoothing on the TS packet sent from the TS packet extraction section 65, and outputs the packet to the output section 55.

The output section 55 selectively provides one output of the outputs of the PDU extraction section 63, the BBF output section 64, and the smoothing section 66, in accordance with the control of the controller 56.

The controller 56 controls the respective blocks constituting the reception device as necessary.

For example, the controller 56 identifies which one of the GSE-Lite packet, the TS packet, and the GSE packet (or the other data) is the BBF data field supplied from the FEC decoding section 53 to the stream processing section 54, on the basis of the PLP_PAYLOAD_TYPE sent from the frame processing section 52 or the MATYPE-1 of the BB header sent from the BB header processing section 61. On the basis of the identification result, the controller 56 controls the output section 55.

That is, when the first GSE-Lite signaling for T2/C2 is adopted, if the TS/GS of the MATYPE-1 of the BB header sent from the BB header processing section 61 is 10 that indicates the GSE packet and if the EXT is 11 as a specific value that indicates the GSE-Lite packet (FIG. 11), the controller 56 identifies that the BBF data field supplied to the stream processing section 54 is the GSE-Lite packet.

Further, when the second GSE-Lite signaling for T2/C2 is adopted, if the TS/GS of the MATYPE-1 of the BB header sent from the BB header processing section 61 is 10 that indicates the GSE packet and if the NPD is 1 as a specific value that indicates the GSE-Lite packet (FIG. 12), the controller 56 identifies that the BBF data field supplied to the stream processing section 54 is the GSE-Lite packet.

Furthermore, when the third GSE-Lite signaling for T2/C2 is adopted, if the PLP_PAYLOAD_TYPE sent from the frame processing section 52 is 00100 as a specific value that indicates the GSE-Lite packet (FIG. 13), the controller 56 identifies that the BBF data field supplied to the stream processing section 54 is the GSE-Lite packet.

Further, if the TS/GS of the MATYPE-1 of the BB header sent from the BB header processing section 61 is 11 indicates the TS packet (FIG. 11, FIG. 12), or if the PLP_PAYLOAD_TYPE sent from the frame processing section 52 is 00011 that indicates the TS packet (FIG. 13), the controller 56 identifies that the BBF data field supplied to the stream processing section 54 is the TS packet.

Furthermore, the TS/GS of the MATYPE-1 of the BB header sent from the BB header processing section 61 may be 10 that indicates the GSE packet, and the EXT may be other than 11 as a specific value that indicates the GSE-Lite packet (FIG. 11). The TS/GS of the MATYPE-1 may be 10 that indicates the GSE packet, and the NPD may be other than 1 as a specific value that indicates the GSE-Lite packet (FIG. 12). The PLP_PAYLOAD_TYPE sent from the frame processing section 52 may be 0001 that indicates the GSE packet (FIG. 13). In any of the cases, the controller 56 identifies that the BBF data field supplied to the stream processing section 54 is the GSE packet.

If it is identified that the BBF data field supplied to the stream processing section 54 is the GSE-Lite packet, the controller 56 controls the output section 55 so as to select the output of the PDU extraction section 63, for the BBF.

As a result, for the BBF supplied to the stream processing section 54, the output section 55 selectively outputs the PDU which is output by the PDU extraction section 63 and is placed in the GSE-Lite packet included in the BBF and of which the size is equal to or less than the limit size.

Further, if it is identified that the BBF data field supplied to the stream processing section 54 is the TS packet, for the BBF, the controller 56 controls the output section 55 so as to select the output of the smoothing section 66.

As a result, for the BBF supplied to the stream processing section 54, the output section 55 selectively outputs the TS packet which is output by the smoothing section 66 and is included in the BBF.

Furthermore, if it is identified that the BBF data field supplied to the stream processing section 54 is the GSE packet, for the BBF, the controller 56 controls the output section 55 so as to select the output of the BBF output section 64.

As a result, for the BBF supplied to the stream processing section 54, the output section 55 selectively outputs the BBF itself which is output by the BBF output section 64.

It can be should be noted that the above-mentioned sections from the OFDM demodulation section 51 to the controller 56 can be formed as a demodulation LSI which is a single-chip LSI.

As described above, in the reception device, it is possible to easily identify whether the BBF data field is the GSE-Lite packet, on the basis of the TS/GS of the MATYPE-1 of the BB header and EXT, the TS/GS and the NPD, or the PLP_PAYLOAD_TYPE as the GSE-Lite signaling.

Further, in the reception device, if the BBF data field is the GSE packet, the BBF is output to the outside as it is. Therefore, such a BBF can be processed in the outside.

Consequently, for the GSE packet, backward compatibility is secured, and it is possible to process the GSE packet flexibly.

Figure 15:
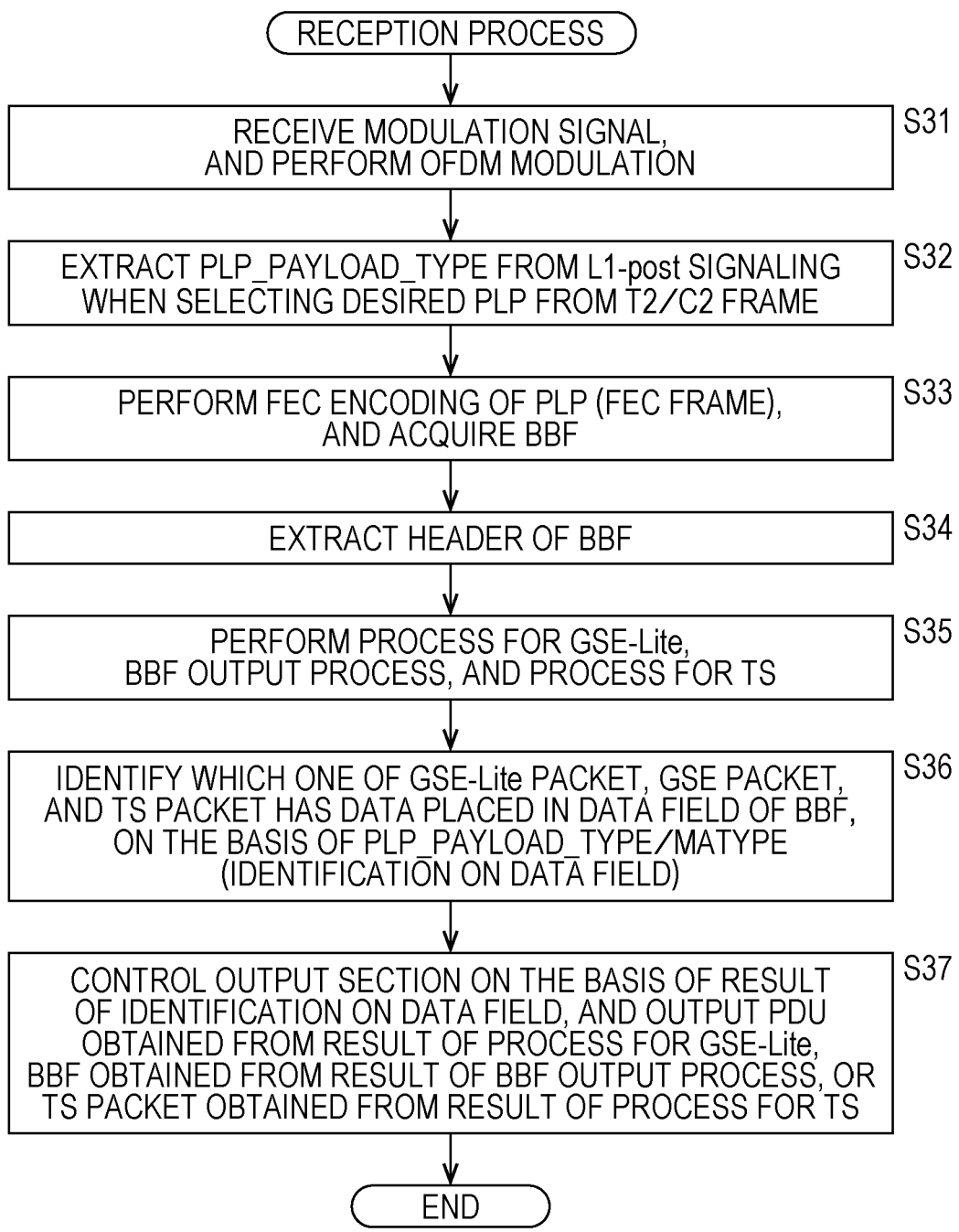
FIG. 15 is a flowchart illustrating a process (reception process) of the reception device.

FIG. 15 is a flowchart illustrating a process (reception process) of the reception device of FIG. 14.

In step S31, the OFDM modulation section 51 receives the modulation signal which is transmitted from the transmission device of FIG. 9, performs the OFDM demodulation thereon, and supplies the T2 frame or the C2 frame, which is obtained from the result thereof, to the frame processing section 52. Then, the process advances to step S32.

In step S32, the frame processing section 52 extracts a desired PLP from the T2 frame or the C2 frame, which is sent from the OFDM demodulation section 51, in accordance with, for example, user's operation, and supplies the PLP to the FEC decoding section 53.

Further, the frame processing section 52 extracts the PLP_PAYLOAD_TYPE of the PLP, which is extracted from the T2 frame or the C2 frame, from the L1-post signaling included in the T2 frame or the C2 frame, and supplies the PLP_PAYLOAD_TYPE as GSE-Lite signaling to the controller 56. Then, the process advances from step S32 to step S33.

In step S33, the FEC decoding section 53 performs, for example, the FEC decoding, on the PLP, which is sent from the frame processing section 52, as the FEC frame, and supplies the BBF, which is obtained from the result thereof, to the stream processing section 54. Then, the process advances to step S34.

In step S34, in the stream processing section 54, the BB header processing section 61 extracts the BB header (FIG. 11, FIG. 12) from the BBF which is sent from the FEC decoding section 53, and supplies the BB header as the GSE-Lite signaling to the controller 56.

Furthermore, the BB header processing section 61 supplies the BBF, which is sent from the FEC decoding section 53, to the GSE-Lite packet extraction section 62, the BBF output section 64, and the TS packet extraction section 65. Then, the process advances from step S34 to step S35.

In step S35, a process for GSE-Lite, a BBF output process, and a process for TS are performed. Then, the process advances to step S36.

Here, in the process for GSE-Lite, the GSE-Lite packet extraction section 62 assumes that the BBF sent from the BB header processing section 61 includes the GSE-Lite packet, extracts the GSE-Lite packet from the BBF, and supplies the packet to the PDU extraction section 63. The PDU extraction section 63 extracts the PDU from the GSE-Lite packet sent from the GSE-Lite packet extraction section 62, and outputs the packet to the output section 55.

In the BBF output process, the BBF output section 64 outputs the BBF, which is sent from the BB header processing section 61, to the output section 55.

In the process for TS, the TS packet extraction section 65 assumes that the BBF sent from the BB header processing section 61 includes the TS packet, extracts the TS packet from the BBF, and supplies the TS packet to the smoothing section 66. The smoothing section 66 performs smoothing on the TS packet sent from the TS packet extraction section 65, and outputs the packet to the output section 55.

In step S36, the controller 56 performs the identification on the data field that identifies which one of the GSE-Lite packet, the TS packet, and the GSE packet is the BBF data field previously supplied from the FEC decoding section 53 to the stream processing section 54, on the basis of the PLP_PAYLOAD_TYPE sent from the frame processing section 52 or the MATYPE-1 of the BB header sent from the BB header processing section 61 as the GSE-Lite signaling. Then, the process advances to step S37.

In step S37, the controller 56 controls the output section 55 on the basis of the identification result of the identification on the data field of step S36. Thereby, the output section 55 selectively provides one output of the outputs of the PDU extraction section 63, the BBF output section 64, and the smoothing section 66, and the reception process ends.

That is, the output section 55 selectively outputs the PDU, the BBF, or the TS packet, in accordance with the control of the controller 56. The PDU is output by the PDU extraction section 63, and is obtained from the result of the process for GSE-Lite. The BBF is output by the BBF output section 64, and is obtained from the result of the BBF output process. The TS packet is output by the smoothing section 66, and is obtained from the result of the process for TS.

It should be noted that the reception process of FIG. 15 is repeatedly performed in a pipelined manner.

Further, in FIG. 15, in step S35, all of the process for GSE-Lite, the BBF output process, and the process for TS are performed, and thereafter, in step S36, the identification on the data field is performed that identifies which one of the GSE-Lite packet, the TS packet, and the GSE packet is the BBF data field, on the basis of the PLP_PAYLOAD_TYPE or the MATYPE-1 as the GSE-Lite signaling. However, by performing the identification on the data field first, it may be possible to perform only any one of the process for GSE-Lite, the BBF output process, and the process for TS, on the basis of the identification result.

That is, if it is identified that, as the result of the identification on the data field, the BBF data field is the GSE-Lite packet, it is possible to perform only the process for GSE-Lite among the process for GSE-Lite, the BBF output process, and the process for TS.

Likewise, if it is identified that, as the result of the identification on the data field, the BBF data field is the GSE packet, it is possible to perform only the BBF output process, and if it is identified that the BBF data field is the TS packet, it is possible to perform only the process for TS.

<Second Embodiment of Transmission Device According to Present Technology>

Figure 16:
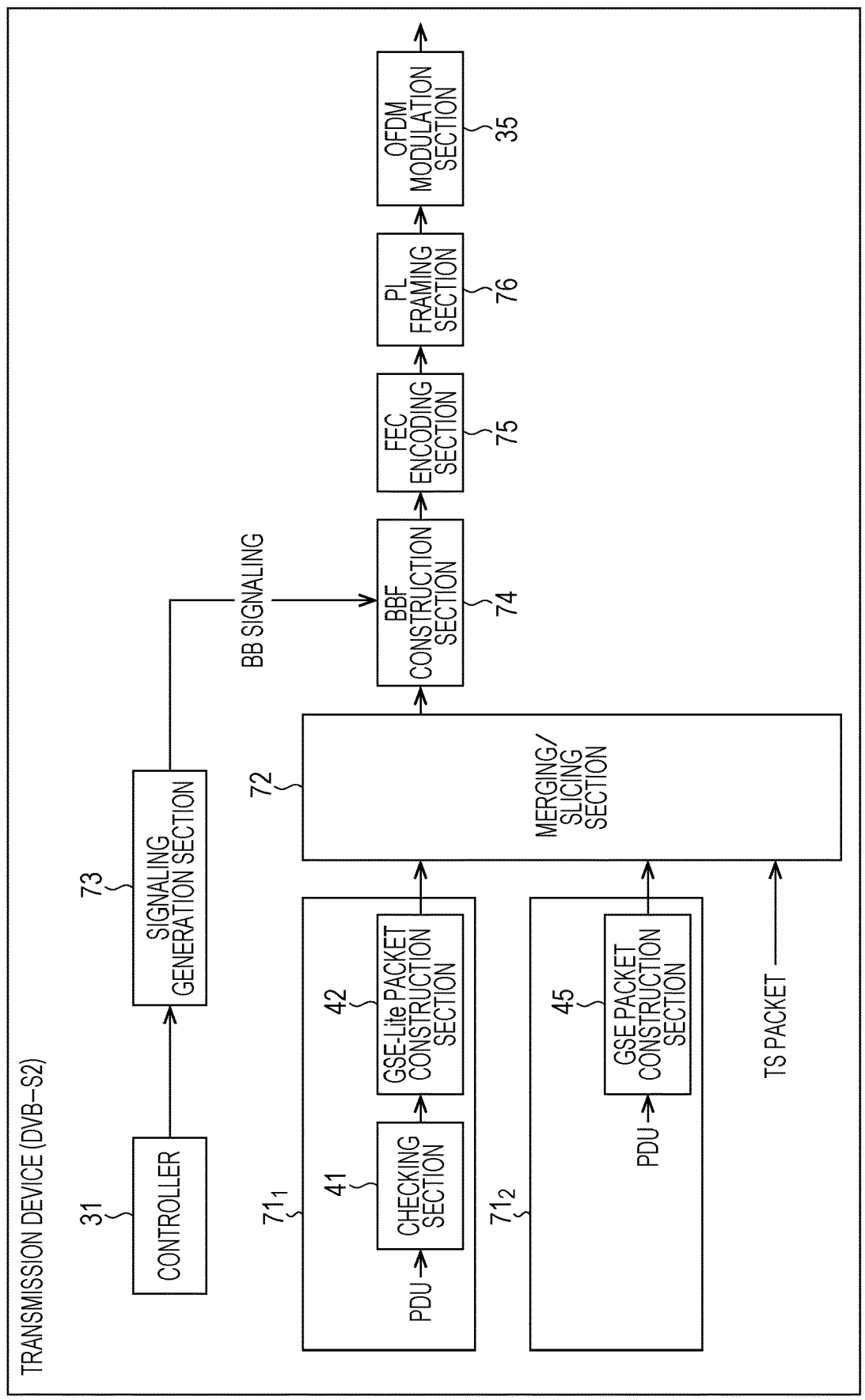
FIG. 16 is a block diagram illustrating a configuration example of a second embodiment of the transmission device according to the present technology.

FIG. 16 is a block diagram illustrating a configuration example of a second embodiment of the transmission device as the data processing apparatus according to the present technology.

It should be noted that, in the drawing, portions corresponding to the portions in the case of FIG. 9 will be referenced by the same numerals and signs, and thus hereinafter the description thereof will be appropriately omitted.

In FIG. 16, the transmission device has the controller 31, the OFDM modulation section 35, data construction sections 711 and 712, a merging/slicing section 72, a signaling generation section 73, a BBF construction section 74, a FEC encoding section 75, and a physical layer (PL) framing section 76, and performs, for example, broadcast complying with the DVB-S2.

The data construction section 711 has the checking section 41, and the GSE-Lite packet construction section 42, constructs the GSE-Lite packet, and supplies the packet to the merging/slicing section 72.

That is, the checking section 41 is supplied with the PDU, and the checking section 41 checks (verifies), as in FIG. 9, whether the size of the PDU supplied thereto is equal to or less than the limit size which is determined in advance, and supplies the PDU, of which the size is equal to or less than the limit size to the GSE-Lite packet construction section 42.

The GSE-Lite packet construction section 42 constructs, as in FIG. 9, the GSE packet in which the PDU sent from the checking section 41 is placed in the data field, that is, the GSE-Lite packet, and supplies the GSE packet to the merging/slicing section 72.

In addition, as in FIG. 9, when it is guaranteed that the maximum size of the PDU applied to the data construction section 711 is limited to the limit size in a certain method, the data construction section 711 can be configured without the checking section 41.

The data construction section 712 has the GSE packet construction section 45, constructs the GSE packet, and supplies the packet to the merging/slicing section 72.

That is, the GSE packet construction section 45 is supplied with the PDU, and the GSE packet construction section 45 constructs the GSE packet in which the PDU supplied thereto is placed in the data field, and supplies the packet to the merging/slicing section 72.

As described above, the merging/slicing section 72 is supplied with the GSE-Lite packet from the data construction section 711, and is supplied with the GSE packet from the data construction section 712. Furthermore, the merging/slicing section 72 is supplied with the TS packet from the outside.

The merging/slicing section 72 merges or slices the GSE-Lite packet, the GSE packet, or the TS packet supplied thereto, as necessary, and supplies the packet to the BBF construction section 74.

The signaling generation section 73 generates the BB signaling appropriate for the data, which is transmitted from the transmission device, in accordance with the control of the controller 31, and supplies the signaling to the BBF construction section 74.

The BBF construction section 74 places the GSE-Lite packet, the GSE packet, or the TS packet, which is supplied from the merging/slicing section 72, in the data field, constructs the BBF in which the BB signaling sent from the signaling generation section 73 is placed in the BB header, and supplies the BBF to the FEC encoding section 75.

The FEC encoding section 75 performs the FEC encoding on the BBF sent from the BBF construction section 74, in a similar manner to the FEC encoding section 44, 47, or 49 of FIG. 9, and supplies the FEC frame (FECFRAME), which is the FEC code of the BBF obtained from the result of the FEC encoding, to the PL framing section 76.

The PL framing section 76 constructs the PL frame (PLFRAME) of the DVB-S2 including the FEC frame sent from the FEC encoding section 75, and supplies the frame to the OFDM modulation section 35.

In addition, in the DVB-S2, in terms of PLP, it is possible to adopt FEC codes of which the parameters (such as an encoding ratio of the LDPC code as the FEC code) are different.

Further, in the transmission device of FIG. 16, there is provided only one data construction section 711 as a data construction section which constructs the GSE-Lite packet. However, it is possible to provide a plurality of data construction sections which constructs the PLPs including the GSE-Lite packet. It is the same for the data construction section which constructs the GSE packet.

Furthermore, in FIG. 16, the merging/slicing section 72 is supplies with (a stream of) monophyletic TS packets, but the merging/slicing section 72 can be supplied with polyphyletic TS packets.

Moreover, in the reception device of FIG. 16, it is not essential to provide the data construction section 712, which constructs the GSE packet, or to supply the TS packet to the merging/slicing section 72.

Figure 17:
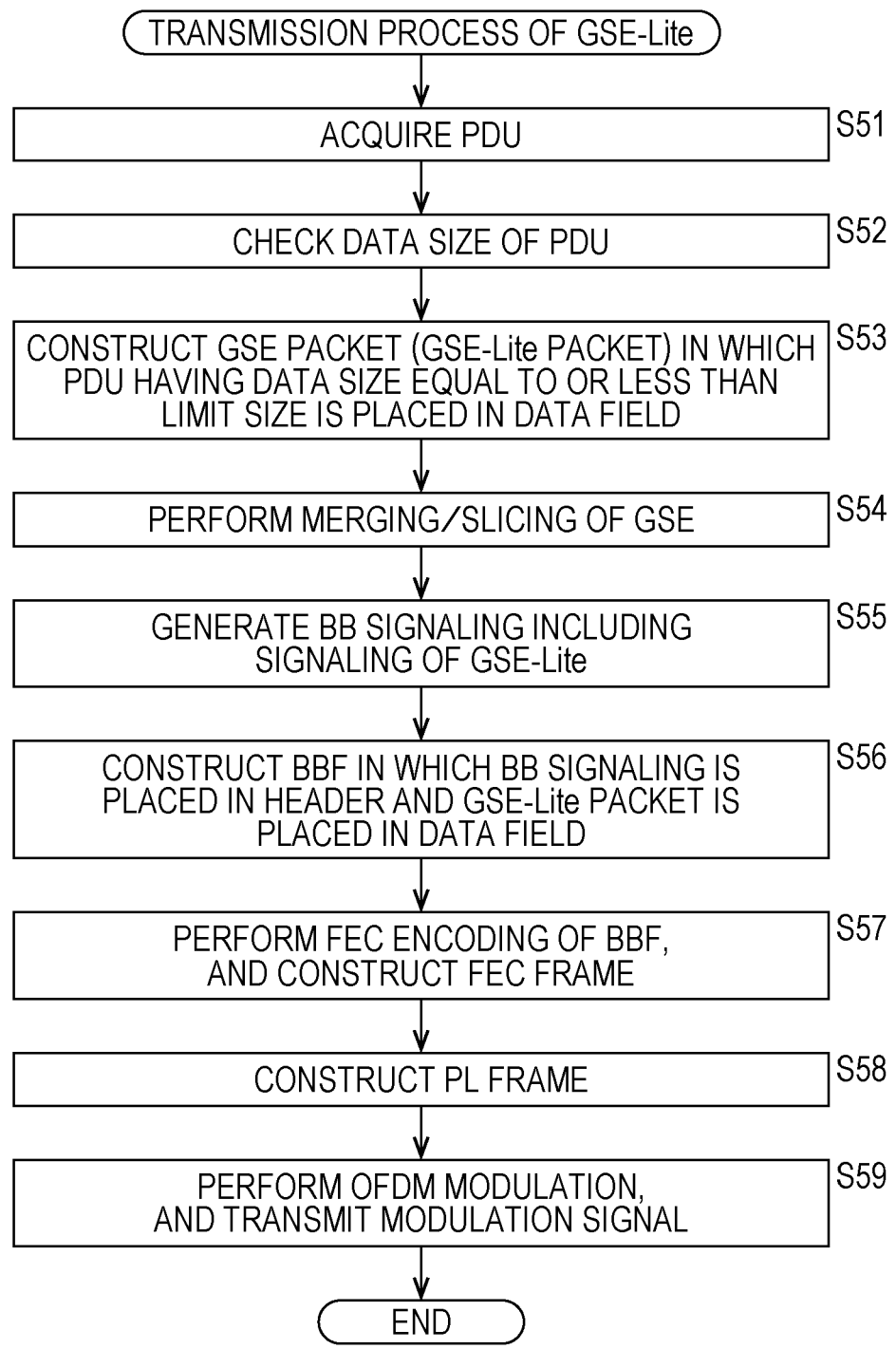
FIG. 17 is a flowchart illustrating a process (GSE-Lite transmission process) of a transmission device that transmits the GSE-Lite packets.

FIG. 17 is a flowchart illustrating a process (GSE-Lite transmission process) of the transmission device of FIG. 16 in a case of transmitting the GSE-Lite packets (the modulation signal including the GSE-Lite packets).

In step S51, the checking section 41 acquires the PDU including the GSE-Lite packet. Then, the process advances to step S52.

In step S52, the checking section 41 checks (verifies) the size of the PDU.

Then, if it is confirmed that the size of the PDU is greater than the limit size as a result of the checking of the size of the PDU, the checking section 41 performs a predetermined error process, and ends the GSE-Lite transmission process.

Further, if it is confirmed that the size of the PDU is equal to or less than the limit size, the checking section 41 supplies the PDU to the GSE-Lite packet construction section 42. Then, the process advances from step S52 to step S53.

In step S53, the GSE-Lite packet construction section 42 constructs the PDU sent from the checking section 41, that is, the GSE-Lite packet that is a GSE packet having the PDU of which the maximum size is limited to the limit size and which is placed in the data field, and supplies the PDU to the merging/slicing section 72. Then, the process advances to step S54.

In step S54, the merging/slicing section 72 merges or slices the GSE-Lite packet sent from the GSE-Lite packet construction section 42, as necessary, and supplies the packet to the BBF construction section 74. Then, the process advances to step S55.

In step S55, the signaling generation section 73 generates the BB signaling, which includes necessary GSE-Lite signaling, in accordance with the control of the controller 31, and supplies the signaling to the BBF construction section 74. Then, the process advances to step S56.

In step S56, the BBF construction section 74 places the GSE-Lite packet, which is sent from the merging/slicing section 72, in the data field, constructs the BBF in which the BB signaling sent from the signaling generation section 73 is placed in the BB header, and supplies the BBF to the FEC encoding section 75. Then, the process advances to step S57.

In step S57, the FEC encoding section 75 performs the FEC encoding on the BBF sent from the BBF construction section 74, and supplies the FEC frame, which is the FEC code of the BBF obtained from the result of the FEC encoding, to the PL framing section 76. Then, the process advances to step S58.

In step S58, the PL framing section 76 constructs the PL frame by adding the PL header to FEC frame sent from the FEC encoding section 75, and supplies the frame to the OFDM modulation section 35. Then, the process advances to step S59.

In step S59, the OFDM modulation section 35 performs the OFDM modulation on the PL frame sent from the PL framing section 76, and transmits the modulation signal which is obtained from the result thereof, and the GSE-Lite transmission process ends.

It should be noted that the GSE-Lite transmission process of FIG. 17 is repeatedly performed in a pipelined manner.

Further, the merging/slicing section 72 is supplied with the GSE-Lite packet from the GSE-Lite packet construction section 42, besides supplied with the GSE packet from the GSE packet construction section 45, or supplied with the TS packet from the outside.

When the GSE packet or the TS packet is supplied, the merging/slicing section 72 supplies the merged or sliced packet to the BBF construction section 74 as necessary.

Then, thereafter, the process the same as the case of supplying the GSE-Lite packet from the GSE-Lite packet construction section 42 to the merging/slicing section 72 is performed, and thereby, the PL frame including the GSE packet or the TS packet is constructed and transmitted.

<GSE-Lite Signaling Based on DVB-S2>

Figure 18:
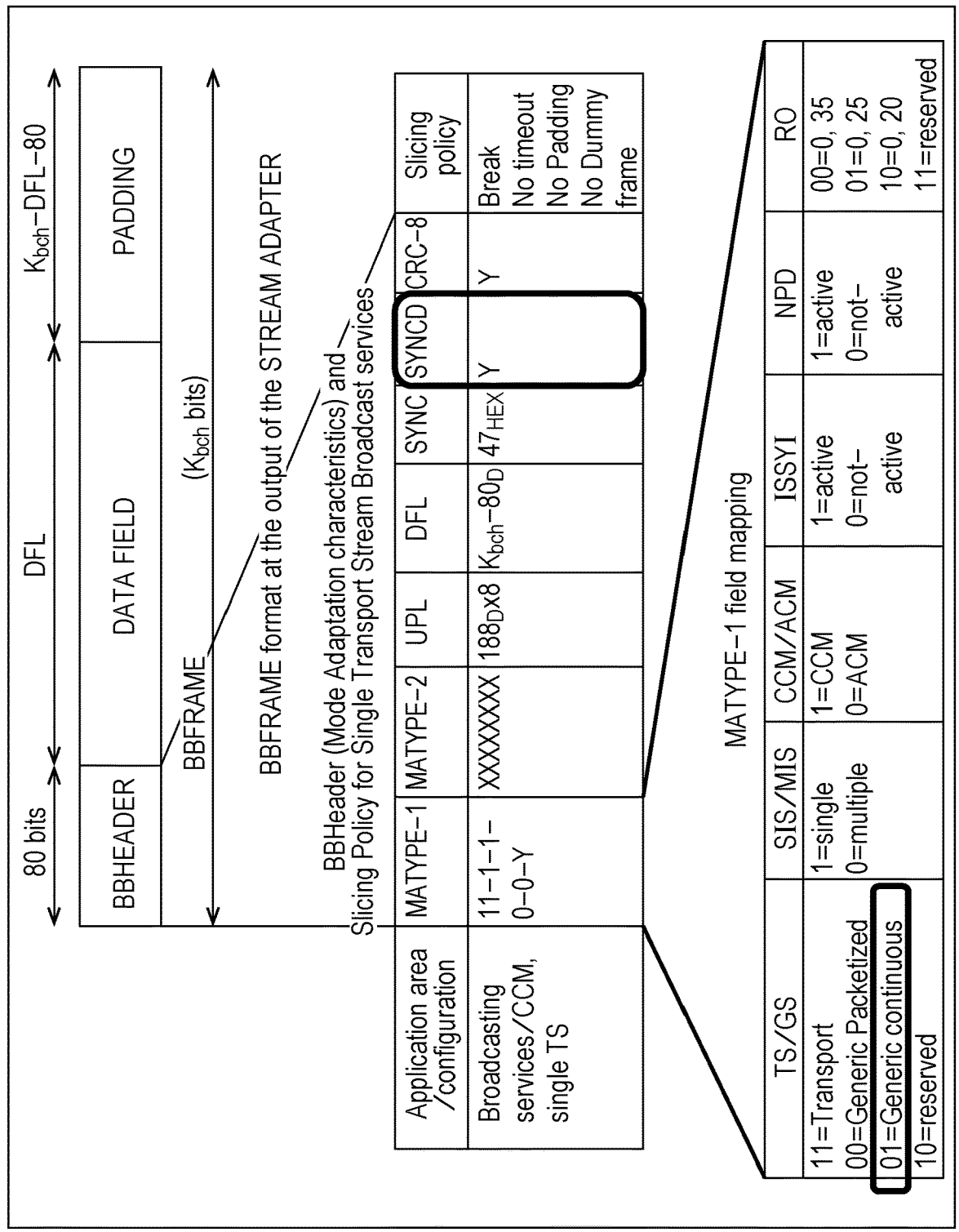
FIG. 18 is a diagram illustrating a first example of GSE-Lite signaling used in the DVB-S2.

FIG. 18 is a diagram illustrating a first example of the GSE-Lite signaling (hereinafter referred to as first GSE-Lite signaling for S2) used in the DVB-S2, that is, the GSE-Lite signaling in the case of transmitting the GSE-Lite packet by the transmission device of FIG. 16.

FIG. 18 shows the BBF (BBFRAME) used in the existing DVB-S2 (ETSI EN 302 307V1.2.1 (2009-08)).

The BBF used in the DVB-S2 includes the BB header (BBHEADER), the data field (DATA FIELD), and the necessary padding (PADDING).

The BB header of the BBF used in the DVB-S2 is data with 80 bits includes, side by side in the following order: a MATYPE-1 with 1 byte, a MATYPE-2 with 1 byte, a UPL with 2 bytes, a DFL with 2 bytes, a SYNC with 1 byte, a SYNCD with 2 bytes, and a CRC-8 with 1 byte.

In the MATYPE-1 with 1 byte at the leading end of the BB header, it is possible to allocate a TS/GS with 2 bits, a SIS/MIS with 1 bit, a CCM/ACM with 1 bit, an ISSYI with 1 bit, an NPD with 1 bit, and a RO with 2 bits, in this order.

In the DVB-S2, when the BBF includes the TS packet (when the TS packet is placed in the BBF data field), the TS/GS is set to 11 (binary digit).

Here, the DVB-S2 does not prescribe setting of the TS/GS in the case where the BBF includes the GSE packet.

However, in the implementation guide line (ETSI TS 102 771V1.2.1 (2011-05)) of the DVB-GSE, in the existing DVB-S2, the GSE packet is transmitted as generic continuous streams.

Accordingly, in the DVB-S2, when the BBF includes the GSE packet or the GSE-Lite packet which serves as the GSE packet, the TS/GS can be set to 01.

Further, in the existing DVB-S2, the SYNCD in the case where the TS/GS is set to 01 is unused.

Accordingly, in the GSE-Lite signaling, for example, the TS/GS and the SYNCD are available.

That is, as the GSE-Lite signaling, for example, it is possible to adopt a way of setting the TS/GS to 01 and setting the SYNCD to FFFF (hexadecimal digit) as a specific value.

According to the corresponding GSE-Lite signaling, in the case where the TS/GS is set to 01 and the SYNCD is set to FFFF as a specific value, it is possible to identify that (data of) the BBF data field is the GSE-Lite packet.

In addition, in the signaling for identifying that the data is the GSE packet, it is possible to adopt a way of setting the TS/GS to 01 and setting the SYNCD to, for example, 0000 or the like which is a value other than the specific value of FFFF used in the GSE-Lite signaling.

Figure 19:
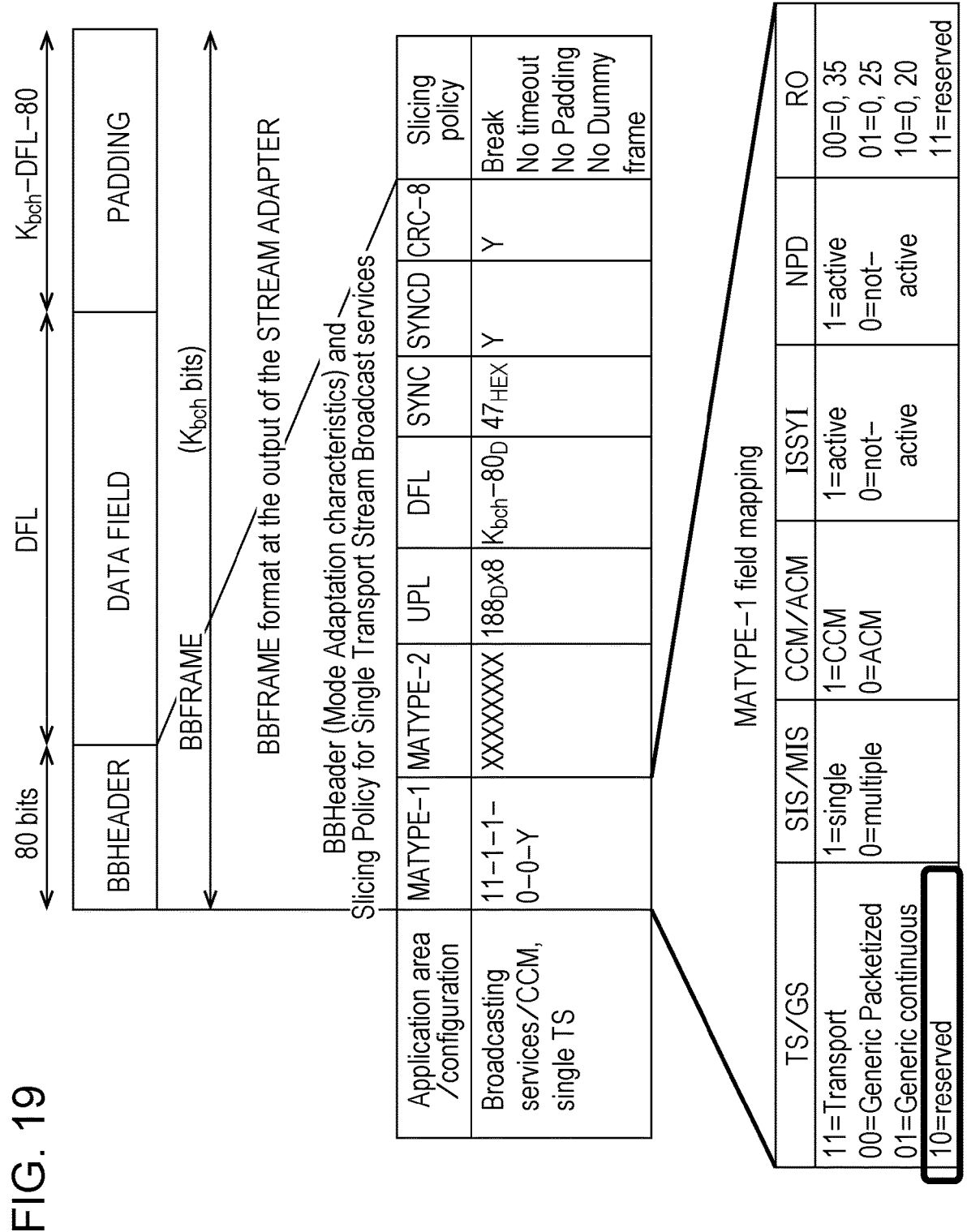
FIG. 19 is a diagram illustrating a second example of the GSE-Lite signaling used in the DVB-S2.

FIG. 19 is a diagram illustrating a second example of the GSE-Lite signaling (hereinafter referred to as second GSE-Lite signaling for S2) used in the DVB-S2.

That is, FIG. 19 shows, as in FIG. 18, the BBF used in the DVB-S2.

As described in FIG. 18, the MATYPE-1 with 1 byte at the leading end of the BB header includes the TS/GS with 2 bits. In the existing DVB-S2, 10 is unused for the TS/GS with 2 bits.

Accordingly, in the GSE-Lite signaling, it is possible to adopt a way of setting the TS/GS to unused 10.

According to the corresponding GSE-Lite signaling, when the TS/GS is set to 10, it is possible to identify that the BBF data field is the GSE-Lite packet.

In addition, in the signaling for identifying that the data is the GSE packet, for example, as in FIG. 18, it is possible to adopt a way of setting the TS/GS to 01 and setting the SYNCD to 0000.

Figure 20:
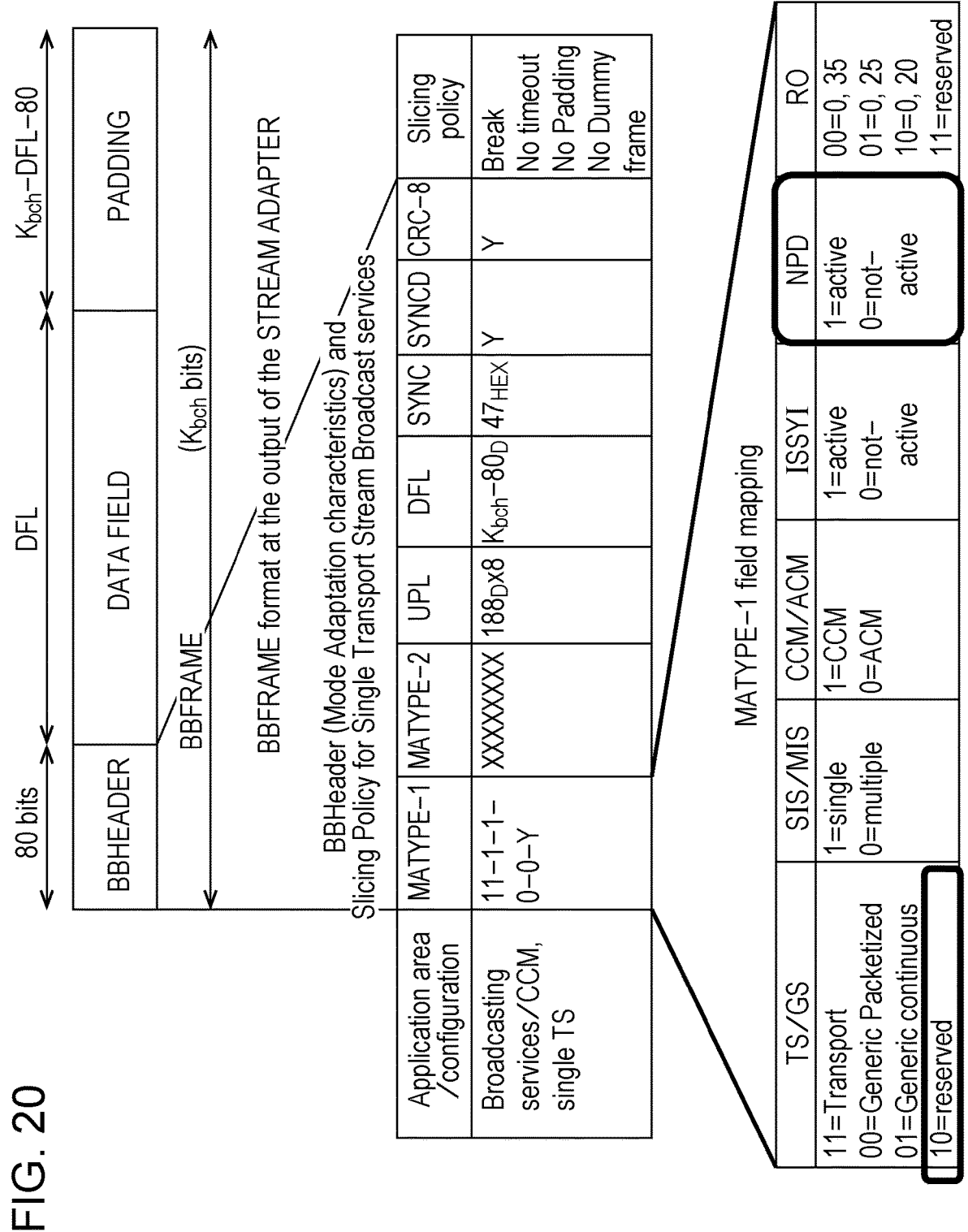
FIG. 20 is a diagram illustrating a third example of the GSE-Lite signaling used in the DVB-S2.

FIG. 20 is a diagram illustrating a third example of the GSE-Lite signaling (hereinafter referred to as third GSE-Lite signaling for S2) used in the DVB-S2.

That is, FIG. 20 shows, as in FIG. 18, the BBF used in the DVB-S2.

As described in FIG. 18, the MATYPE-1 with 1 byte at the leading end of the BB header includes the TS/GS with 2 bits and the NPD with 1 bit.

Further, as described in FIG. 19, in the existing DVB-S2, 10 is unused for the TS/GS with 2 bits. Furthermore, when the TS/GS is set to unused 10, in the existing DVB-S2, the NPD does not function (the NPD functions when the BBF includes the TS packet).

Accordingly, in the GSE-Lite signaling and the signaling for identifying that the data is the GSE packet, the TS/GS and the NPD are available.

That is, when the BBF data field is the GSE packet or the GSE-Lite packet, the TS/GS is set to 10, and the NPD can be set on the basis of which one of the GSE packet and the GSE-Lite packet is the BBF data field.

Specifically, for example, when the BBF data field is the GSE packet, the NPD can be set to 0, and when the BBF data field is the GSE-Lite packet, the NPD can be set to 1.

According to the corresponding GSE-Lite signaling, when the TS/GS is set to 10 and the NPD is set to 1, it can be identified that the BBF data field is the GSE-Lite packet.

Further, when the TS/GS is set to 10 and the NPD is set to 0, it can be identified that the BBF data field is the GSE packet.

In the transmission device of FIG. 16, the signaling generation section 73 generates the BB signaling, which includes the above-mentioned GSE-Lite signaling, for the BBF which is constructed by the BBF construction section 74 and includes the GSE-Lite packet.

As described above, by generating the GSE-Lite signaling, inserting the signaling to the BB header, and transmitting the signaling as the PL frame together with the GSE-Lite packet placed in the BBF data field, in the reception device that receives the PL frame, on the basis of the GSE-Lite signaling, it is possible to easily identify whether the BBF data field included in the PL frame is the GSE-Lite packet.

That is, in order to identify that the BBF data field is the GSE-Lite packet, it is possible to identify whether the BBF data field is the GSE-Lite packet without providing a complex rule or a logic, which analyzes the BBF data field, in the reception device.

<Second Embodiment of Reception Device According to Present Technology>

Figure 21:
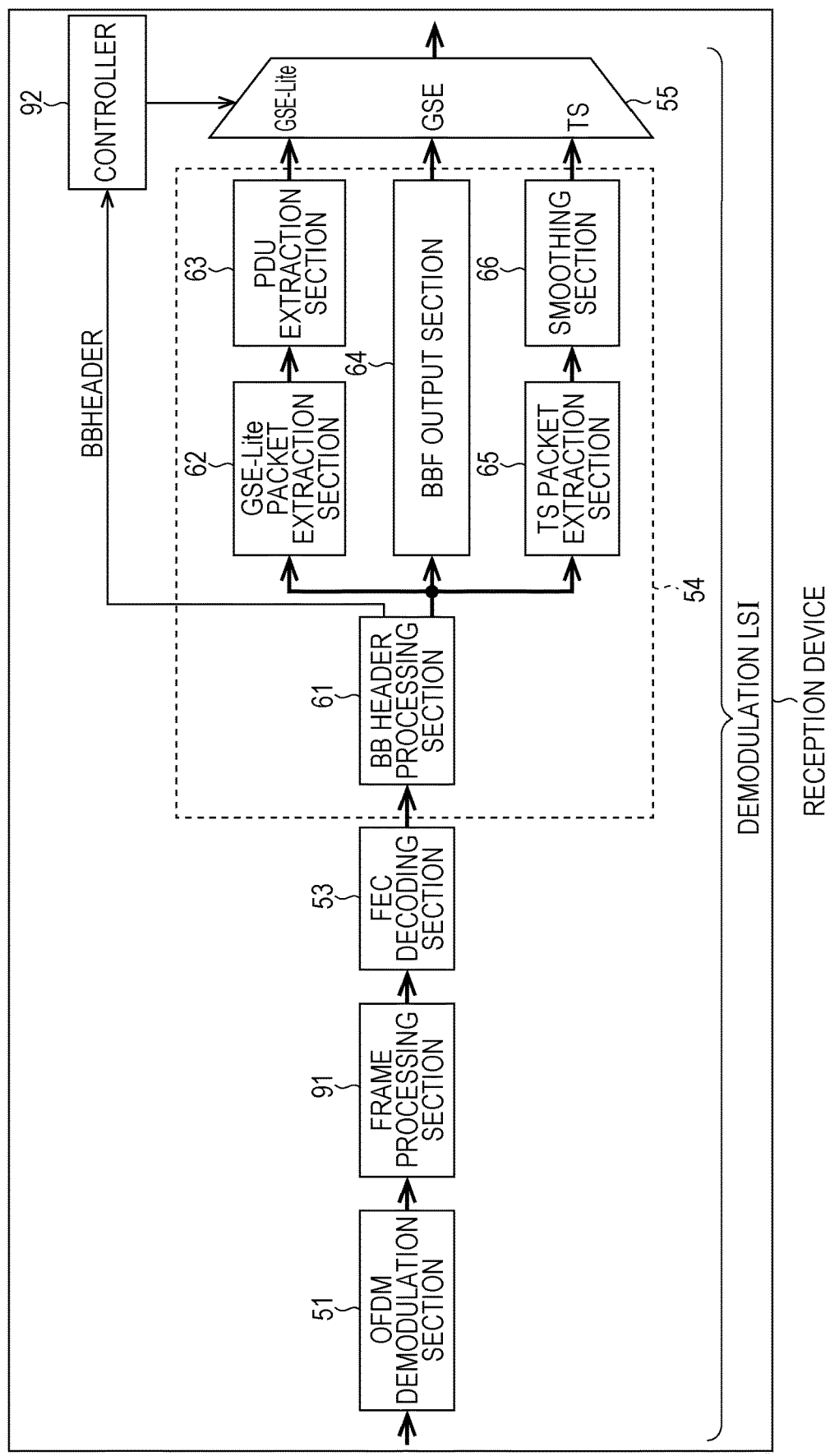
FIG. 21 is a block diagram illustrating a configuration example of the second embodiment of the reception device according to the present technology.

FIG. 21 is a block diagram illustrating a configuration example of the second embodiment of the reception device as the data processing apparatus according to the present technology.

It should be noted that, in the drawing, portions corresponding to the portions in the case of FIG. 14 will be referenced by the same numerals and signs, and thus hereinafter the description thereof will be appropriately omitted.

The reception device of FIG. 21 is the same as that in the case of FIG. 14 in that it has the OFDM demodulation section 51, the FEC decoding section 53, the stream processing section 54, and the output section 55.

However, the reception device of FIG. 21 is different from that in the case of FIG. 14 in that it has a frame processing section 91 instead of the frame processing section 52 and has a controller 92 instead of the controller 56.

The reception device of FIG. 21 receives the broadcast complying with the DVB-S2, that is, the modulation signal which is transmitted from the transmission device of FIG. 16.

In FIG. 21, in the frame processing section 91, the demodulation result of the modulation signal which is transmitted from the transmission device of FIG. 16 is supplied from the OFDM modulation section 51.

That is, the OFDM modulation section 51 receives the modulation signal which is transmitted from the transmission device of FIG. 16, performs the OFDM demodulation thereon, and supplies the PL frame (group), which is obtained from the result thereof, to the frame processing section 52.

The frame processing section 52 extracts a desired PLP from the PL frame, which is sent from the OFDM demodulation section 51, in accordance with, for example, user's operation, and supplies the PLP to the FEC decoding section 53.

The FEC decoding section 53 performs the FEC decoding by using, as a target, the FEC frame which is included in the PL frame sent from the frame processing section 52.

The controller 92 is supplied with the BB header (FIGS. 18 to 20) from the BB header processing section 61.

That is, the BB header processing section 61 extracts the BB header (BB signaling) (FIGS. 18 to 20), and supplies the BB header to the controller 92.

The controller 92 controls the respective blocks constituting the reception device as necessary.

For example, the controller 92 identifies which one of the GSE-Lite packet, the TS packet, and the GSE packet is the BBF data field supplied from the FEC decoding section 53 to the stream processing section 54, on the basis of the BB header (BB signaling) sent from the BB header processing section 61. On the basis of the identification result, the controller 92 controls the output section 55.

Further, when the first GSE-Lite signaling for S2 is adopted (FIG. 18), if the TS/GS of the MATYPE-1 of the BB header sent from the BB header processing section 61 is 01 that indicates the generic continuous stream and if the SYNCD of the BB header is FFFF as a specific value that indicates the GSE-Lite packet, the controller 92 identifies that the BBF data field supplied to the stream processing section 54 is the GSE-Lite packet.

Further, when the second GSE-Lite signaling for S2 is adopted (FIG. 19), if the TS/GS of the MATYPE-1 of the BB header sent from the BB header processing section 61 is 10 that indicates the GSE-Lite packet, the controller 92 identifies that the BBF data field supplied to the stream processing section 54 is the GSE-Lite packet.

In addition, also when either of the first and second GSE-Lite signalings for S2 is adopted (FIG. 18, FIG. 19), if the TS/GS of the MATYPE-1 of the BB header sent from the BB header processing section 61 is 01 that indicates the generic continuous stream and if the SYNCD of the BB header is 0000 (a value that indicates the GSE packet), the controller 92 identifies that the BBF data field supplied to the stream processing section 54 is the GSE packet.

When the third GSE-Lite signaling for S2 is adopted (FIG. 20), if the TS/GS of the MATYPE-1 of the BB header sent from the BB header processing section 61 is 10 that indicates the GSE packet and if the NPD is 1 as a specific value that indicates the GSE-Lite packet, the controller 92 identifies that the BBF data field supplied to the stream processing section 54 is the GSE-Lite packet.

Furthermore, when the third GSE-Lite signaling for S2 is adopted, if the TS/GS of the MATYPE-1 of the BB header sent from the BB header processing section 61 is 10 that indicates the GSE packet and if the NPD is 0 as a specific value that indicates the GSE packet, the controller 92 identifies that the BBF data field supplied to the stream processing section 54 is the GSE packet.

In addition, when any of the first to third GSE-Lite signalings for S2 is adopted (FIGS. 18 to 20), if the TS/GS of the MATYPE-1 of the BB header sent from the BB header processing section 61 is 11 indicates the TS packet, the controller 92 identifies that the BBF data field supplied to the stream processing section 54 is the TS packet.

If it is identified that the BBF data field supplied to the stream processing section 54 is the GSE-Lite packet, the controller 92 controls the output section 55 so as to select the output of the PDU extraction section 63, for the BBF.

As a result, for the BBF supplied to the stream processing section 54, the output section 55 selectively outputs the PDU which is output by the PDU extraction section 63 and is placed in the GSE-Lite packet included in the BBF and of which the size is equal to or less than the limit size.

Further, if it is identified that the BBF data field supplied to the stream processing section 54 is the TS packet, for the BBF, the controller 92 controls the output section 55 so as to select the output of the smoothing section 66.

As a result, for the BBF supplied to the stream processing section 54, the output section 55 selectively outputs the TS packet which is output by the smoothing section 66 and is included in the BBF.

Furthermore, if it is identified that the BBF data field supplied to the stream processing section 54 is the GSE packet, for the BBF, the controller 92 controls the output section 55 so as to select the output of the BBF output section 64.

As a result, for the BBF supplied to the stream processing section 54, the output section 55 selectively outputs the BBF itself which is output by the BBF output section 64.

It can be should be noted that the OFDM demodulation section 51, the FEC decoding section 53, the stream processing section 54, the output section 55, the frame processing section 91, and the controller 92 in FIG. 21 can be formed as a demodulation LSI which is a single-chip LSI, as in FIG. 14.

As described above, in the reception device of FIG. 21, it is possible to easily identify whether the BBF data field is the GSE-Lite packet, on the basis of the SYNCD and the TS/GS of the MATYPE-1, the TS/GS, or the TS/GS and the NPD as the GSE-Lite signaling.

Figure 22:
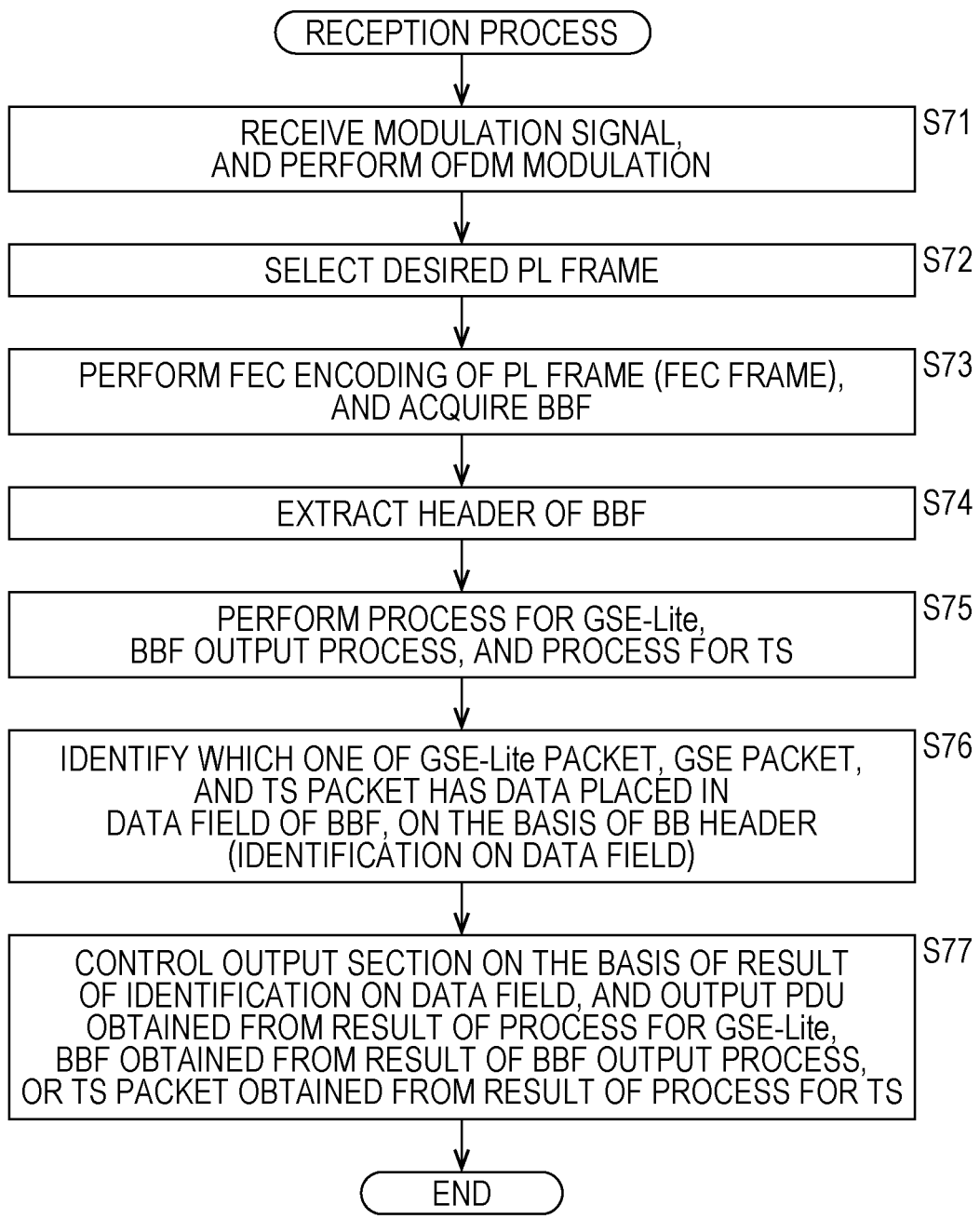
FIG. 22 is a flowchart illustrating a process (reception process) of the reception device.

FIG. 22 is a flowchart illustrating a process (reception process) of the reception device of FIG. 21.

In step S71, the OFDM modulation section 51 receives the modulation signal which is transmitted from the transmission device of FIG. 16, performs the OFDM demodulation thereon, and supplies the PL frame, which is obtained from the result thereof, to the frame processing section 91. Then, the process advances to step S72.

In step S72, the frame processing section 91 extracts a desired PLP from the PL frame, which is sent from the OFDM demodulation section 51, in accordance with, for example, user's operation, and supplies the PLP to the FEC decoding section 53. Then, the process advances to step S73.

In step S73, the FEC decoding section 53 performs, for example, the FEC decoding of the FEC frame, on the FEC frame included in the PL frame sent from the frame processing section 52, and supplies the BBF, which is obtained from the result thereof, to the stream processing section 54. Then, the process advances to step S74.

In step S74, in the stream processing section 54, the BB header processing section 61 extracts the BB header (FIG. 18 to FIG. 20) from the BBF which is sent from the FEC decoding section 53, and supplies the BB header as the GSE-Lite signaling to the controller 92.

Furthermore, the BB header processing section 61 supplies the BBF, which is sent from the FEC decoding section 53, to the GSE-Lite packet extraction section 62, the BBF output section 64, and the TS packet extraction section 65. Then, the process advances from step S74 to step S75.

In step S75, as described in step S35 of the FIG. 15, the process for GSE-Lite, the BBF output process, and the process for TS are performed. Then, the process advances to step S76.

That is, in the process for GSE-Lite, the GSE-Lite packet extraction section 62 assumes that the BBF sent from the BB header processing section 61 includes the GSE-Lite packet, extracts the GSE-Lite packet from the BBF, and supplies the packet to the PDU extraction section 63. The PDU extraction section 63 extracts the PDU from the GSE-Lite packet sent from the GSE-Lite packet extraction section 62, and outputs the packet to the output section 55.

Further, in the BBF output process, the BBF output section 64 outputs the BBF, which is sent from the BB header processing section 61, to the output section 55.

Furthermore, in the process for TS, the TS packet extraction section 65 assumes that the BBF sent from the BB header processing section 61 includes the TS packet, extracts the TS packet from the BBF, and supplies the TS packet to the smoothing section 66. The smoothing section 66 performs smoothing on the TS packet sent from the TS packet extraction section 65, and outputs the packet to the output section 55.

In step S76, the controller 92 performs the identification on the data field that identifies which one of the GSE-Lite packet, the TS packet, and the GSE packet is the BBF data field previously supplied from the FEC decoding section 53 to the stream processing section 54, on the basis of the BB header (BB signaling) sent from the BB header processing section 61, as the GSE-Lite signaling. Then, the process advances to step S77.

In step S77, the controller 92 controls the output section 55 on the basis of the identification result of the identification on the data field of step S76. Thereby, the output section 55 selectively provides one output of the outputs of the PDU extraction section 63, the BBF output section 64, and the smoothing section 66, and the reception process ends.

That is, the output section 55 selectively outputs the PDU, the BBF, or the TS packet, in accordance with the control of the controller 92. The PDU is output by the PDU extraction section 63, and is obtained from the result of the process for GSE-Lite. The BBF is output by the BBF output section 64, and is obtained from the result of the BBF output process. The TS packet is output by the smoothing section 66, and is obtained from the result of the process for TS.

It should be noted that the reception process of FIG. 22 is repeatedly performed in a pipelined manner.

Further, in FIG. 22, in step S75, all of the process for GSE-Lite, the BBF output process, and the process for TS are performed, and thereafter, in step S76, the identification on the data field is performed that identifies which one of the GSE-Lite packet, the TS packet, and the GSE packet is the BBF data field, on the basis of the BB header as the GSE-Lite signaling. However, by performing the identification on the data field first, it may be possible to perform only any one of the process for GSE-Lite, the BBF output process, and the process for TS, on the basis of the identification result.

That is, if it is identified that, as the result of the identification on the data field, the BBF data field is the GSE-Lite packet, it is possible to perform only the process for GSE-Lite among the process for GSE-Lite, the BBF output process, and the process for TS.

Likewise, if it is identified that, as the result of the identification on the data field, the BBF data field is the GSE packet, it is possible to perform only the BBF output process, and if it is identified that the BBF data field is the TS packet, it is possible to perform only the process for TS.

<GSE-Lite Signaling at Data Link Layer>

In FIGS. 11 to 13 and FIGS. 18 to 20, the GSE-Lite signaling is transmitted at the physical layer (L (Layer) 1), that is, for example, the GSE-Lite signaling is transmitted in a state where the signaling is included in the BB signaling (BB header) or the L1 signaling (PLP_PAYLOAD_TYPE). However, the GSE-Lite signaling may be transmitted at the link layer (L2) other than that.

Here, when the GSE-Lite signaling is transmitted at the physical layer, in the reception device that receives the GSE-Lite packet, through only the process of the physical layer, it is possible to promptly identify whether the signaling is the GSE-Lite packet before the process of the data link layer is started.

In contrast, when the GSE-Lite signaling is transmitted at the data link layer, without affecting (the standard of) the physical layer, it is possible to complete the method of the GSE-Lite signaling, in (the GSE-Lite which is the specification (prescription) of) the data link layer.

When the GSE-Lite signaling is transmitted at the data link layer, the GSE-Lite signaling can be included in the data field (PDU) or the GSE header of the GSE-Lite packet (GSE packet).

Here, in order to distinguish the GSE-Lite signaling at the data link layer in a case where the GSE-Lite signaling is transmitted at the data link layer from the GSE-Lite signaling at the physical layer in a case where the GSE-Lite signaling is transmitted at the physical layer, the GSE-Lite signaling at the data link layer is also referred to as L2-placed GSE-Lite signaling.

Likewise, in order to distinguish the GSE-Lite signaling at the physical layer in the case where the GSE-Lite signaling is transmitted at the physical layer from the GSE-Lite signaling at the data link layer (L2-placed GSE-Lite signaling), the GSE-Lite signaling at the physical layer is also referred to as L1-placed GSE-Lite signaling.

According to the L1-placed GSE-Lite signaling, for example, in terms of the BB frame (or the PLP), it is possible to perform the signaling for whether the GSE packet included in the BB frame is the GSE-Lite packet.

In contrast, according to the L2-placed GSE-Lite signaling, in terms of the GSE packet, it is possible to perform the signaling for whether the GSE packet is the GSE-Lite packet.

Figure 23:
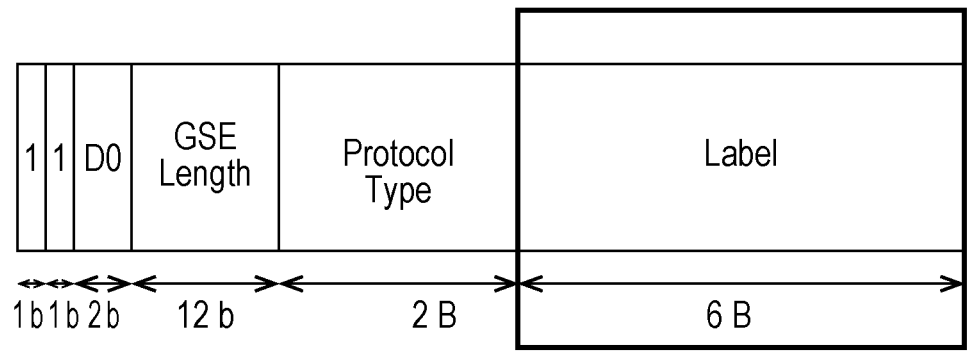
FIG. 23 is a diagram illustrating a first example of L2-placed GSE-Lite signaling.

FIG. 23 is a diagram illustrating a first example of the L2-placed GSE-Lite signaling.

That is, FIG. 23 shows the GSE-Lite header (GSE header) of the GSE-Lite packet (GSE packet).

As shown in FIGS. 3 and 6, the GSE header may include a label with 3 bytes or 6 bytes. However, in the L2-placed GSE-Lite signaling, the label of the GSE header is available.

That is, as the L2-placed GSE-Lite signaling, for example, it is possible to adopt a way of setting the label with 6 bytes in the GSE header as a specific value that indicates the GSE-Lite packet.

According to the L2-placed GSE-Lite signaling using the above-mentioned label, when the GSE header includes the label with 6 bytes and the label is set as a specific value that indicates the GSE-Lite packet, it can be identified that the packet including the label (in the GSE header) is the GSE-Lite packet.

In a case of using the label with 6 bytes in the GSE header for the L2-placed GSE-Lite signaling, as the label with 6 bytes serving as the L2-placed GSE-Lite signaling, that is, as the specific value that indicates the GSE-Lite packet, it is possible to adopt, for example, the following values: a predetermined value with 6 bytes in which the most significant bit (MSB) is set to 1 (such as 6 bytes in which the MSB is 1 and the other bits are 0); a predetermined value with 6 bytes in which the first byte is set to 0xFF (0x indicates that the subsequent values are hexadecimal digits); and besides, a value which is a label having no specific purpose prescribed in the DVB-GSE.

Here, in the DVB-GSE, 6 bytes (0x00: 00: 00: 00: 00: 00), in which all bits are 0, cannot be used as the label with 6 bytes in the GSE header. Further, the DVB-GSE prescribes that the label, in which the least significant bit (LSB) of the first byte is set to 1, is used in the multicast frames. Furthermore, in the DVB-GSE, 6 bytes (0xFF: FF: FF: FF: FF), in which all bits are 1, are prescribed at the link broadcast address.

Figure 24:
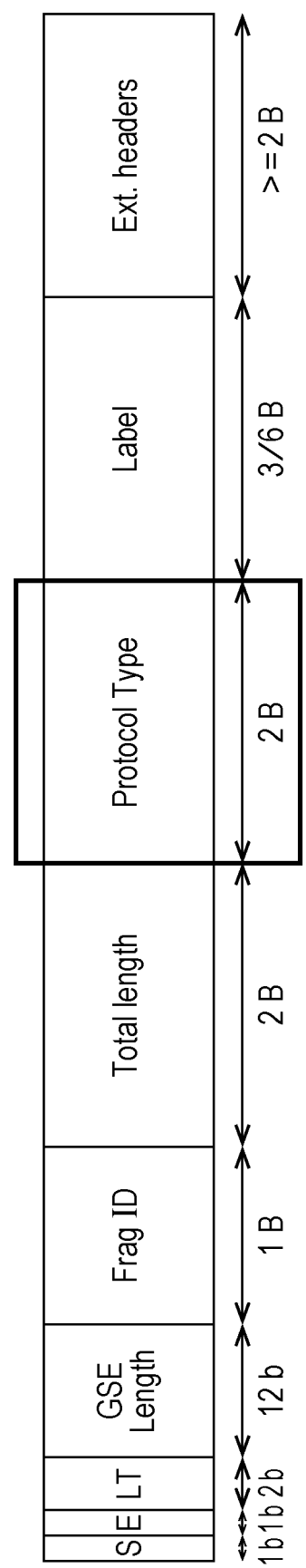
FIG. 24 is a diagram illustrating a second example of the L2-placed GSE-Lite signaling.

FIG. 24 is a diagram illustrating a second example of the L2-placed GSE-Lite signaling.

That is, FIG. 24 shows the GSE-Lite header of the GSE-Lite packet.

As shows in FIGS. 3 and 6, the GSE header may include a protocol type with 2 bytes. However, in the L2-placed GSE-Lite signaling, the protocol type of the GSE header is available.

That is, as the L2-placed GSE-Lite signaling, for example, it is possible to adopt a way of setting the protocol type with 2 bytes in the GSE header as a specific value that indicates the GSE-Lite packet.

Here, the protocol type is 2 bytes, and thus a value in the range of 0 to 65535 can be used.

In the DVB-GSE, among the values usable for the protocol type, a value in the range of 0 to 1535 is referred to as a type 1 (Next-Header Type field), and a value in the range of 1536 to 65535 is referred to as a type 2 (Ether Type compatible Type fields).

The value of the type 1 of the protocol type is used to identify link-specific protocols or indicates presence of extension headers (Ext. headers) (FIG. 3). The extension header can be present when the protocol type is the value of the type 1 (0 to 1535).

As a value of the type 2 of the protocol type, a value, which is defined in the Ethertype of the Ethernet frame (FIG. 7), is used.

In a case of using the protocol type with 2 bytes in the GSE header for the L2-placed GSE-Lite signaling, as the protocol type with 2 bytes serving as the L2-placed GSE-Lite signaling, that is, as the specific value that indicates the GSE-Lite packet, for example, it is possible to adopt a value, which is not defined in the Ethertype, among the values of the type 2 (1536 to 65535) of the type 1 and the type 2.

According to the L2-placed GSE-Lite signaling using the above-mentioned protocol type, when the GSE header includes the protocol type with 2 bytes and the protocol type is set as a specific value that indicates the GSE-Lite packet, it can be identified that the packet including the protocol type (in the GSE header) is the GSE-Lite packet.

Figure 25:
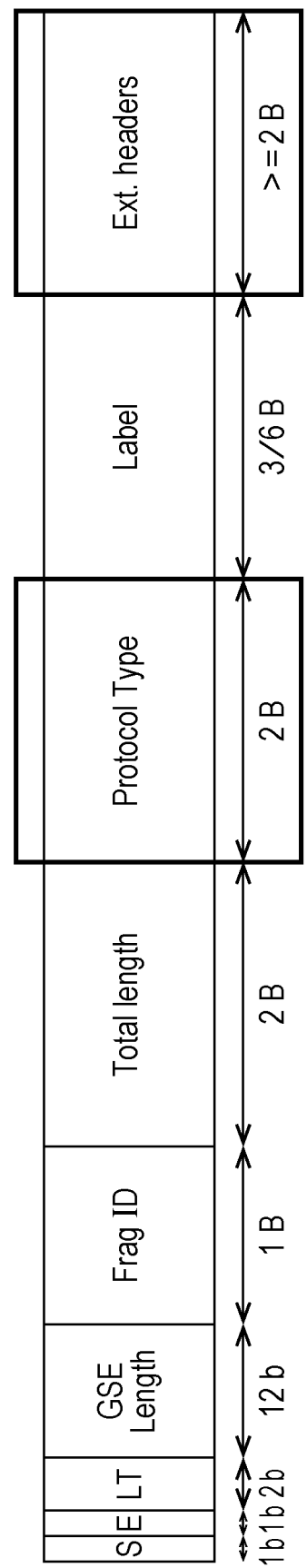
FIG. 25 is a diagram illustrating a third example of the L2-placed GSE-Lite signaling.

FIG. 25 is a diagram illustrating a third example of the L2-placed GSE-Lite signaling.

That is, FIG. 25 shows the GSE-Lite header of the GSE-Lite packet.

As shown in FIGS. 3 and 6, the GSE header may include an extension header (Ext. headers) with 2 bytes or more. However, in the L2-placed GSE-Lite signaling, the extension header of the GSE header is available.

That is, as the L2-placed GSE-Lite signaling, for example, it is possible to adopt a way of setting the extension header with 2 bytes (or more) in the GSE header as a specific value that indicates the GSE-Lite packet.

According to the L2-placed GSE-Lite signaling using the above-mentioned extension header, when the GSE header includes the extension header and the extension header is set as a specific value that indicates the GSE-Lite packet, it can be identified that the packet including the extension header (in the GSE header) is the GSE-Lite packet.

In addition, as described in FIG. 24, the extension header can be present when the protocol type is the value of the type 1 (0 to 1535). Therefore, when the extension header is used in the L2-placed GSE-Lite signaling, the protocol type is set as the value of the type 1.

Further, in a case of using the extension header in the GSE header for the L2-placed GSE-Lite signaling, as the extension header serving as the L2-placed GSE-Lite signaling, that is, as the specific value that indicates the GSE-Lite packet, for example, it is possible to adopt an arbitrary value at which combination between the value of the protocol type set as the value of the type 1 and the value of the extension header is undefined (undefined as a value that indicates an item other than the L2-placed GSE-Lite signaling).

FIG. 26 is a diagram illustrating a fourth example of the L2-placed GSE-Lite signaling.

That is, FIG. 26 shows an example of a descriptor transmitted by the GSE link control data (GSE-LLC) packet.

Here, currently, a standard of the GSE-LLC packet as the GSE packet that transmits the LLC information is designed in progress, and prescribes that a descriptor for setting the network interface or the device of the physical layer and the MAC layer is transmitted as the LLC information by the GSE-LLC packet.

Since the GSE-LLC packet is the GSE packet, by using, as a target, the PDU whose maximum size is limited to a predetermined limit size of 4096 bytes or less, the GSE-LLC packet is constructed. Thereby, the GSE-LLC packet becomes the GSE-Lite packet.

For the GSE-Lite packet which also serves as the above-mentioned GSE-LLC packet, in the L2-placed GSE-Lite signaling, it is possible to use the descriptor (the descriptor transmitted by the GSE-Lite packet which also serves as the GSE-LLC packet) of the GSE-LLC packet.

That is, the descriptor GSE_Options_descriptor ( ), which describes options of the GSE, as a descriptor of the GSE-LLC packet is defined, and the L2-placed GSE-Lite signaling can be performed by using the descriptor GSE_Options_descriptor ( ).

FIG. 26 shows an example of syntax of the descriptor GSE_Options_descriptor ( ).

In FIG. 26, the descriptor GSE_Options_descriptor ( ) is constructed with 2 bytes (32 bits), and has a descriptor_tag with 8 bits, a descriptor_length with 8 bits, a GSE_Lite with 1 bit, and a unused bit (Reserved) with 15 bits.

In the descriptor_tag, a value as a tag, which identifies the descriptor GSE_Options_descriptor ( ), is set. In the descriptor_length, a length of the descriptor GSE_Options_descriptor ( ) is set.

In the GSE_Lite, 1 or 0 is set on the basis of whether or not the GSE-LLC packet, which transmits the descriptor GSE_Options_descriptor ( ), is the GSE-Lite packet.

According to the L2-placed GSE-Lite signaling using the above-mentioned descriptor GSE_Options_descriptor ( ), if the GSE packet is the GSE-LLC packet, referring to the GSE_Lite of the descriptor GSE_Options_descriptor ( ) transmitted by the GSE-LLC packet, it is possible to identify whether the GSE-LLC packet is the GSE-Lite packet.

In addition, referring to the payload type of the GSE header, it is possible to identify whether the GSE packet is the GSE-LLC packet. That is, if the GSE packet is the GSE-LLC packet, in the payload type of the GSE header, a specific value (such as 0x0082), which indicates the GSE-LLC packet, is set. Therefore, it is possible to identify whether the GSE packet is the GSE-LLC packet by referring to the payload type of the GSE header.

<Third Embodiment of Transmission Device According to Present Technology>

Figure 27:
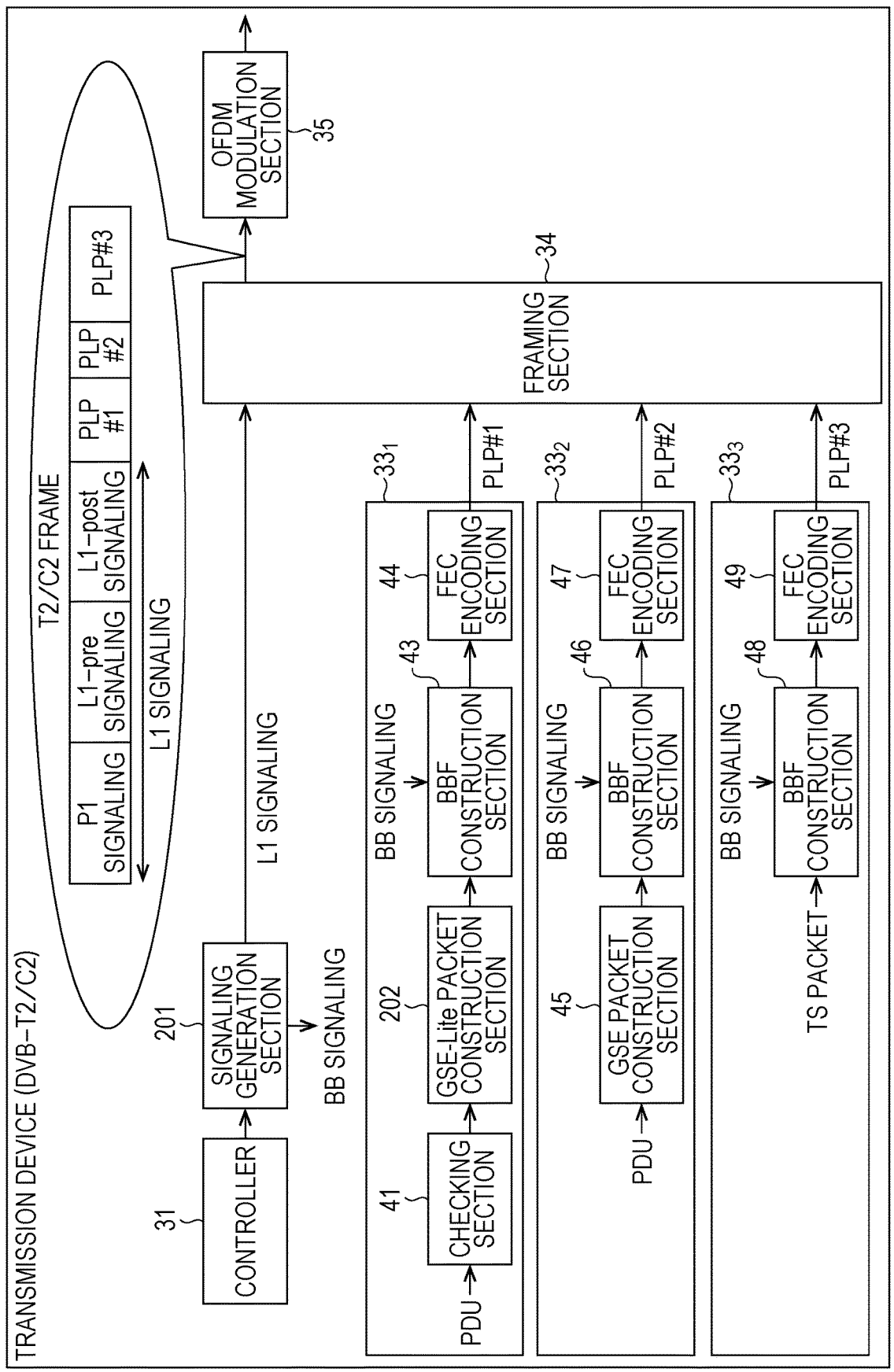
FIG. 27 is a block diagram illustrating a configuration example of a third embodiment of the transmission device according to the present technology.

FIG. 27 is a block diagram illustrating a configuration example of a third embodiment of the transmission device as the data processing apparatus according to the present technology.

It should be noted that, in the drawing, portions corresponding to the portions in the case of FIG. 9 will be referenced by the same numerals and signs, and thus hereinafter the description thereof will be appropriately omitted.

In the transmission device of FIG. 9, the L1-placed GSE-Lite signaling is adopted as the GSE-Lite signaling. In the transmission device of FIG. 27, the L2-placed GSE-Lite signaling is adopted as the GSE-Lite signaling.

Hence, the transmission device of FIG. 27 is configured to be the same as that in the case of FIG. 9 except that, instead of the signaling generation section 32 and the GSE-Lite packet construction section 42 of FIG. 9, a signaling generation section 201 and a GSE-Lite packet construction section 202 are respectively provided.

In a similar manner to the signaling generation section 32 of FIG. 9, the signaling generation section 201 generates the BB signaling and the L1 signaling (P1 signaling, L1-pre signaling, L1-post signaling) appropriate for the data transmitted from the transmission device, in accordance with the control of the controller 31.

In addition, in a similar manner to the signaling generation section 32 of FIG. 9, the signaling generation section 201 supplies the BB signaling to the BBF construction sections 43, 46, and 48, and supplies the L1 signaling to the framing section 34.

Here, the signaling generation section 32 of FIG. 9 generates the BB signaling and the L1 signaling including the L1-placed GSE-Lite signaling as the GSE-Lite signaling. However, the signaling generation section 201 of FIG. 27 generates sort of normal BB signaling and L1 signaling which does not include the L1-placed GSE-Lite signaling and complies with the prescription of the existing DVB-T2 or DVB-C2.

The GSE-Lite packet construction section 202 is supplied with the PDU, of which the size is equal to or less than the limit size, from the checking section 41.

In a similar manner to the GSE-Lite packet construction section 42 of FIG. 9, the GSE-Lite packet construction section 202 constructs the GSE packet in which the PDU sent from the checking section 41 is placed in the data field, that is, the GSE-Lite packet, and supplies the GSE packet to the BBF construction section 43.

However, the GSE-Lite packet construction section 202 constructs the GSE-Lite packet including the L2-placed GSE-Lite signaling described in FIGS. 23 to 26.

Figure 28:
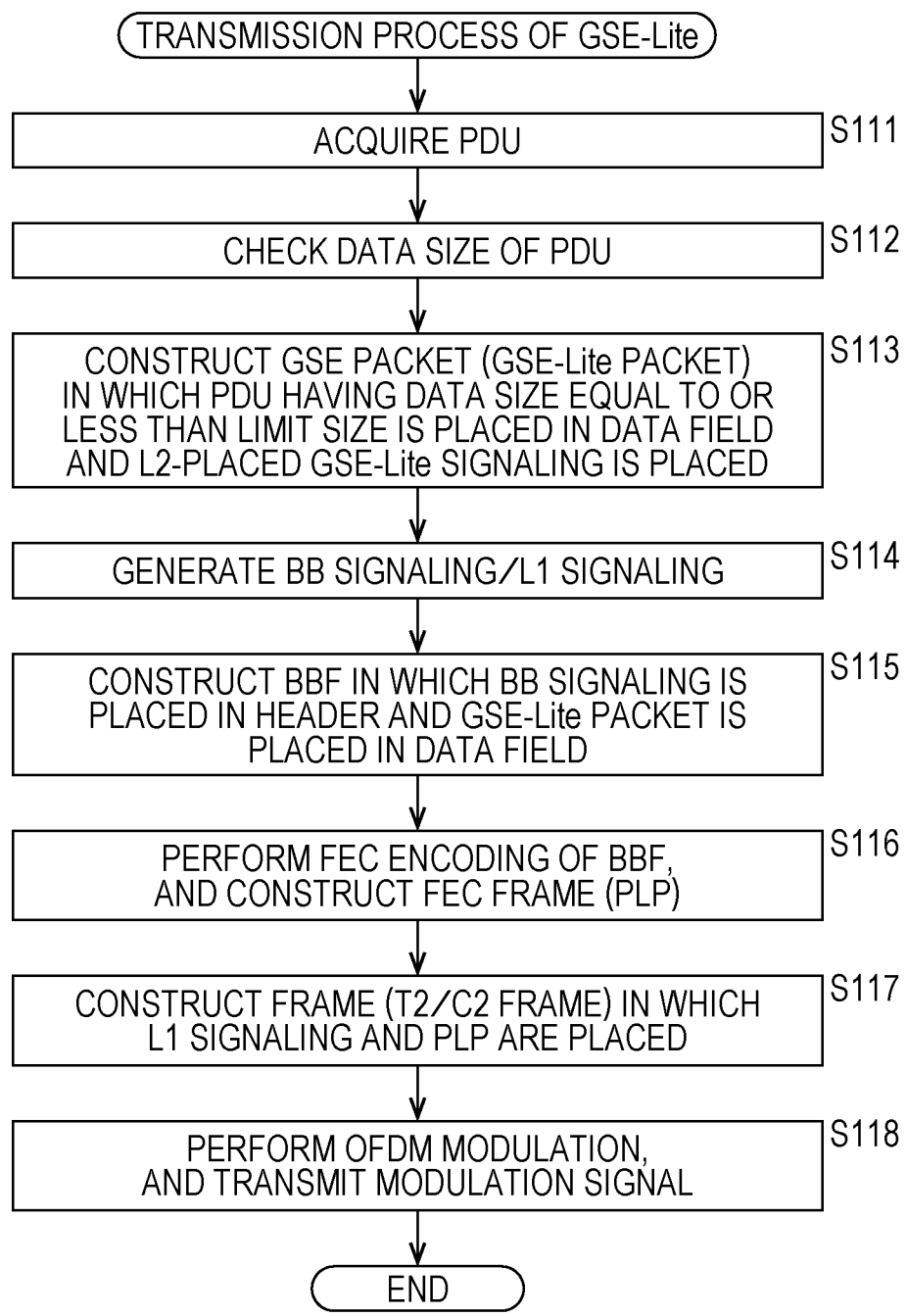
FIG. 28 is a flowchart illustrating a process (GSE-Lite transmission process) of the transmission device.

FIG. 28 is a flowchart illustrating a process (GSE-Lite transmission process) of the transmission device of FIG. 27 in a case of transmitting the GSE-Lite packets (the modulation signal including the GSE-Lite packets).

In steps S111 to S116, the data construction section 331 constructs the PLP#1 including the GSE-Lite packet, and supplies the PLP to the framing section 34.

That is, in step S111, in a similar manner to step S11 of FIG. 10, the checking section 41 acquires the PDU including the GSE-Lite packet. Then, the process advances to step S112.

In step S112, in a similar manner to step S12 of FIG. 10, the checking section 41 checks (verifies) the size of the PDU, and supplies the PDU to the GSE-Lite packet construction section 202. Then, the process advances step S113.

In step S113, the GSE-Lite packet construction section 202 constructs the PDU sent from the checking section 41, that is, the GSE-Lite packet having the PDU, of which the maximum size is limited to the limit size and which is placed in the data field, and having the L2-placed GSE-Lite signaling which is placed (included) therein, and supplies the PDU to the BBF construction section 43. Then, the process advances to step S114.

In step S114, the signaling generation section 201 generates the BB signaling and the L1 signaling in accordance with the control of the controller 31. Furthermore, the signaling generation section 201 supplies the BB signaling to the BBF construction section 43, and supplies the L1 signaling to the framing section 34. Then, the process advances from step S114 to step S115.

In step S115, in a similar manner to step S15 of FIG. 10, the BBF construction section 43 places the GSE-Lite packet, which is sent from the GSE-Lite packet construction section 202, in the data field, constructs the BBF in which the BB signaling sent from the signaling generation section 201 is placed in the BB header, and supplies the BBF to the FEC encoding section 44. Then, the process advances to step S116.

In step S116, in a similar manner to step S16 of FIG. 10, the FEC encoding section 44 performs the FEC encoding on the BBF sent from the BBF construction section 43, and supplies the FEC frame, which is obtained from the result thereof, as the PLP#1 to the framing section 34. Then, the process advances to step S117.

As described above, in the data construction section 331, the FEC frame including the GSE-Lite packet is constructed, and is supplied as the PLP#1 to the framing section 34. Concurrently, as necessary, for example, in the data construction section 332, the FEC frame including the GSE packet is constructed, and is supplied as the PLP#2 to the framing section 34, and in the data construction section 333, the FEC frame including the TS packet is constructed, and is supplied as the PLP#3 to the framing section 34.

In step S117, in a similar manner to step S17 of FIG. 10, the framing section 34 constructs the T2 frame or the C2 frame, which includes the L1 signaling sent from the signaling generation section 201 and at least one PLP such as the PLP#1 to PLP#3 respectively sent from the data construction sections 331 to 333, and supplies the frame to the OFDM modulation section 35. Then, the process advances to step S118.

In step S118, in a similar manner to step S18 of FIG. 10, the OFDM modulation section 35 performs the OFDM modulation on the T2 frame or the C2 frame sent from the framing section 34, and transmits the modulation signal which is obtained from the result thereof, and the GSE-Lite transmission process ends.

It should be noted that the GSE-Lite transmission process of FIG. 28 is repeatedly performed in a pipelined manner.

<Third Embodiment of Reception Device According to Present Technology>

Figure 29:
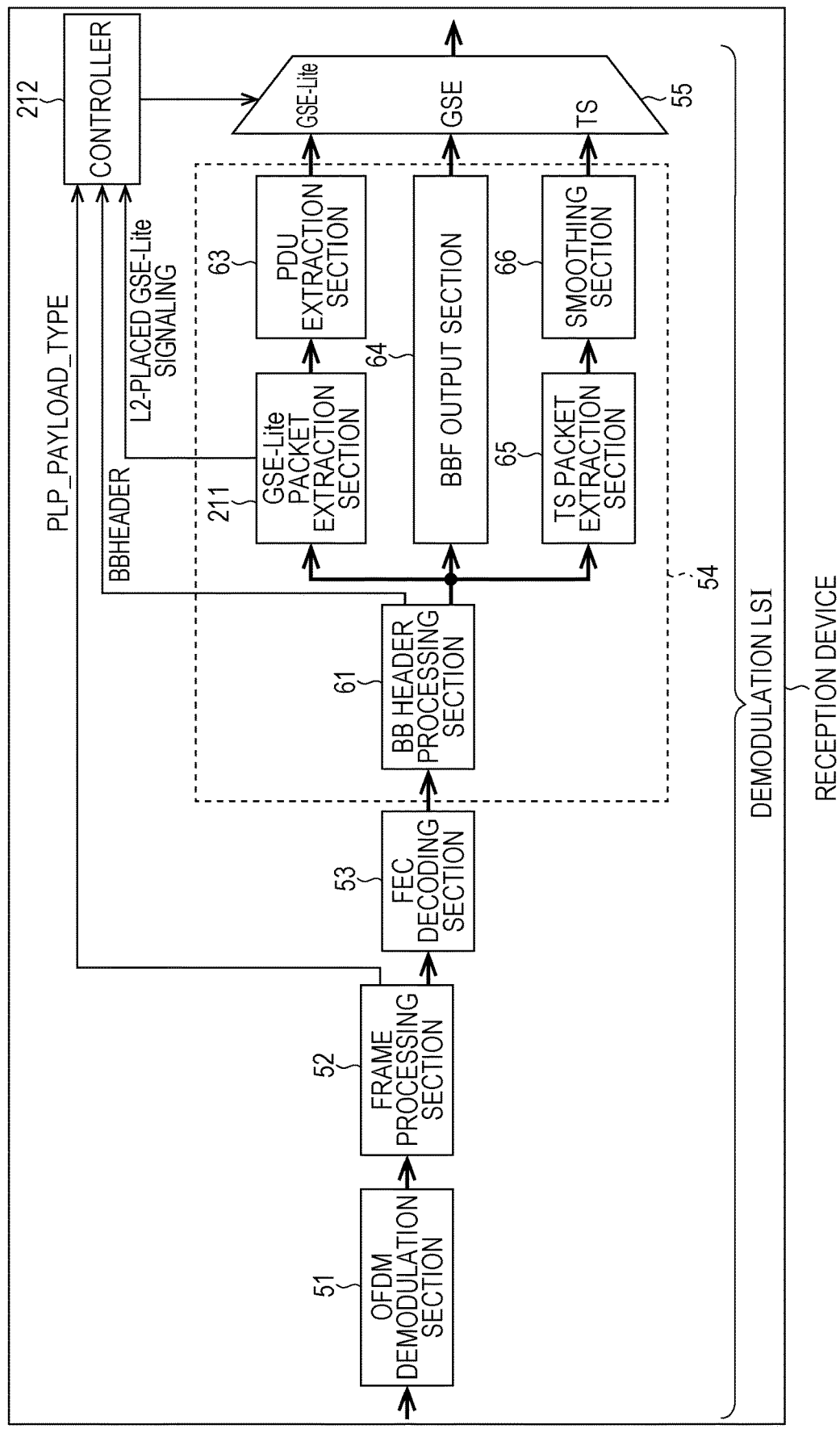
FIG. 29 is a block diagram illustrating a configuration example of a third embodiment of the reception device according to the present technology.

FIG. 29 is a block diagram illustrating a configuration example of the third embodiment of the reception device as the data processing apparatus according to the present technology.

It should be noted that, in the drawing, portions corresponding to the portions in the case of FIG. 14 will be referenced by the same numerals and signs, and thus hereinafter the description thereof will be appropriately omitted.

In the reception device of FIG. 14, the L1-placed GSE-Lite signaling is adopted as the GSE-Lite signaling. However, in the reception device of FIG. 29, the L2-placed GSE-Lite signaling is adopted as the GSE-Lite signaling.

Hence, the reception device of FIG. 29 is configured to be the same as that in the case of FIG. 14 except that, instead of the GSE-Lite packet extraction section 62 and the controller 56 of FIG. 14, a GSE-Lite packet extraction section 211 and a controller 212 are respectively provided.

The GSE-Lite packet extraction section 211 is supplied with the BBF from the BB header processing section 61.

In a similar manner to the GSE-Lite packet extraction section 62 of FIG. 14, the GSE-Lite packet extraction section 211 extracts, from the BBF sent from the BB header processing section 61, the GSE-Lite packet, which is placed in the data field of the BBF, and supplies (outputs) the packet to the PDU extraction section 63.

Further, the GSE-Lite packet extraction section 211 extracts, from the GSE packet (GSE-Lite packet) included in the BBF sent from the BB header processing section 61, the label described in FIG. 23, the protocol type described in FIG. 24, the extension header described in FIG. 25, or the GSE descriptor GSE_Options_descriptor ( ) described in FIG. 26, as the L2-placed GSE-Lite signaling. Then, the GSE-Lite packet extraction section 211 supplies the extracted data to the controller 212.

The controller 212 is supplied with the L2-placed GSE-Lite signaling from the GSE-Lite packet extraction section 211, besides supplied with the normal PLP_PAYLOAD_TYPE from the frame processing section 52, and supplied with the normal BB header from the BB header processing section 61.

In a similar manner to the controller 56 of FIG. 14, the controller 212 controls the respective blocks constituting the reception device as necessary.

Furthermore, the controller 212 performs the identification on the data field that identifies which one of the GSE-Lite packet, the TS packet, and the GSE packet (or the other data) is the BBF data field supplied from the FEC decoding section 53 to the stream processing section 54, on the basis of the PLP_PAYLOAD_TYPE sent from the frame processing section 52, the MATYPE-1 of the BB header sent from the BB header processing section 61, and the L2-placed GSE-Lite signaling sent from the GSE-Lite packet extraction section 211. On the basis of the identification result, the controller 212 controls the output section 55.

That is, the controller 212 identifies which one of the TS packet and the GSE packet (or the other data) is the BBF data field supplied from the FEC decoding section 53 to the stream processing section 54, on the basis of the PLP_PAYLOAD_TYPE sent from the frame processing section 52 or the MATYPE-1 of the BB header sent from the BB header processing section 61.

Furthermore, the controller 212 identifies whether the BBF data field supplied from the FEC decoding section 53 to the stream processing section 54 is the GSE-Lite packet, on the basis of the L2-placed GSE-Lite signaling sent from the GSE-Lite packet extraction section 211.

If it is identified that the BBF data field supplied to the stream processing section 54 is the GSE-Lite packet, in a similar manner to the controller 56 of FIG. 14, the controller 212 controls the output section 55 so as to select the output of the PDU extraction section 63, for the BBF.

As a result, for the BBF supplied to the stream processing section 54, the output section 55 selectively outputs the PDU which is output by the PDU extraction section 63 and is placed in the GSE-Lite packet included in the BBF and of which the size is equal to or less than the limit size.

Further, if it is identified that the BBF data field supplied to the stream processing section 54 is the TS packet, in a similar manner to the controller 56 of FIG. 14, for the BBF, the controller 212 controls the output section 55 so as to select the output of the smoothing section 66.

As a result, for the BBF supplied to the stream processing section 54, the output section 55 selectively outputs the TS packet which is output by the smoothing section 66 and is included in the BBF.

Furthermore, if it is identified that the BBF data field supplied to the stream processing section 54 is the GSE packet, in a similar manner to the controller 56 of FIG. 14, for the BBF, the controller 212 controls the output section 55 so as to select the output of the BBF output section 64.

As a result, for the BBF supplied to the stream processing section 54, the output section 55 selectively outputs the BBF itself which is output by the BBF output section 64.

In the reception device of FIG. 29 configured as described above, it is possible to easily identify whether the GSE packet is the GSE-Lite packet, on the basis of the L2-placed GSE-Lite signaling included in the GSE packet (GSE-Lite packet).

Figure 30:
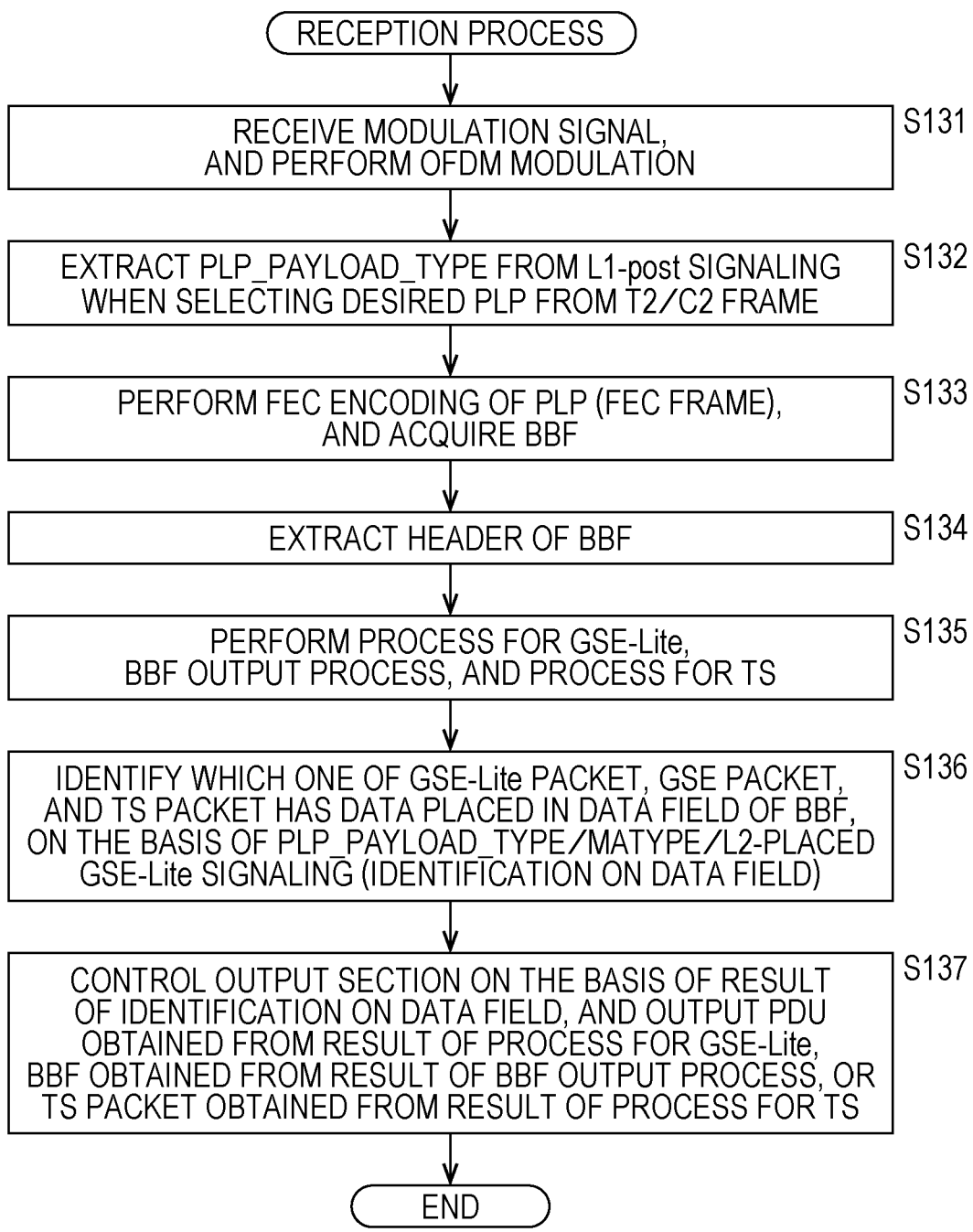
FIG. 30 is a flowchart illustrating a process (reception process) of the reception device.

FIG. 30 is a flowchart illustrating a process (reception process) of the reception device of FIG. 29.

In step S131, in a similar manner to step S31 of FIG. 15, the OFDM modulation section 51 receives the modulation signal which is transmitted from the transmission device of FIG. 27, performs the OFDM demodulation thereon, and supplies the T2 frame or the C2 frame, which is obtained from the result thereof, to the frame processing section 52. Then, the process advances to step S132.

In step S132, in a similar manner to step S32 of FIG. 15, the frame processing section 52 extracts a desired PLP from the T2 frame or the C2 frame, which is sent from the OFDM demodulation section 51, in accordance with, for example, user's operation, and supplies the PLP to the FEC decoding section 53.

Further, the frame processing section 52 extracts the PLP_PAYLOAD_TYPE of the PLP, which is extracted from the T2 frame or the C2 frame, from the L1-post signaling included in the T2 frame or the C2 frame, and supplies the PLP_PAYLOAD_TYPE to the controller 212. Then, the process advances from step S132 to step S133.

In step S133, in a similar manner to step S33 of FIG. 15, the FEC decoding section 53 performs, for example, the FEC decoding, on the PLP, which is sent from the frame processing section 52, as the FEC frame, and supplies the BBF, which is obtained from the result thereof, to the stream processing section 54. Then, the process advances to step S134.

In step S134, in a similar manner to step S34 of FIG. 15, in the stream processing section 54, the BB header processing section 61 extracts the BB header from the BBF which is sent from the FEC decoding section 53, and supplies the BB header to the controller 212.

Furthermore, the BB header processing section 61 supplies the BBF, which is sent from the FEC decoding section 53, to the GSE-Lite packet extraction section 211, the BBF output section 64, and the TS packet extraction section 65. Then, the process advances from step S134 to step S135.

In step S135, a process for GSE-Lite, a BBF output process, and a process for TS are performed. Then, the process advances to step S136.

Here, in the process for GSE-Lite, in a similar manner to the case of step S35 of FIG. 15, the GSE-Lite packet extraction section 211 assumes that the BBF sent from the BB header processing section 61 includes the GSE-Lite packet, extracts the GSE-Lite packet from the BBF, and supplies the packet to the PDU extraction section 63. The PDU extraction section 63 extracts the PDU from the GSE-Lite packet sent from the GSE-Lite packet extraction section 211, and outputs the packet to the output section 55.

Furthermore, in the process for GSE-Lite, the GSE-Lite packet extraction section 211 extracts the L2-placed GSE-Lite signaling from the GSE packet (GSE-Lite packet) included in the BBF sent from the BB header processing section 61, and supplies the signaling to the controller 212.

In the BBF output process, in a similar manner to step S35 of FIG. 15, the BBF output section 64 outputs the BBF, which is sent from the BB header processing section 61, to the output section 55.

In the process for TS, in a similar manner to step S35 of FIG. 15, the TS packet extraction section 65 assumes that the BBF sent from the BB header processing section 61 includes the TS packet, extracts the TS packet from the BBF, and supplies the TS packet to the smoothing section 66. The smoothing section 66 performs smoothing on the TS packet sent from the TS packet extraction section 65, and outputs the packet to the output section 55.

In step S136, the controller 212 performs the identification on the data field that identifies which one of the GSE-Lite packet, the TS packet, and the GSE packet is the BBF data field previously supplied from the FEC decoding section 53 to the stream processing section 54, on the basis of the PLP_PAYLOAD_TYPE sent from the frame processing section 52, the MATYPE-1 of the BB header sent from the BB header processing section 61, or the L2-placed GSE-Lite signaling sent from the GSE-Lite packet extraction section 211. Then, the process advances to step S137.

In step S137, in a similar manner to the case of step S37 of FIG. 15, the controller 212 controls the output section 55 on the basis of the identification result of the identification on the data field of step S136. Thereby, the output section 55 selectively provides one output of the outputs of the PDU extraction section 63, the BBF output section 64, and the smoothing section 66, and the reception process ends.

That is, the output section 55 selectively outputs the PDU, the BBF, or the TS packet, in accordance with the control of the controller 212. The PDU is output by the PDU extraction section 63, and is obtained from the result of the process for GSE-Lite. The BBF is output by the BBF output section 64, and is obtained from the result of the BBF output process. The TS packet is output by the smoothing section 66, and is obtained from the result of the process for TS.

It should be noted that the reception process of FIG. 30 is repeatedly performed in a pipelined manner.

Further, in FIG. 30, in step S135, all of the process for GSE-Lite, the BBF output process, and the process for TS are performed, and thereafter, in step S136, the identification on the data field is performed that identifies which one of the GSE-Lite packet, the TS packet, and the GSE packet is the BBF data field, on the basis of the PLP_PAYLOAD_TYPE, the MATYPE-1, or the L2-placed GSE-Lite signaling. However, by performing the identification on the data field first, it may be possible to perform only any one of the process for GSE-Lite, the BBF output process, and the process for TS, on the basis of the identification result.

That is, if it is identified that, as the result of the identification on the data field, the BBF data field is the GSE-Lite packet, it is possible to perform only the process for GSE-Lite among the process for GSE-Lite, the BBF output process, and the process for TS.

Likewise, if it is identified that, as the result of the identification on the data field, the BBF data field is the GSE packet, it is possible to perform only the BBF output process, and if it is identified that the BBF data field is the TS packet, it is possible to perform only the process for TS.

<Fourth Embodiment of Transmission Device According to Present Technology>

Figure 31:
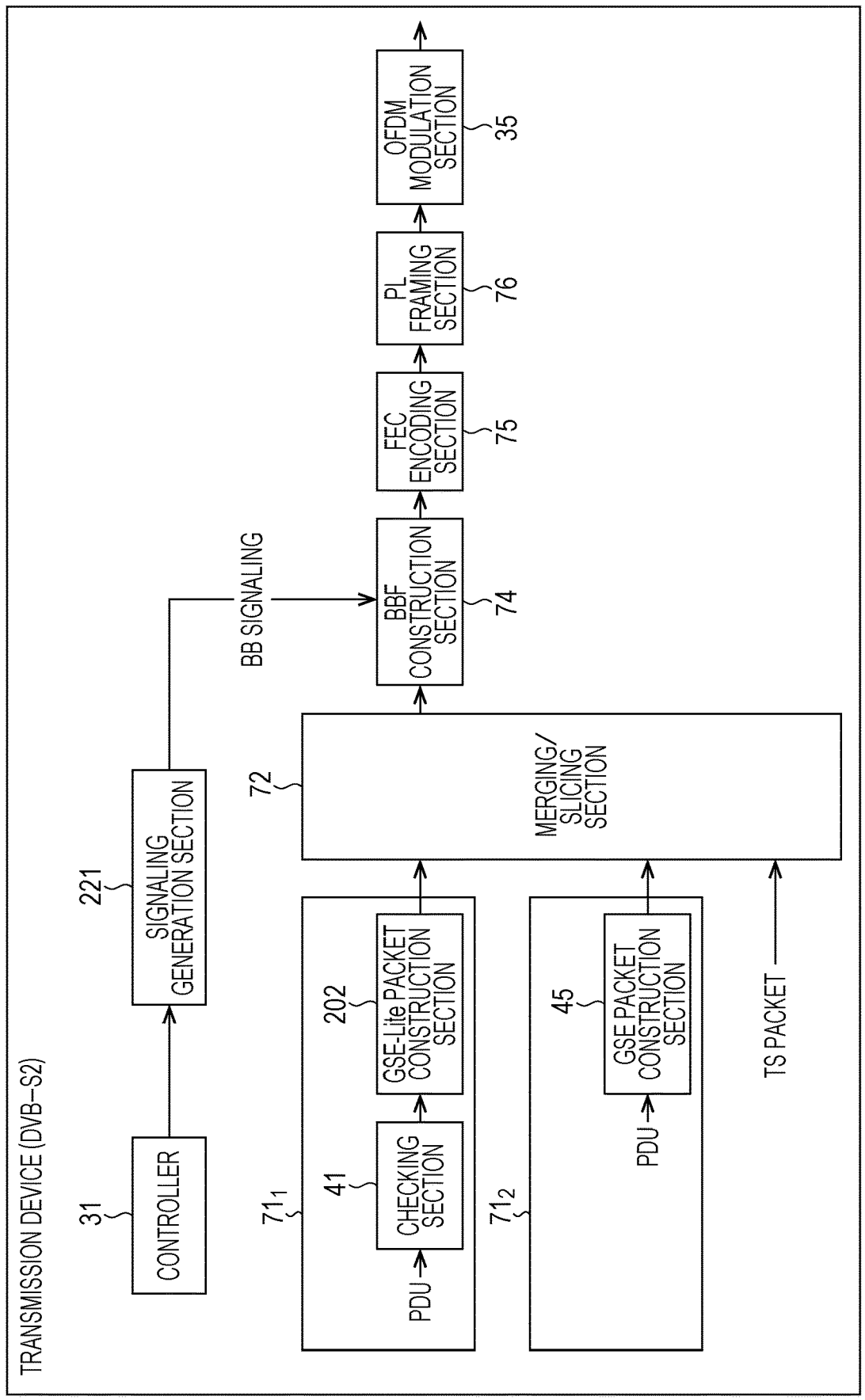
FIG. 31 is a block diagram illustrating a configuration example of a fourth embodiment of the transmission device according to the present technology.

FIG. 31 is a block diagram illustrating a configuration example of a fourth embodiment of the transmission device as the data processing apparatus according to the present technology.

It should be noted that, in the drawing, portions corresponding to the portions in the case of FIG. 16 or 27 will be referenced by the same numerals and signs, and thus hereinafter the description thereof will be appropriately omitted.

In the transmission device of FIG. 16, the L1-placed GSE-Lite signaling is adopted as the GSE-Lite signaling. In the transmission device of FIG. 31, the L2-placed GSE-Lite signaling is adopted as the GSE-Lite signaling.

Hence, the transmission device of FIG. 31 is configured to be the same as that in the case of FIG. 16 except that, instead of the GSE-Lite packet construction section 42 and the signaling generation section 73 of FIG. 16, the GSE-Lite packet construction section 202 of FIG. 27 and a signaling generation section 221 are respectively provided.

In a similar manner to the signaling generation section 73 of FIG. 16, the signaling generation section 221 generates the BB signaling appropriate for the data transmitted from the transmission device, in accordance with the control of the controller 31, and supplies the signaling to the BBF construction section 74.

Here, the signaling generation section 73 of FIG. 16 generates the BB signaling including the L1-placed GSE-Lite signaling as the GSE-Lite signaling. However, the signaling generation section 221 of FIG. 31 generates sort of the normal BB signaling which does not include the L1-placed GSE-Lite signaling and complies with the prescription of the existing DVB-S2.

Figure 32:
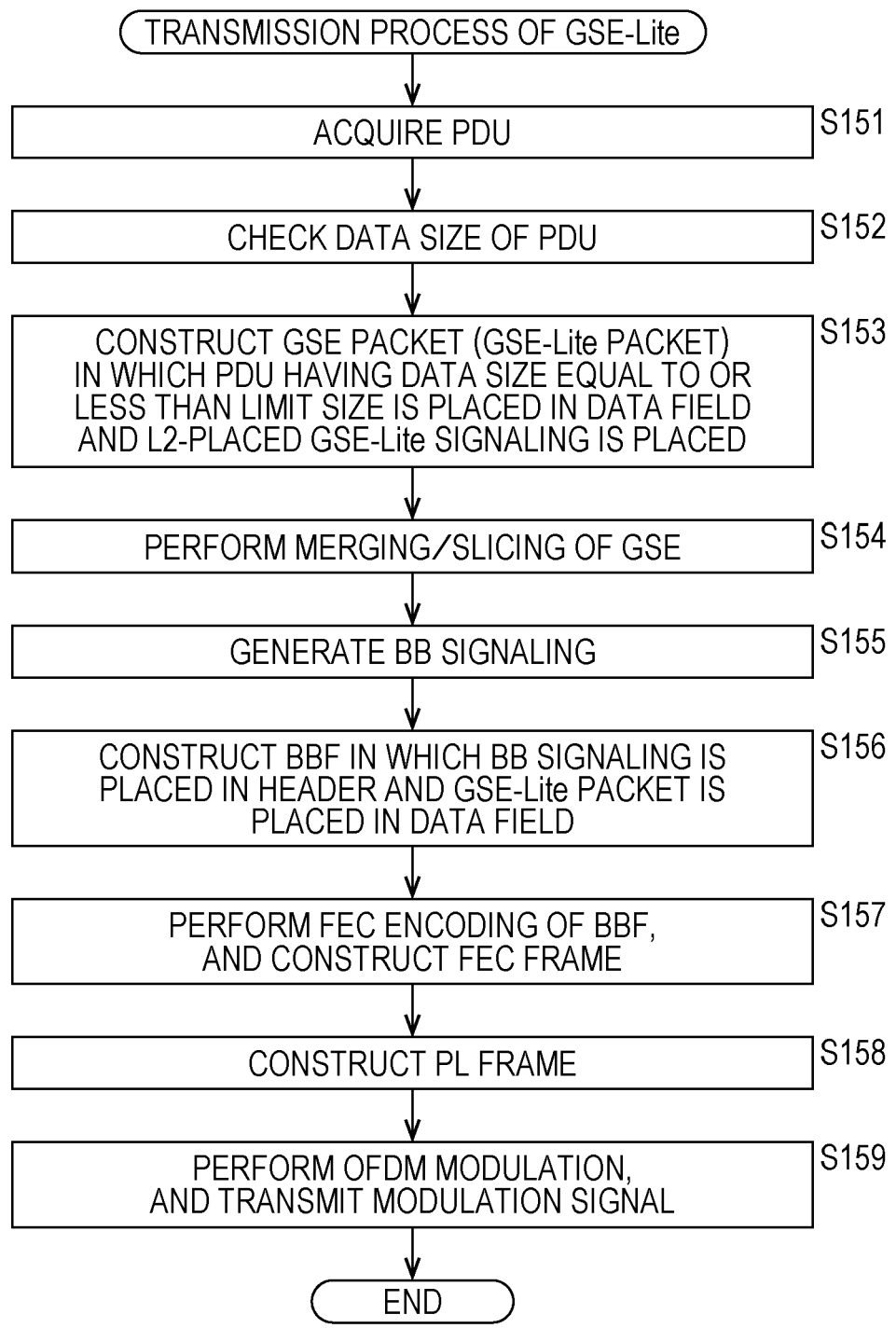
FIG. 32 is a flowchart illustrating a process (GSE-Lite transmission process) of the transmission device.

FIG. 32 is a flowchart illustrating a process (GSE-Lite transmission process) of the transmission device of FIG. 31 in a case of transmitting the GSE-Lite packets (the modulation signal including the GSE-Lite packets).

In step S151, in a similar manner to step SM of FIG. 17, the checking section 41 acquires the PDU including the GSE-Lite packet. Then, the process advances to step S152.

In step S152, in a similar manner to step S52 of FIG. 17, the checking section 41 checks (verifies) the size of the PDU, and supplies the PDU to the GSE-Lite packet construction section 202. Then, the process advances to step S153.

In step S153, the GSE-Lite packet construction section 202 constructs the PDU sent from the checking section 41, that is, the GSE-Lite packet having the PDU, of which the maximum size is limited to the limit size and which is placed in the data field, and having the L2-placed GSE-Lite signaling which is placed therein, and supplies the PDU to the merging/slicing section 72. Then, the process advances to step S154.

In step S154, in a similar manner to step S54 of FIG. 17, the merging/slicing section 72 merges or slices the GSE-Lite packet sent from the GSE-Lite packet construction section 202, as necessary, and supplies the packet to the BBF construction section 74. Then, the process advances to step S155.

In step S155, the signaling generation section 221 generates the normal BB signaling, in accordance with the control of the controller 31, and supplies the signaling to the BBF construction section 74. Then, the process advances to step S156.

In step S156, in a similar manner to step S56 of FIG. 17, the BBF construction section 74 places the GSE-Lite packet, which is sent from the merging/slicing section 72, in the data field, constructs the BBF in which the BB signaling sent from the signaling generation section 221 is placed in the BB header, and supplies the BBF to the FEC encoding section 75. Then, the process advances to step S157.

In step S157, in a similar manner to step S57 of FIG. 17, the FEC encoding section 75 performs the FEC encoding on the BBF sent from the BBF construction section 74, and supplies the FEC frame, which is the FEC code of the BBF obtained from the result of the FEC encoding, to the PL framing section 76. Then, the process advances to step S158.

In step S158, in a similar manner to step S58 of FIG. 17, the PL framing section 76 constructs the PL frame by adding the PL header to FEC frame sent from the FEC encoding section 75, and supplies the frame to the OFDM modulation section 35. Then, the process advances to step S159.

In step S159, in a similar manner to step S59 of FIG. 17, the OFDM modulation section 35 performs the OFDM modulation on the PL frame sent from the PL framing section 76, and transmits the modulation signal which is obtained from the result thereof, and the GSE-Lite transmission process ends.

It should be noted that the GSE-Lite transmission process of FIG. 32 is repeatedly performed in a pipelined manner.

<Fourth Embodiment of Reception Device According to Present Technology>

Figure 33:
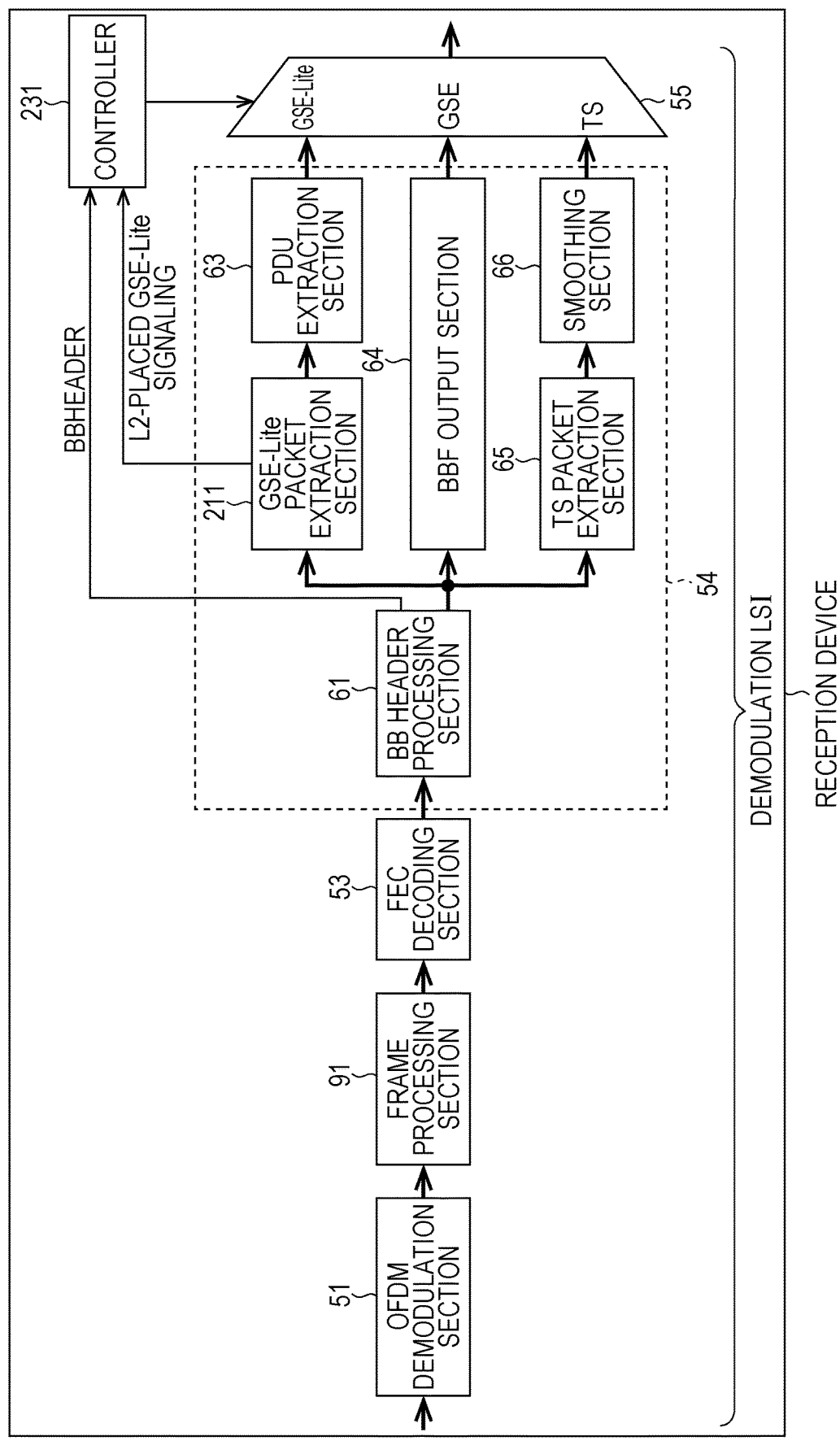
FIG. 33 is a block diagram illustrating a configuration example of a fourth embodiment of the reception device according to the present technology.

FIG. 33 is a block diagram illustrating a configuration example of the fourth embodiment of the reception device as the data processing apparatus according to the present technology.

It should be noted that, in the drawing, portions corresponding to the portions in the case of FIG. 21 or 29 will be referenced by the same numerals and signs, and thus hereinafter the description thereof will be appropriately omitted.

In the reception device of FIG. 21, the L1-placed GSE-Lite signaling is adopted as the GSE-Lite signaling. However, in the reception device of FIG. 33, the L2-placed GSE-Lite signaling is adopted as the GSE-Lite signaling.

Hence, the reception device of FIG. 33 is configured to be the same as that in the case of FIG. 21 except that, instead of the GSE-Lite packet extraction section 62 and the controller 92 of FIG. 21, the GSE-Lite packet extraction section 211 of FIG. 29 and a controller 231 are respectively provided.

The controller 231 is supplied with the normal BB header from the BB header processing section 61, and supplied with the L2-placed GSE-Lite signaling from the GSE-Lite packet extraction section 211.

In a similar manner to the controller 92 of FIG. 21, the controller 231 controls the respective blocks constituting the reception device as necessary.

Furthermore, the controller 231 performs the identification on the data field that identifies which one of the GSE-Lite packet, the TS packet, and the GSE packet is the BBF data field supplied from the FEC decoding section 53 to the stream processing section 54, on the basis of the BB header (BB signaling) sent from the BB header processing section 61 or the L2-placed GSE-Lite signaling sent from the GSE-Lite packet extraction section 211. On the basis of the identification result, the controller 231 controls the output section 55.

That is, the controller 231 identifies which one of the TS packet and the GSE packet (or the other data) is the BBF data field supplied from the FEC decoding section 53 to the stream processing section 54, on the basis of the MATYPE-1 of the BB header sent from the BB header processing section 61.

Furthermore, the controller 231 identifies whether the BBF data field supplied from the FEC decoding section 53 to the stream processing section 54 is the GSE-Lite packet, on the basis of the L2-placed GSE-Lite signaling sent from the GSE-Lite packet extraction section 211.

If it is identified that the BBF data field supplied to the stream processing section 54 is the GSE-Lite packet, in a similar manner to the controller 92 of FIG. 21, the controller 231 controls the output section 55 so as to select the output of the PDU extraction section 63, for the BBF.

As a result, for the BBF supplied to the stream processing section 54, the output section 55 selectively outputs the PDU which is output by the PDU extraction section 63 and is placed in the GSE-Lite packet included in the BBF and of which the size is equal to or less than the limit size.

Further, if it is identified that the BBF data field supplied to the stream processing section 54 is the TS packet, in a similar manner to the controller 92 of FIG. 21, for the BBF, the controller 231 controls the output section 55 so as to select the output of the smoothing section 66.

As a result, for the BBF supplied to the stream processing section 54, the output section 55 selectively outputs the TS packet which is output by the smoothing section 66 and is included in the BBF.

Furthermore, if it is identified that the BBF data field supplied to the stream processing section 54 is the GSE packet, in a similar manner to the controller 92 of FIG. 21, for the BBF, the controller 231 controls the output section 55 so as to select the output of the BBF output section 64.

As a result, for the BBF supplied to the stream processing section 54, the output section 55 selectively outputs the BBF itself which is output by the BBF output section 64.

Figure 34:
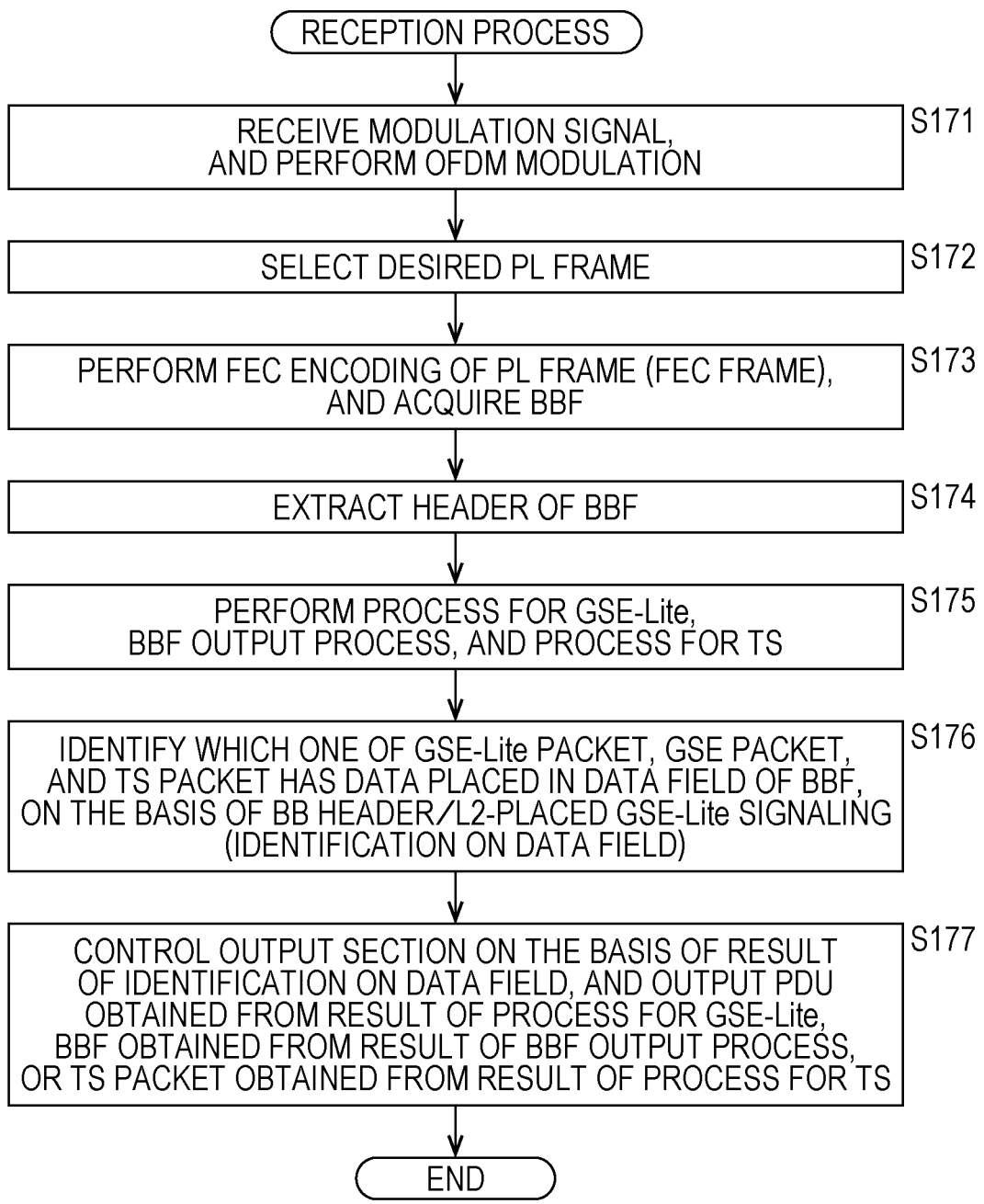
FIG. 34 is a flowchart illustrating a process (reception process) of the reception device.

FIG. 34 is a flowchart illustrating a process (reception process) of the reception device of FIG. 33.

In step S171, in a similar manner to step S71 of FIG. 22, the OFDM modulation section 51 receives the modulation signal which is transmitted from the transmission device of FIG. 31, performs the OFDM demodulation thereon, and supplies the PL frame, which is obtained from the result thereof, to the frame processing section 91. Then, the process advances to step S172.

In step S172, in a similar manner to step S72 of FIG. 22, the frame processing section 91 extracts a desired PL frame from the PL frame, which is sent from the OFDM demodulation section 51, in accordance with, for example, user's operation, and supplies the PL frame to the FEC decoding section 53. Then, the process advances to step S173.

In step S173, in a similar manner to step S73 of FIG. 22, the FEC decoding section 53 performs, for example, the FEC decoding of the FEC frame, on the FEC frame included in the PL frame sent from the frame processing section 52, and supplies the BBF, which is obtained from the result thereof, to the stream processing section 54. Then, the process advances to step S174.

In step S174, in the stream processing section 54, in a similar manner to step S74 of FIG. 22, the BB header processing section 61 extracts the BB header from the BBF which is sent from the FEC decoding section 53, and supplies the BB header to the controller 231.

Furthermore, in a similar manner to step S74 of FIG. 22, the BB header processing section 61 supplies the BBF, which is sent from the FEC decoding section 53, to the GSE-Lite packet extraction section 211, the BBF output section 64, and the TS packet extraction section 65. Then, the process advances from step S174 to step S175.

In step S175, the process for GSE-Lite, the BBF output process, and the process for TS are performed. Then, the process advances to step S176.

That is, in the process for GSE-Lite, in a similar manner to the case of step S75 of FIG. 22, the GSE-Lite packet extraction section 211 assumes that the BBF sent from the BB header processing section 61 includes the GSE-Lite packet, extracts the GSE-Lite packet from the BBF, and supplies the packet to the PDU extraction section 63. The PDU extraction section 63 extracts the PDU from the GSE-Lite packet sent from the GSE-Lite packet extraction section 211, and outputs the packet to the output section 55.

Furthermore, in the process for GSE-Lite, the GSE-Lite packet extraction section 211 extracts the L2-placed GSE-Lite signaling from the GSE packet (GSE-Lite packet) included in the BBF sent from the BB header processing section 61, and supplies the signaling to the controller 231.

Further, in the BBF output process, in a similar manner to step S75 of FIG. 22, the BBF output section 64 outputs the BBF, which is sent from the BB header processing section 61, to the output section 55.

Furthermore, in the process for TS, in a similar manner to step S75 of FIG. 22, the TS packet extraction section 65 assumes that the BBF sent from the BB header processing section 61 includes the TS packet, extracts the TS packet from the BBF, and supplies the TS packet to the smoothing section 66. The smoothing section 66 performs smoothing on the TS packet sent from the TS packet extraction section 65, and outputs the packet to the output section 55.

In step S176, the controller 231 performs the identification on the data field that identifies which one of the GSE-Lite packet, the TS packet, and the GSE packet is the BBF data field previously supplied from the FEC decoding section 53 to the stream processing section 54, on the basis of the BB header (BB signaling) sent from the BB header processing section 61 or the L2-placed GSE-Lite signaling sent from the GSE-Lite packet extraction section 211. Then, the process advances to step S177.

In step S177, in a similar manner to the case of step S77, the controller 231 controls the output section 55 on the basis of the identification result of the identification on the data field of step S176. Thereby, the output section 55 selectively provides one output of the outputs of the PDU extraction section 63, the BBF output section 64, and the smoothing section 66, and the reception process ends.

That is, the output section 55 selectively outputs the PDU, the BBF, or the TS packet, in accordance with the control of the controller 231. The PDU is output by the PDU extraction section 63, and is obtained from the result of the process for GSE-Lite. The BBF is output by the BBF output section 64, and is obtained from the result of the BBF output process. The TS packet is output by the smoothing section 66, and is obtained from the result of the process for TS.

It should be noted that the reception process of FIG. 34 is repeatedly performed in a pipelined manner.

Further, in FIG. 34, in step S175, all of the process for GSE-Lite, the BBF output process, and the process for TS are performed, and thereafter, in step S176, the identification on the data field is performed that identifies which one of the GSE-Lite packet, the TS packet, and the GSE packet is the BBF data field, on the basis of the BB header as the GSE-Lite signaling. However, by performing the identification on the data field first, it may be possible to perform only any one of the process for GSE-Lite, the BBF output process, and the process for TS, on the basis of the identification result.

That is, if it is identified that, as the result of the identification on the data field, the BBF data field is the GSE-Lite packet, it is possible to perform only the process for GSE-Lite among the process for GSE-Lite, the BBF output process, and the process for TS.

Likewise, if it is identified that, as the result of the identification on the data field, the BBF data field is the GSE packet, it is possible to perform only the BBF output process, and if it is identified that the BBF data field is the TS packet, it is possible to perform only the process for TS.

In addition, in the transmission device of FIG. 27, the signaling generation section 201 generates the normal BB signaling and the L1 signaling. However, in a similar manner to the signaling generation section 32 of FIG. 9, the signaling generation section 201 generates the L1 signaling or the BB signaling including the L1-placed GSE-Lite signaling.

In this case, the modulation signal, which is transmitted by the transmission device of FIG. 27, includes both of: the L1-placed GSE-Lite signaling for identifying the GSE-Lite packet in the physical layer; and the L2-placed GSE-Lite signaling for identifying the GSE-Lite packet in the data link layer. Therefore, it is possible to identify the GSE-Lite packet in either of the reception device of FIG. 14 compliant with only the L1-placed GSE-Lite signaling and the reception device of FIG. 29 compliant with only the L2-placed GSE-Lite signaling.

Further, in the reception device of FIG. 29, in the controller 212, the GSE-Lite packet is identified on the basis of the L2-placed GSE-Lite signaling. However, the controller 212 may be configured such that the identification on the GSE-Lite packet can be performed on the basis of either of the L1-placed GSE-Lite signaling and the L2-placed GSE-Lite signaling.

When the controller 212 is configured such that the identification on the GSE-Lite packet can be performed on the basis of either of the L1-placed GSE-Lite signaling and the L2-placed GSE-Lite signaling, in the reception device of FIG. 29, the identification on the GSE-Lite packet can be performed on the modulation signal sent from either of the transmission devices of FIGS. 9 and 27.

When the controller 212 is configured such that the identification on the GSE-Lite packet can be performed on the basis of either of the L1-placed GSE-Lite signaling and the L2-placed GSE-Lite signaling, the output section 55 is controlled on the basis of the L1-placed GSE-Lite signaling, for the modulation signal sent from the transmission device of FIG. 9, and the output section 55 is controlled on the basis of the L2-placed GSE-Lite signaling, for the modulation signal sent from the transmission device of FIG. 27 (the output section 55 is controlled on the basis of the L1-placed GSE-Lite signaling or the L2-placed GSE-Lite signaling).

Likewise, the above-mentioned configurations can be applied to not only the transmission device of FIG. 27 and the reception device of FIG. 29 but also the transmission device of FIG. 31 and the reception device of FIG. 33.

<Fifth Embodiment of Reception Device According to Present Technology>

Figure 35:
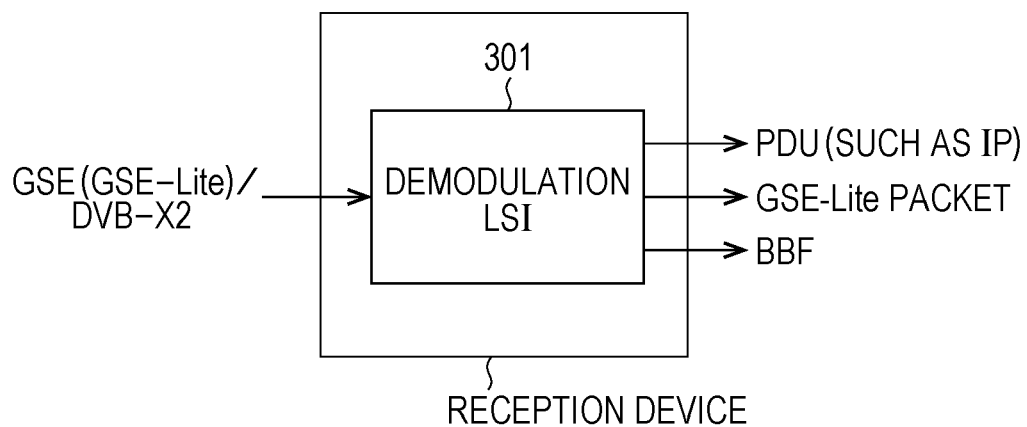
FIG. 35 is a block diagram illustrating a brief overview of a configuration example of a fifth embodiment of the reception device as the data processing apparatus according to the present technology.

FIG. 35 is a block diagram illustrating a brief overview of a configuration example of a fifth embodiment of the reception device as the data processing apparatus according to the present technology.

In FIG. 35, the reception device has a demodulation LSI 301.

In a similar manner to the demodulation LSI 21 of FIG. 8, the demodulation LSI 301 receives the modulation signal of the DVB-X2, and demodulates the modulation signal into the BBF.

When the BBF includes the GSE-Lite packet, in a similar manner to the demodulation LSI 21 of FIG. 8, the demodulation LSI 301 extracts the GSE-Lite packet from the BBF, extracts the PDU (such as the IP packet) from the GSE-Lite packet, and outputs the PDU to the outside.

Further, when the BBF includes the GSE packet other than the GSE-Lite packet, in a similar manner to the demodulation LSI 21 of FIG. 8, the demodulation LSI 301 outputs the BBF to the outside as it is.

In addition, when the BBF includes the GSE-Lite packet, the demodulation LSI 301 not only extracts the GSE-Lite packet from the BBF, extracts the PDU from the GSE-Lite packet, and outputs the PDU to the outside, as described above, but also may output the GSE-Lite packet itself to the outside.

In the demodulation LSI 301, it is possible to select whether to output the GSE-Lite packet or to output the PDU extracted from the GSE-Lite packet.

Figure 36:
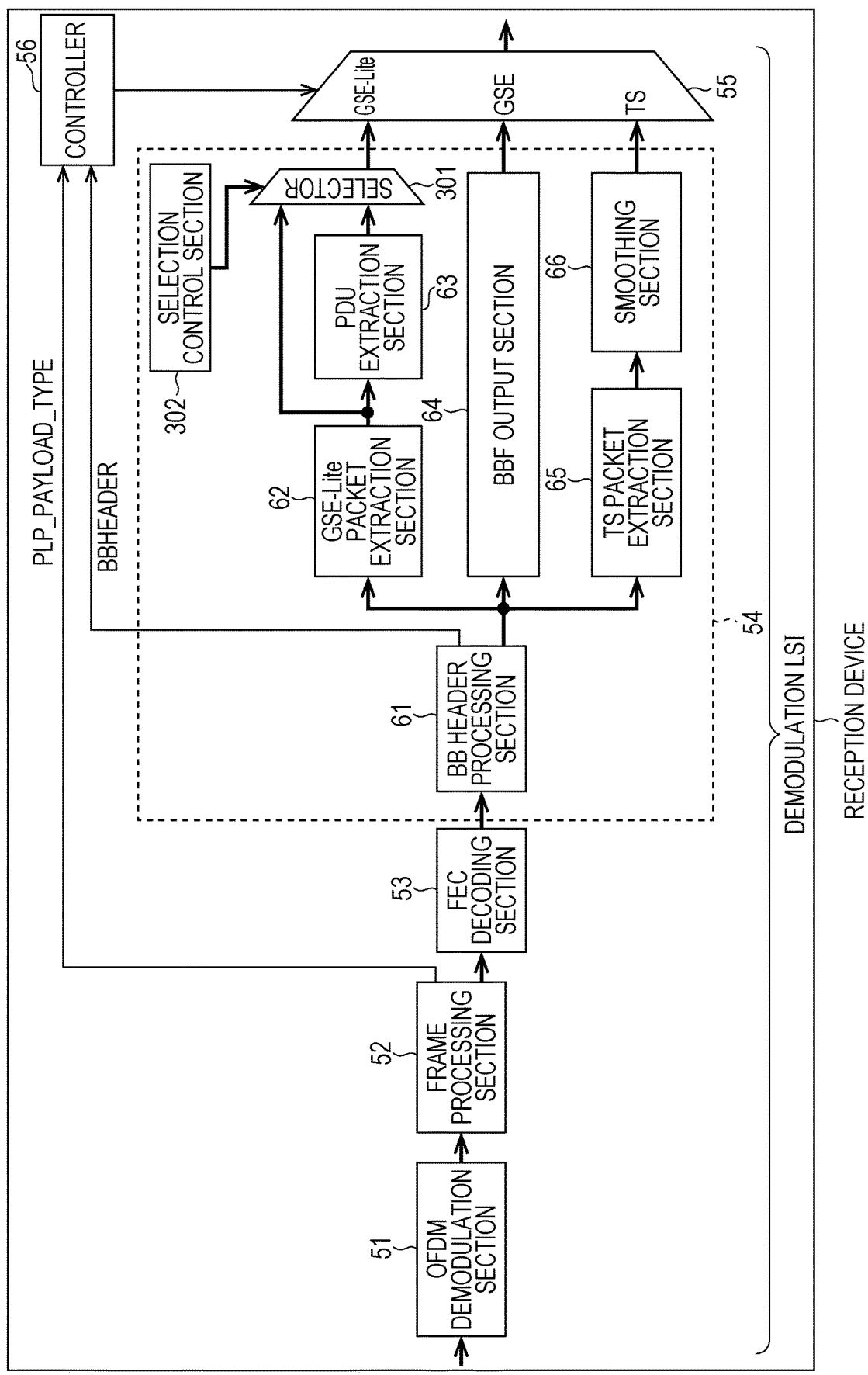
FIG. 36 is a block diagram illustrating details of a configuration example of the fifth embodiment of the reception device as the data processing apparatus according to the present technology.

FIG. 36 is a block diagram illustrating details of a configuration example of the fifth embodiment of the reception device as the data processing apparatus according to the present technology.

It should be noted that, in the drawing, portions corresponding to the portions in the case of FIG. 14 will be referenced by the same numerals and signs, and thus hereinafter the description thereof will be appropriately omitted.

The reception device of FIG. 36 is configured to be the same as that in the case of FIG. 14 except that a selector 301 and a selection control section 302 are newly provided.

The selector 301 is supplied with the GSE-Lite packet from the GSE-Lite packet extraction section 62, and supplied with the PDU, which is extracted from the GSE-Lite packet, from the PDU extraction section 63.

The selector 301 selects, in accordance with the control of the selection control section 302, the GSE-Lite packet sent from the GSE-Lite packet extraction section 62 or the PDU which is sent from the PDU extraction section 63 and is extracted from the GSE-Lite packet, and supplies the selected one to the output section 55.

The selection control section 302 controls the selector 301 in accordance with, for example, user's operation or the like, thereby selecting the GSE-Lite packet, which is output from the GSE-Lite packet extraction section 62, or the PDU, which is output from the PDU extraction section 63, to the selector 301, and outputting the selected one to the output section 55.

In the reception device configured as described above, the selector 301 selects, in accordance with the control of the selection control section 302, the GSE-Lite packet, which is sent from the GSE-Lite packet extraction section 62, or the PDU, which is sent from the PDU extraction section 63 and is extracted from the GSE-Lite packet, and supplies (outputs) the selected on to the output section 55.

Consequently, in FIG. 14, if it is identified that the BBF data field previously supplied from the FEC decoding section 53 to the stream processing section 54 is the GSE-Lite packet on the basis of the L1-placed GSE-Lite signaling, the output section 55 outputs the PDU which is output by the PDU extraction section 63 and is extracted from the GSE-Lite packet. However, in FIG. 36, the output section 55 is able to select which one of the GSE-Lite packet and the PDU to output, where the GSE-Lite packet is output by the GSE-Lite packet extraction section 62, and the PDU is output by the PDU extraction section 63 and is extracted from the GSE-Lite packet.

In the selector 301, when the GSE-Lite packet output by the GSE-Lite packet extraction section 62 is selected and is output from the output section 55 to the outside, and the GSE-Lite packet can be processed by an external device.

In addition, the reception devices of FIGS. 21, 29, and 33, can also be configured, as in FIG. 36, such that each of the reception devices has the selector 301 and the selection control section 302 and is able to select whether to output the GSE-Lite packet or to output the PDU extracted by the GSE-Lite packet.

Further, the reception devices of FIGS. 14, 21, 29, and 33 can be configured without the PDU extraction section 63. When the reception devices of FIGS. 14, 21, 29, and 33 are configured without the PDU extraction section 63, the GSE-Lite packets, which are output by the GSE-Lite packet extraction sections 62 and 211, are supplied to the output section 55, and are output to the outside. In this case, the GSE-Lite packet can be processed by the external device.

[Description of Computer According to Present Technology]

Next, the above-mentioned series of processes may be performed by hardware, or may be performed by software. When the series of processes is performed by software, the program constituting the software is installed in a computer such as a microcomputer.

Accordingly, FIG. 37 shows a configuration example of an embodiment of the computer in which the program for executing the above-mentioned series of processes is installed.

The program can be recorded in advance in a hard disk 105 or a ROM 103 as a recording medium which is built in the computer.

Alternatively, the program can be stored (recorded) in a removable recording medium 111. Such a removable recording medium 111 can be provided as so-called package software. Here, examples of the removable recording medium 111 include a flexible disk, a compact disc read only memory (CD-ROM), a magneto optical (MO) disc, a digital versatile disc (DVD), a magnetic disk, a semiconductor memory, and the like.

It should be noted that the program can be, as well as installed in the computer from the removable recording medium 111 as described above, installed in the built-in hard disk 105 by being downloaded into the computer through a communication network or a broadcast network. That is, the program can be transmitted to a computer in a wireless fashion through a satellite for digital satellite broadcasting, or transmitted to the computer in a wired fashion through a network such as a local area network (LAN) or the Internet.

The computer has a central processing unit (CPU) 102 built therein. The CPU 102 is connected to an input/output interface 110 through a bus 101.

When a command is input through an operation or the like of an input section 107 operated by a user through the input/output interface 110, the CPU 102 executes the program stored in a read only memory (ROM) 103 in accordance with the command. Alternatively, the CPU 102 loads the program, which is stored in the hard disk 105, onto a random access memory (RAM) 104, and executes the program.

Thereby, the CPU 102 performs the processes according to the flowcharts described above or the processes performed by the configuration of the block diagrams described above. Then, the CPU 102 causes this processing result to be, as necessary, for example, output from an output section 106 through the input/output interface 110, transmitted from the communication section 108, or recorded or the like in the hard disk 105.

It should be noted that the input section 107 is implemented as a keyboard, a mouse, a microphone, or the like. Further, the output section 106 is implemented as a liquid crystal display (LCD), a speaker, or the like.

Here, in the present description, the process of the program performed by the computer may not necessarily be performed in time sequence in the order described in the flowcharts. That is, the process of the program performed by the computer includes processes executed in parallel or individually (for example, parallel processes or object-based processes).

Further, the program may be processed by one computer (processor) or may be processed in a distributed fashion by a plurality of computers.

It should be noted that embodiments of the present technology are not limited to the embodiments described above, and various modifications can be made without departing from the scope of the present technology.

That is, the present technology can also be applied to a case where the GSE-Lite packet is transmitted by, for example, DVB-NGH, advanced television systems committee (ATSC) 3.0, and another standard other than the DVB-T2, the DVB-C2, and the DVB-S2.

It should be noted that, according to the present technology, it is possible to adopt the following configurations.

<1>
A data processing apparatus including
a packet construction section that constructs a GSE-Lite packet by using, as a target, only a protocol data unit (PDU) whose maximum size is limited to a predetermined limit size of 4096 bytes or less, where the GSE-Lite packet is a generic stream encapsulation (GSE) packet having the PDU placed in a data field,
in which the GSE-Lite packet includes GSE-Lite signaling which is signaling for identifying whether data is the GSE-Lite packet in a data link layer of an open systems interconnection (OSI) reference model.

<2>
The data processing apparatus according to <1>,
in which the packet construction section constructs the GSE-Lite packet in which the GSE-Lite signaling is included in a GSE header.

<3>
The data processing apparatus according to <2>,
in which the packet construction section uses a label of the GSE header in the GSE-Lite signaling.

<4>
The data processing apparatus according to <2>,
in which the packet construction section uses a protocol type of the GSE header in the GSE-Lite signaling.

<5>
The data processing apparatus according to <2>,
in which the packet construction section uses an extension header of the GSE header in the GSE-Lite signaling.

<6>
The data processing apparatus according to <1>,
in which the packet construction section constructs the GSE-Lite packet also serving as a GSE-LLC packet which is a GSE packet where a protocol type of a GSE header is set as a value allocated in a GSE packet to transmit logical link control (LLC) information, and
in which a descriptor of the GSE-LLC packet is used in the GSE-Lite signaling.

<7>
The data processing apparatus according to any one of <1> to <6>,
in which the GSE-Lite packet is transmitted together with other GSE-Lite signaling for identifying whether data is the GSE-Lite packet in a physical layer of the OSI reference model.

<8>
The data processing apparatus according to any one of <1> to <7>,
in which the limit size is 1542 bytes, 1538 bytes, 1530 bytes, 1526 bytes, 1522 bytes, 1518 bytes, or 1500 bytes.

<9>
A data processing method including
a packet construction step of constructing a GSE-Lite packet by using, as a target, only a protocol data unit (PDU) whose maximum size is limited to a predetermined limit size of 4096 bytes or less, where the GSE-Lite packet is a generic stream encapsulation (GSE) packet having the PDU placed in a data field,
in which the GSE-Lite packet includes GSE-Lite signaling which is signaling for identifying whether data is the GSE-Lite packet in a data link layer of an open systems interconnection (OSI) reference model.

<10>
A program causing a computer to function as
a packet construction section that constructs a GSE-Lite packet by using, as a target, only a protocol data unit (PDU) whose maximum size is limited to a predetermined limit size of 4096 bytes or less, where the GSE-Lite packet is a generic stream encapsulation (GSE) packet having the PDU placed in a data field,
in which the GSE-Lite packet includes GSE-Lite signaling which is signaling for identifying whether data is the GSE-Lite packet in a data link layer of an open systems interconnection (OSI) reference model.

<11>
A data processing apparatus including:
a reception section that receives a GSE-Lite packet including GSE-Lite signaling, which is signaling for identifying whether data is the GSE-Lite packet in a data link layer of an open systems interconnection (OSI) reference model, where the GSE-Lite packet is constructed by using, as a target, only a protocol data unit (PDU) whose maximum size is limited to a predetermined limit size of 4096 bytes or less, and the GSE-Lite packet is a generic stream encapsulation (GSE) packet having the PDU placed in a data field; and an output section that outputs the GSE-Lite packet or the PDU, which is extracted from the GSE-Lite packet, when the GSE-Lite signaling indicates that data is the GSE-Lite packet.

<12>

The data processing apparatus according to <11>, in which the reception section receives the GSE-Lite packet in which the GSE-Lite signaling is included in a GSE header, and in which the data processing apparatus further comprises a control section that controls an output of the output section in response to the GSE-Lite signaling included in the GSE header.

<13>

The data processing apparatus according to <12>, in which the control section controls the output of the output section by using a label of the GSE header as the GSE-Lite signaling.

<14>

The data processing apparatus according to <12>, in which the control section controls the output of the output section by using a protocol type of the GSE header as the GSE-Lite signaling.

<15>

The data processing apparatus according to <12>, in which the control section controls the output of the output section by using an extension header of the GSE header as the GSE-Lite signaling.

<16>

The data processing apparatus according to <11>, in which the reception section receives the GSE-Lite packet also serving as a GSE-LLC packet which is a GSE packet where a protocol type of a GSE header is set as a value allocated in a GSE packet to transmit logical link control (LLC) information, in which the data processing apparatus further comprises a control section that controls an output of the output section in response to the GSE-Lite signaling by using a descriptor of the GSE-LLC packet as the GSE-Lite signaling.

<17>

The data processing apparatus according to any one of <11> to <16>, in which the reception section receives, together with the GSE-Lite packet, other GSE-Lite signaling for identifying whether data is the GSE-Lite packet in a physical layer of the OSI reference model, and in which the data processing apparatus further comprises a control section that controls an output of the output section in response to the GSE-Lite signaling or the other GSE-Lite signaling.

<18>

The data processing apparatus according to any one of <11> to <17>, in which the limit size is 1542 bytes, 1538 bytes, 1530 bytes, 1526 bytes, 1522 bytes, 1518 bytes, or 1500 bytes.

<19>

A data processing method including:

a reception step of receiving a GSE-Lite packet including GSE-Lite signaling, which is signaling for identifying whether data is the GSE-Lite packet in a data link layer of an open systems interconnection (OSI) reference model, where the GSE-Lite packet is constructed by using, as a target, only a protocol data unit (PDU) whose maximum size is limited to a predetermined limit size of 4096 bytes or less, and the GSE-Lite packet is a generic stream encapsulation (GSE) packet having the PDU placed in a data field; and an output step of outputting the GSE-Lite packet or the PDU, which is extracted from the GSE-Lite packet, when the GSE-Lite signaling indicates that data is the GSE-Lite packet.

<20>

A program causing a computer to function as:

a reception section that receives a GSE-Lite packet including GSE-Lite signaling, which is signaling for identifying whether data is the GSE-Lite packet in a data link layer of an open systems interconnection (OSI) reference model, where the GSE-Lite packet is constructed by using, as a target, only a protocol data unit (PDU) whose maximum size is limited to a predetermined limit size of 4096 bytes or less, and the GSE-Lite packet is a generic stream encapsulation (GSE) packet having the PDU placed in a data field; and an output section that outputs the GSE-Lite packet or the PDU, which is extracted from the GSE-Lite packet, when the GSE-Lite signaling indicates that data is the GSE-Lite packet.

REFERENCE SIGNS LIST

21 DEMODULATION LSI
31 CONTROLLER
32 SIGNALING GENERATION SECTION
$33_1$, $33_2$, $33_3$ DATA CONSTRUCTION SECTION
34 FRAMING SECTION
35 OFDM MODULATION SECTION
41 CHECKING SECTION
42 GSE-Lite PACKET CONSTRUCTION SECTION
43 BBF CONSTRUCTION SECTION
44 FEC ENCODING SECTION
45 GSE PACKET CONSTRUCTION SECTION
46 BBF CONSTRUCTION SECTION
47 FEC ENCODING SECTION
48 BBF CONSTRUCTION SECTION
49 FEC ENCODING SECTION
51 OFDM DEMODULATION SECTION
52 FRAME PROCESSING SECTION
53 FEC DECODING SECTION
54 STREAM PROCESSING SECTION
55 OUTPUT SECTION
56 CONTROLLER
61 BB HEADER PROCESSING SECTION
62 GSE-Lite PACKET EXTRACTION SECTION
63 PDU EXTRACTION SECTION
64 BBF OUTPUT SECTION
65 TS PACKET EXTRACTION SECTION
66 SMOOTHING SECTION
$71_1$, $71_2$ DATA CONSTRUCTION SECTION
72 MERGING/SLICING SECTION
73 SIGNALING GENERATION SECTION
74 BBF CONSTRUCTION SECTION
75 FEC ENCODING SECTION
76 PL FRAMING SECTION
91 FRAME PROCESSING SECTION
92 CONTROLLER
101 BUS
102 CPU
103 ROM
104 RAM
105 HARD DISK 106 OUTPUT SECTION
107 INPUT SECTION
108 COMMUNICATION SECTION
109 DRIVE
110 INPUT/OUTPUT INTERFACE
111 REMOVABLE RECORDING MEDIUM
201 SIGNALING GENERATION SECTION
202 GSE-Lite PACKET CONSTRUCTION SECTION
211 GSE-Lite PACKET EXTRACTION SECTION
212 CONTROLLER
221 SIGNALING GENERATION SECTION
231 CONTROLLER
301 SELECTOR
302 SELECTION CONTROL SECTION

The invention claimed is:

1. A reception apparatus comprising:
receive circuitry configured to receive:
a predetermined type of generic stream encapsulation (GSE) packet having a data field containing a protocol data unit (PDU) whose maximum size is restricted to a limit size that is 4096 bytes or less, and
signaling in an open systems interconnection (OSI) layer lower than an OSI data link layer, the signaling indicating whether a given GSE packet received by the circuitry is of the predetermined type of GSE packet; and
output circuitry configured to output a PDU of the given GSE packet when the signaling indicates that the given GSE packet is of the predetermined type of GSE packet,
wherein the output circuitry is configured to output the given GSE packet when the signaling indicates that the given GSE packet is not of the predetermined type of GSE packet, and wherein the predetermined type of GSE packet is a GSE-Lite packet type.

2. The apparatus of claim 1, wherein the data field of the predetermined type of GSE packet contains a complete PDU.

3. The apparatus of claim 1, wherein the limit size is 1800 bytes, 1542 bytes, 1538 bytes, 1530 bytes, 1526 bytes, 1522 bytes, 1518 bytes, or 1500 bytes.

4. The apparatus of claim 1, wherein:
the receive circuitry is adapted to receive a base band frame having a base band header and a base band data field,
the base band data field contains the PDU, and
the base band header contains the signaling.

5. The apparatus of claim 4, wherein the signaling is included in a MATYPE field of the base band header.

6. The apparatus of claim 4, wherein the receive circuitry is adapted to receive the base band frame in High Efficiency Mode (HEM).

7. The apparatus of claim 1, wherein the output circuitry is configured to extract the PDU of the given GSE packet.

8. The apparatus of claim 1 comprising a display device.

9. A reception method comprising:
receiving a predetermined type of generic stream encapsulation (GSE) packet having a data field containing a protocol data unit (PDU) whose maximum size is restricted to a limit size that is 4096 bytes or less, the predetermined type of GSE packet comprising a GSE-Lite packet type;
receiving signaling in an open systems interconnection (OSI) layer lower than an OSI data link layer, the signaling indicating whether a given GSE packet received is of the predetermined type of GSE packet;
outputting a PDU of the given GSE packet when the signaling indicates that the given GSE packet is of the predetermined type of GSE packet; and
outputting the given GSE packet when the signaling indicates that the given GSE packet is not of the predetermined type of GSE packet.

10. The method of claim 9 comprising outputting the given GSE packet when the signaling indicates that the given GSE packet is not of the predetermined type of GSE packet.

11. The method of claim 9, wherein the data field of the predetermined type of GSE packet contains a complete PDU.

12. The method of claim 9, wherein the limit size is 1800 bytes, 1542 bytes, 1538 bytes, 1530 bytes, 1526 bytes, 1522 bytes, 1518 bytes, or 1500 bytes.

13. The method of claim 9, wherein:
receiving the predetermined type of GSE packet includes receiving a base band frame having a base band header and a base band data field,
the base band data field contains the PDU, and
the base band header contains the signaling.

14. The method of claim 13, wherein the signaling is included in a MATYPE field of the base band header.

15. The method of claim 13, wherein the base band frame is received in High Efficiency Mode (HEM).

16. The method of claim 9, wherein outputting the PDU of the given GSE packet includes extracting the PDU of the given GSE packet.

17. The method of claim 9, wherein the predetermined type of GSE packet is a GSE-Lite packet type.

18. A non-transitory storage medium configured to store a program causing a reception apparatus to perform a method comprising:
receiving a predetermined type of generic stream encapsulation (GSE) packet having a data field containing a protocol data unit (PDU) whose maximum size is restricted to a limit size that is 4096 bytes or less, the predetermined type of GSE packet comprising a GSE-Lite packet type;
receiving signaling in an open systems interconnection (OSI) layer lower than an OSI data link layer, the signaling indicating whether a given GSE packet received is of the predetermined type of GSE packet;
outputting a PDU of the given GSE packet when the signaling indicates that the given GSE packet is of the predetermined type of GSE packet; and
outputting the given GSE packet when the signaling indicates that the given GSE packet is not of the predetermined type of GSE packet.

* * * * *